United States Patent [19]
Freund

[11] Patent Number: 5,987,611
[45] Date of Patent: Nov. 16, 1999

[54] SYSTEM AND METHODOLOGY FOR MANAGING INTERNET ACCESS ON A PER APPLICATION BASIS FOR CLIENT COMPUTERS CONNECTED TO THE INTERNET

[75] Inventor: Gregor Freund, San Francisco, Calif.

[73] Assignee: Zone Labs, Inc., San Francisco, Calif.

[21] Appl. No.: 08/851,777

[22] Filed: May 6, 1997

Related U.S. Application Data

[60] Provisional application No. 60/033,975, Dec. 31, 1996.

[51] Int. Cl.⁶ .................................................. G06F 13/00
[52] U.S. Cl. .......................................................... 713/201
[58] Field of Search .............................. 395/187.01, 186; 364/222.5, 286.4, 286.5; 711/163; 707/9, 10, 203; 713/200, 201

[56] References Cited

U.S. PATENT DOCUMENTS

| | | | |
|---|---|---|---|
| 4,914,586 | 4/1990 | Swinehart et al. | 364/200 |
| 5,475,817 | 12/1995 | Waldo et al. | 395/650 |
| 5,586,260 | 12/1996 | Hu | 395/200.2 |
| 5,623,601 | 4/1997 | Vu | 395/187.01 |
| 5,764,887 | 6/1998 | Kells et al. | 395/186 |
| 5,815,574 | 9/1998 | Fortinsky | 380/25 |
| 5,828,833 | 10/1998 | Belville et al. | 395/187.01 |
| 5,832,211 | 11/1998 | Blakley, III et al. | 395/188.01 |
| 5,838,903 | 11/1998 | Blakely, III et al. | 395/188.01 |
| 5,857,191 | 1/1999 | Blackwell, Jr. et al. | 707/10 |
| 5,864,665 | 1/1999 | Tran | 395/187.01 |
| 5,875,296 | 2/1999 | Shi et al. | 395/188.01 |
| 5,881,230 | 3/1999 | Christensen et al. | 395/200.33 |

OTHER PUBLICATIONS

Mullender, "Distributed Systems", Second Edition, ACM Press New York, Addison–Wesley, pp. 3. 12–13, 543–578, Dec. 1993.

ORFALI et al., "Essential Client/Server Survival Guide", Van Nostrand Reinhold, pp. 153–154, Dec. 1994.

Postel, J., "RFC 821—Simple Mail Transfer Protocol," Information Science Institute, University of Southern California, Aug. 1982, pp. 1–68.

(List continued on next page.)

*Primary Examiner*—Robert W. Beausoliel, Jr.
*Assistant Examiner*—Stephen C. Elmore
*Attorney, Agent, or Firm*—John A. Smart

[57] ABSTRACT

A computing environment with methods for monitoring access to an open network, such as a WAN or the Internet, is described. The system includes one or more clients, each operating applications or processes (e.g., Netscape Navigator™ or Microsoft Internet Explorer™ browser software) requiring Internet (or other open network) access (e.g., an Internet connection to one or more Web servers). Client-based monitoring and filtering of access is provided in conjunction with a centralized enforcement supervisor. The supervisor maintains access rules for the client-based filtering and verifies the existence and proper operation of the client-based filter application. Access rules which can be defined can specify criteria such as total time a user can be connected to the Internet (e.g., per day, week, month, or the like), time a user can interactively use the Internet (e.g., per day, week, month, or the like), a list of applications or application versions that a user can or cannot use in order to access the Internet, a list of URLs (or WAN addresses) that a user application can (or cannot) access, a list of protocols or protocol components (such as Java Script™) that a user application can or cannot use, and rules to determine what events should be logged (including how long are logs to be kept). By intercepting process loading and unloading and keeping a list of currently-active processes, each client process can be checked for various characteristics, including checking executable names, version numbers, executable file checksums, version header details, configuration settings, and the like. With this information, the system can determine if a particular process in question should have access to the Internet and what kind of access (i.e., protocols, Internet addresses, time limitations, and the like) is permissible for the given specific user.

30 Claims, 38 Drawing Sheets

OTHER PUBLICATIONS

Croker, D., "RFC 822—Standard for the format of ARPA Internet Text Messages," Department of Electrical Engineering, University of Delaware, Aug. 13, 1982, pp. 1–47.

Postel, J. and Reynolds, J., "RFC 959—File Transfer Protocol (FTP)," Information Science Institute, University of Southern California, Oct. 1985, pp. 1–47.

Kantor, B. (U.C. San Diego) and Lapsley, P. (U.C. Berkeley), "RFC 977—Network News Transfer Protocol, " Feb. 1986, pp. 1–27.

Berners–Lee, T., "RFC 1630—Universal Resource Identifiers in WWW," Jun. 1994, pp. 28.

Klensin, J., Freed, N., Rose, M., Stefferud, E. and Crocker, D., "RFC 1869—SMTP Service Extensions," Nov. 1995, pp. 1–11.

Kessler, G. and Shepard, S., "RFC 1739—A Primer On Internet And TCP/IP Tools," Hill Associates, Inc., Dec. 1994, pp. 1–46.

Myers, J. (Carnegie Mellon) and Rose, M. (Dover Beach Consulting, Inc.), "RFC 1939—Post Office Protocol—Version 3," May 1996, pp. 1–23.

Freed, N., "RFC 2034—SMTP Service Extension for Returning Enhanced Error Codes," Innosoft, Oct. 1996, pp. 1–6.

Freed, N., Borenstein, N., Moore, K., Klensin, J. and Postel, J., "RFC 2045/2046/2047/2048/2049—Multipurpose Internet Mail Extensions (MIME), Part 1: Format of Internet Message Bodies, Part 2: Media Types, Part 3: Message Header Extensions for Non–ASCII Text, Part 4: Registration Procedures, Part 5: Conformance Criteria and Examples," Nov. 1996, Part 1: pp. 1–31, Part 2: pp. 1–44, Part 3: pp. 1–15, Part 4: pp. 1–21, Part 5: pp. 1–24.

Crispin, M., "RFC 2060—Internet Message Access Protocol—Version 4rev1," University of Washington, Dec. 1996, pp. 1–82.

Palme, J. (Stockholm University) and Hopmann, A. (Microsoft Corporation), "RFC 2110—MIME E–mail Encapsulation of Aggregate Documents, such as HTML (MHTML)," Mar. 1997, pp. 1–19.

Fielding, R. (U.C. Irvine), Gettys, J. (DEC), Mogul, J. (DEC), Frystyk, H. (MIT/LCS) and Berers–Lee, T. (MIT/LCS), "Hypertext Transfer Protocol–HTTP/1.1," Internet Engineering Task Force (IETF)—Internet Draft, Aug. 12, 1996, pp. 1–52.

Marsh, K., "Win32 Hooks," Microsoft Developer Network Technology Group, Jul. 29, 1993 (revised Feb. 1994), pp. 1–14.

Dawson, D., "Firewalls 101—A Introduction to Ascend Secure Access," Ascend Network Secure Business Unit, Sep. 4, 1996, pp. 1–6.

Semeria, C., "Internet Firewalls and Security—A Technology Overview," 3Com Corporation, Sep. 4, 1996, pp. 1–16.

Felten, E., Balfanz, D., Dean, D. and Wallach, D., "Web Spoofing: An Internet Con Game—Technical Report 540–96," Department of Computer Science, Princeton University, 1996, pp. 1–9

Microsoft Corporation, "Microsoft Technical Notes—Browsing and Windows 95 Networking," 1995, pp. 1–38.

Windows Networking Design Team—Microsoft Corporation, "Microsoft TCP/IP VxD Interface Specification," Oct. 24, 1994, pp. 1–23.

TechNet/Corp. Network Systems/Bus. Systems Div.—Microsoft Corporation, "MS Windows NT 3.5/3.51: TCP/IP Implementation Details," May 22, 1996, pp. 1–65.

Shah, R., "Networking in Windows 95—SunWorld Online, " Nov. 1, 1995, pp. 1–6.

Rickard, J., "Internet Architecture," Boardwatch Magazine, 1996, pp. 1–11.

Microsoft Corporation, "Active Directory Design Specification, Version 1.0," Oct. 25, 1996, pp. 1–111.

Semeria, C., "Understanding IP Addressing—Everything You Ever Wanted To Know," NDS Marketing, 3Com Corporation, Apr. 26, 1996, pp. 1–62.

Hall, M. et al, "Windows Sockets 2 Service Provider Interface, Revision 2.2.0," Stardust Technologies, May 10, 1996, pp. 1–200.

SYSTEM AND METHODOLOGY FOR MANAGING INTERNET ACCESS ON A PER APPLICATION BASIS FOR CLIENT COMPUTERS CONNECTED TO THE INTERNET

The present application claims priority from commonly-owned provisional patent application Ser. No. 60/033,975, filed Dec. 31, 1996, entitled SYSTEM AND METHODS FOR MONITORING INTERNET ACCESS, and listing as inventor Gregor P. Freund, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing and, more particularly, to system and methods for regulating access and maintaining security of individual computer systems and local area networks (LANs) connected to larger open networks (Wide Area Networks or WANs), including the Internet.

The first personal computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs." In both cases, maintaining security and controlling what information a user of a personal computer can access was relatively simple because the overall computing environment was limited and clearly defined.

With the ever-increasing popularity of the Internet, particularly the World Wide Web ("Web") portion of the Internet, however, more and more personal computers are connected to larger networks. Providing access to vast stores of information, the Internet is typically accessed by users through Web "browsers" (e.g., Microsoft Internet Explorer™ or Netscape Navigator™ browser software) or other "Internet applications." Browsers and other Internet applications include the ability to access a URL (Universal Resource Locator) or "Web" site. The explosive growth of the Internet had a dramatic effect on the LANs of many businesses and other organizations. More and more employees need direct access through their corporate LAN to the Internet in order to facilitate research, competitive analysis, communication between branch offices, and send e-mail, to name just a few.

As a result, corporate IS (Information Systems) departments now face unprecedented challenges. Specifically, such departments, which have to date operated largely in a clearly defined and friendly environment, are now confronted with a far more complicated and hostile situation. As more and more computers are now connected to the Internet, either directly (e.g., over a dialup connection with an Internet Service Provider or "ISP") or through a gateway between a LAN and the Internet, a whole new set of challenges face LAN administrators and individual users alike: these previously-closed computing environments are now opened to a worldwide network of computer systems. Specific challenges, for example, include the following: (1) attacks by perpetrators (hackers) capable of damaging the local computer systems, misuse these systems, or steal proprietary data and programs; (2) unauthorized access to external data (e.g., pornographic or other unsuitable Web sites); (3) infiltration by viruses and "Trojan Horse" programs; (4) abuse of the local computer system for unauthorized personal activities (e.g., extensive Web browsing or game playing) with subsequent loss of productivity; and (5) hording available network bandwidth through use of bandwidth-intensive applications (e.g., real-time audio programs).

The software industry has, in response, introduced a myriad of products and technologies to address and minimize these threats, including "firewalls," proxy servers, and similar technologies—all designed to keep outside hackers from penetrating the LAN. Firewalls are applications that intercept the data traffic at the gateway to a wide area network (WAN) and try to check the data packets (i.e., Internet Protocol packets or "IP packets") being exchanged for suspicious or unwanted activities. Initially firewalls have been used primarily to keep intruders from the LAN by filtering data packets. More recently, the concept has been expanded to include "Stateful Inspection." Here, a firewall not only looks at the IP packets but also inspects the data packets transport protocol (e.g., TCP) header (and even the application level protocols) in an attempt to better understand the exact nature of the data exchange.

Proxy server or Application Gateways, on the other hand, are LAN server-based applications that act on behalf of the client application. Accessing the Internet directly, the application first submits a request to the proxy server which inspects the request for unsafe or unwanted traffic. Only after this inspection will the proxy server consider forwarding the request to the destination on the Internet.

Both strategies are based on a centralized filter mechanism, with most of the filtering work being performed at the server (as opposed to the individual client PCs). Such an approach is problematic, however. Because of the centralized nature of firewalls and proxy servers, each approach extracts significant performance penalties. During operation of a typical system employing either approach, a single server might have to do the filtering work for hundreds or even thousands of PCs or workstations. This represents a major bottleneck to overall system performance. Further, a centralized filter poses a significant bottleneck even when client PCs are idly awaiting data. As emerging technologies on the Internet require still faster data delivery (e.g., real-time audio and video fees) and use more complex protocols, this problem will likely be exacerbated. In the case of firewalls employing "Stateful Inspection" technology, performance problems are aggravated by the fact that the firewall software needs to duplicate much of the protocol implementation of the client application as well as the transport protocol (e.g., TCP and UDP protocol) in order to understand the data flow.

As another problem, centralized filter architectures are missing vital information to correctly interpret the data packets because the underlying protocols were designed for effective data transfer and not for data monitoring and interception. For instance, monitoring based on an individual client application (or versions thereof) is not supported, all despite the fact that two identical data packets (or series of data packets) can have completely different meanings based on the underlying context—that is, how the client application actually interprets the data packets. As a result, computer viruses or Trojan Horse applications can camouflage data transmissions as legitimate traffic.

There are still other disadvantages to centralized filtering. The approach is difficult to configure and administer. The task of setting up different rights for different users, workstations, or workgroups, for instance, is particularly difficult. No facilities are provided for delegating certain access and monitoring authority, for example, in order to allow a workgroup supervisor to manage less critical aspects of the Internet access for his or her group without going through a central authority. Also, a centralized filter cannot distinguish between "active" use of the Internet (i.e., when user interaction with the PC causes the Internet access) and "background" use (i.e., when an application accesses the Internet without user interaction). Still further, a centralized filter is easily circumvented, for example by a user employing a modem for establishing a dial-up connection to an ISP (Internet Service Provider). Similarly, the proxy-server approach is unattractive. Special versions or specialized configurations of client applications are required, thus complicating system administration. Internet setup for portable computers employed at remote locations is especially complicated.

Providing a client-based filter (e.g., SurfWatch and CyberPatrol) for preventing users from accessing undesirable World Wide Web sites does not adequately overcome the disadvantages of centralized filtering. Designed largely as parental control tools for individual PCs, these programs are easily disabled by uninstalling (accidentally or intentionally) the filter. A Windows user can, for example, simply reinstall Windows, replacing certain driver files of the filter. This disables the filter and provides the user with unrestricted access to the Internet.

All told, comparably little has been done to date to effectively minimize or eliminate the risks posed from within one's own corporate LAN, specifically, how one manages access to the Internet or other WAN from client machines. Quite simply, the technical framework to successfully implement an Internet access management product does not exists. What is needed are system and methods providing network administrators, workgroup supervisor, and individual PC users with the ability to monitor and regulate the kinds of exchanges permissible between one's local computing environment and external network or WANs, including the Internet. The present invention fulfills this and other needs.

SUMMARY OF THE INVENTION

The present invention provides system and methods for client-based monitoring and filtering of access, which operates in conjunction with a centralized enforcement supervisor. In accordance with the present invention, a central filter is not employed. Instead, the present invention provides a client-side filter that is controlled by the centralized authority as long as the centralized authority has a way of enforcing non-compliance, for example, by blocking access to an open network, such as a WAN or the Internet.

At a general level, the present invention provides a system comprising one or more access management applications that set access rules for the entire LAN for one or more workgroups or individual users, a client-based filter application (installed at each client), and a central supervisor application that maintains the access rules for the client based filter and verifies the existence and proper operation of the client-based filter application. Typically, the system includes (optionally) a firewall or similar application, which works together with the supervisor application in order to block all clients that have not been verified by the supervisor application.

The access management application is employed by the LAN administrator, workgroup administrator, and/or LAN user to maintain a database of the access rules for the workstations being administrated. These access rules can include criteria such as total time a user can be connected to the Internet (e.g., per day, week, month, or the like), time a user can interactively use the Internet (e.g., per day, week, month, or the like), a list of applications or application versions that a user can or cannot use in order to access the Internet, a list of URLs (or WAN addresses) that a user application can (or cannot) access, a list of protocols or protocol components (such as Java Script™) that a user application can or cannot use, and rules to determine what events should be logged (including how long are logs to be kept). These access rules can be qualified by optionally specifying: to whom should a rule apply (list of users, list of workgroups, or all); start date and expiration date of a rule; time of day when the rule should be applied (for example from 9 am to 5 pm); whether the rule is "disclosed" to the user or workgroup manager or remains hidden; whether a rule can be overwritten or modified by the workgroup manager or user; and what should happen if a rule is violated (e.g., denying Internet access, issue a warning, redirecting the access, creating a log entry, or the like).

The client-based filter application, which in a preferred embodiment performs all of the monitoring, logging, and filtering work, is responsible for intercepting process loading and unloading. Other responsibilities include keeping a list of currently active processes; intercepting certain keyboard, mouse and other interactive user activities in order to determine which process is actively used; intercepting and interpreting all TCP/IP communication and build a comprehensive representation of these TCP/IP activities; and intercepting certain file activity and assign them to the originating process.

By intercepting process loading and unloading and keeping a list of currently active processes, each client process can be checked for various characteristics, including checking executable name, version numbers, executable file checksums, version header details, configuration settings, and the like. With this information, the system can determine if the process in question should have access to the Internet and what kind of access (i.e., protocols, Internet addresses, time limitations, and the like) is permissible for the given specific user.

By intercepting and interpreting all TCP/IP communication and building a comprehensive representation of these TCP/IP activities, the system can monitor TCP/IP activities on a per process or per application basis. If a particular process has access rights to the Internet (and is permitted to use the detected protocol and no other rules are violated), the communication of the process is logged and allowed to go forward. Otherwise, the prescribed remedial action for any violated rule is performed, including logging an exception log entry and, depending on the rules the TCP/IP activity, the communication is either terminated, redirected, modified, or continued. In a similar fashion, any possible time limitation rules are evaluated and enforced at this point.

By intercepting certain file activity and assigning them to the originating process, the system can track files being created and changed by any process in order to match TCP/IP activities with corresponding file activities. If a process uses FTP to download a file, for example, the system will match that activity to a file being saved by the same process by checking file name and size. If a match is found, a log entry is generated. This allows the immediate application of internal or external virus checkers.

The centralized supervisor application is installed on a computer on the LAN that can be reached from all workstations that need access to the Internet; this is typically (although not necessarily) a server computer. The supervisor monitors whether a client has the filter application loaded and provides the filter application with the rules for the specific user or workstation. The filter application maintains a local copy of these rules so that rule enforcement continues even when the user accesses the Internet but bypasses the LAN (e.g., a mobile computer on the road). The communication between the client-based filter and the centralized supervisor application, as well as between the supervisor application and the firewall, employs encryption to ensure secure communication and avoid any possible attack on that level.

The system of the present invention works together with existing firewalls which allow a program (e.g., the supervisor application) to dynamically set the addresses of the workstations that should have access to the Internet. The supervisor application signals the firewall which client applications have been "certified" so that the firewall only grants Internet access to those clients. At the same time, a firewall can continue to perform its usual duties, such as protecting the LAN from outside intruders or protecting the LAN and server operating system(s).

Exemplary methodologies of the present invention include the following.

I. Client Monitor with Supervisor/Firewall Backup and Enforcement
   a) Installing at a particular client computer a client monitoring process;
   b) Installing at another computer on the local area network a supervisor process, which specifies rules which govern Internet access by the client computers including the particular client computer;
   c) Transmitting a filtered subset of the rules to the particular client computer;
   d) At the client monitoring process, trapping a request for Internet access from the particular client computer;
   e) Determining whether the request for Internet access would violate any of the rules transmitted to the particular client computer, and
   f) If the request for Internet access violates any of the rules transmitted to the particular client computer, denying the request for Internet access.

II. Using Application Properties to Determine Legitimate Internet Traffic
   a) Application attempts to access Internet;
   b) Client Monitor compares application properties (version, executable name, and the like) with database of application allowed to access the Internet and checks what kind of activity the application is allowed to do (mail, browsing, and the like); and
   c) If application is not allowed to access the Internet or not allowed to use the specific protocol then client monitor can stop application from accessing the Internet and/or warn user.

III. Using Application Properties to Determine if an Applications has Known Security Flaws
   a) Application attempts to access Internet;
   b) Client Monitor compares application properties (version, executable name, and the like) with database of application with known security problems; and
   c) If application has know security problems, client monitor stops the application from accessing the Internet and/or warns the user.

IV. Monitoring User Interaction (e.g., keyboard/mouse and the like) to Distinguish and Regulate Time Spent Online;
   a) Client Monitor detects interactive commands (e.g., keyboard/mouse) for an application that uses the Internet via "browsing" protocols (e.g., HTTP);
   b) Client monitor determines whether the user interactively uses the Internet and restrict the activity if required.

V. Using Client Monitor to Alleviate Network Congestion
   a) Supervisor Application notifies client that network is congested; and
   b) Client Monitor delays transmission of non-time critical information and data.

VI. Using Local and Remote Stored Rules Databases to Allow Client Monitor Functioning Even if Supervisor Application is Not Available
   a) Client monitor attempts but is unable to access the supervisor application; and
   b) Access rules are still enforced because Client Monitor employs a local copy of rules (previously downloaded).

BRIEF DESCRIPTION OF THE DRAWINGS

FIGS. 7A–K are bitmap screenshots illustrating a preferred user interface or "wizard" dialog for configuring rules.

DETAILED DESCRIPTION OF A PREFERRED EMBODIMENT

The following description will focus on the presently-preferred embodiment of the present invention, which is operative in an Internet-connected environment, including, for instance, client machines running under the Microsoft® Windows environment and connected to an open network, such as a WAN or the Internet. The present invention, however, is not limited to any particular one application or any particular environment. Instead, those skilled in the art will find that the system and methods of the present invention may be advantageously applied to a variety of system and application software, including database management systems, word processors, spreadsheets, and the like, operating on a variety of different platforms, including the Macintosh® operating system, the UNIX® operating system, NextStep® operating system, and the like. Therefore, the description of the exemplary embodiments which follows is for purposes of illustration and not limitation.

System Architecture

A. System hardware (for client and/or server machines)

Figure 1:
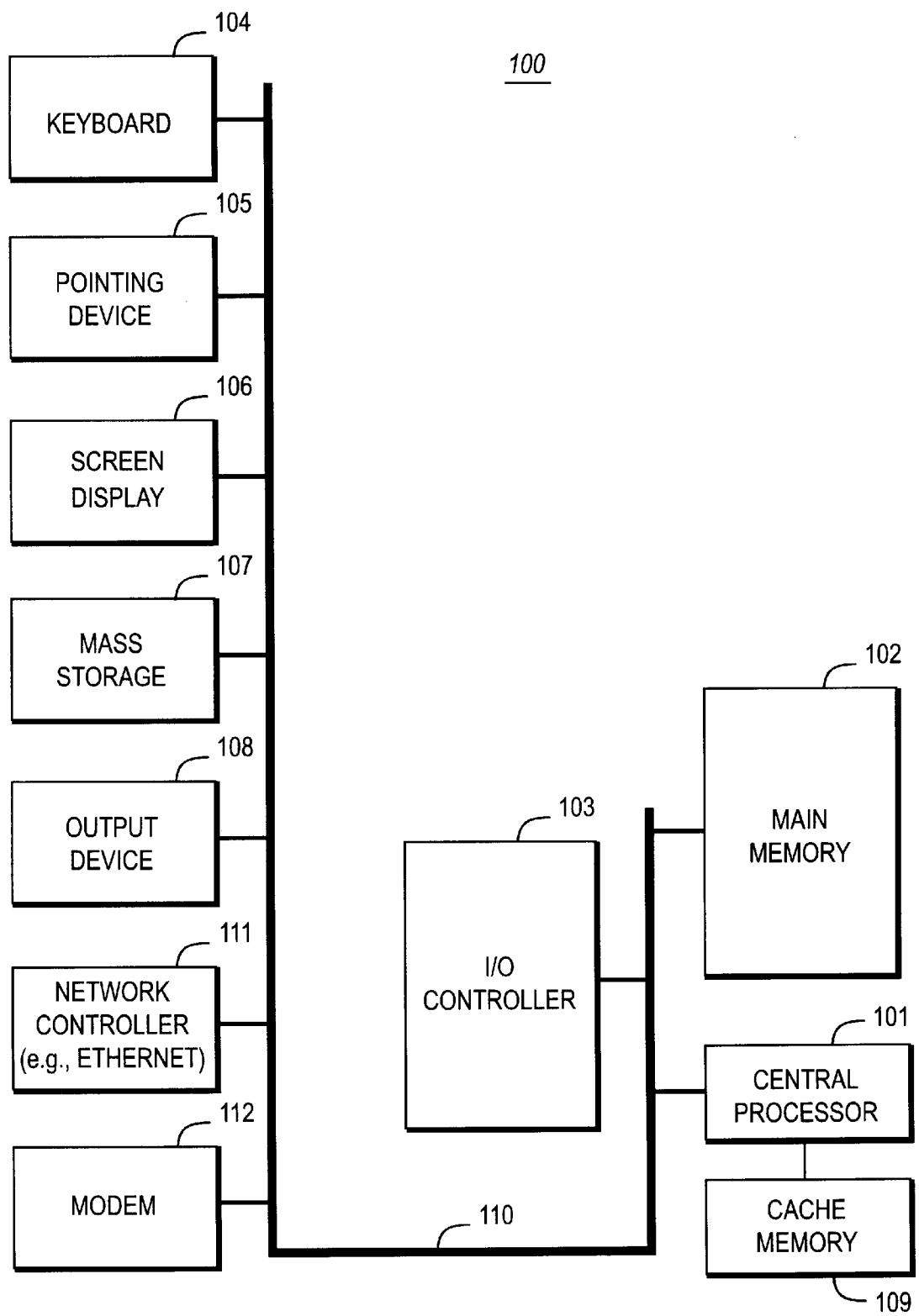
FIG. 1 is a block diagram illustrating a computer system in which the present invention may be embodied.

The invention is generally embodied on a computer system including one or more computer systems, such as computer system 100 of FIG. 1, operating on a network. System 100 comprises a central processor 101, a main memory 102, an input/output controller 103, a keyboard 104, a pointing device 105 (e.g., mouse, track ball, pen device, or the like), a display or screen device 106, and a mass storage 107 (e.g., hard or fixed disk, removable floppy disk, optical disk, magneto-optical disk, or flash memory), a network interface card or controller 111 (e.g., Ethernet), and a modem 112 (e.g., 28.8K baud modem or ISDN modem). Although not shown separately, a real-time system clock is included with the system 100, in a conventional manner. Processor 101 includes or is coupled to a cache memory 109 for storing frequently accessed information; memory 109 may be an on-chip cache or external cache (as shown). One or more input/output device(s) 108, such as a printing device or slide output device, are included in the system 100, as desired. As shown, the various components of the system 100 communicate through a system bus 110 or similar architecture. The system itself communicates with other systems via a network interface card 111 (e.g., available from 3Com) and/or modem 112 (e.g., available from U.S. Robotics). In a preferred embodiment, the system 100 includes an IBM PC-compatible personal computer, available from a variety of vendors (including IBM of Armonk, N.Y.). I/O device 108 may include a laser printer, such as an HP Laserjet printer, which is available from Hewlett-Packard of Palo Alto, Calif.

B. System software (for controlling clients and server machines)

Figure 2:
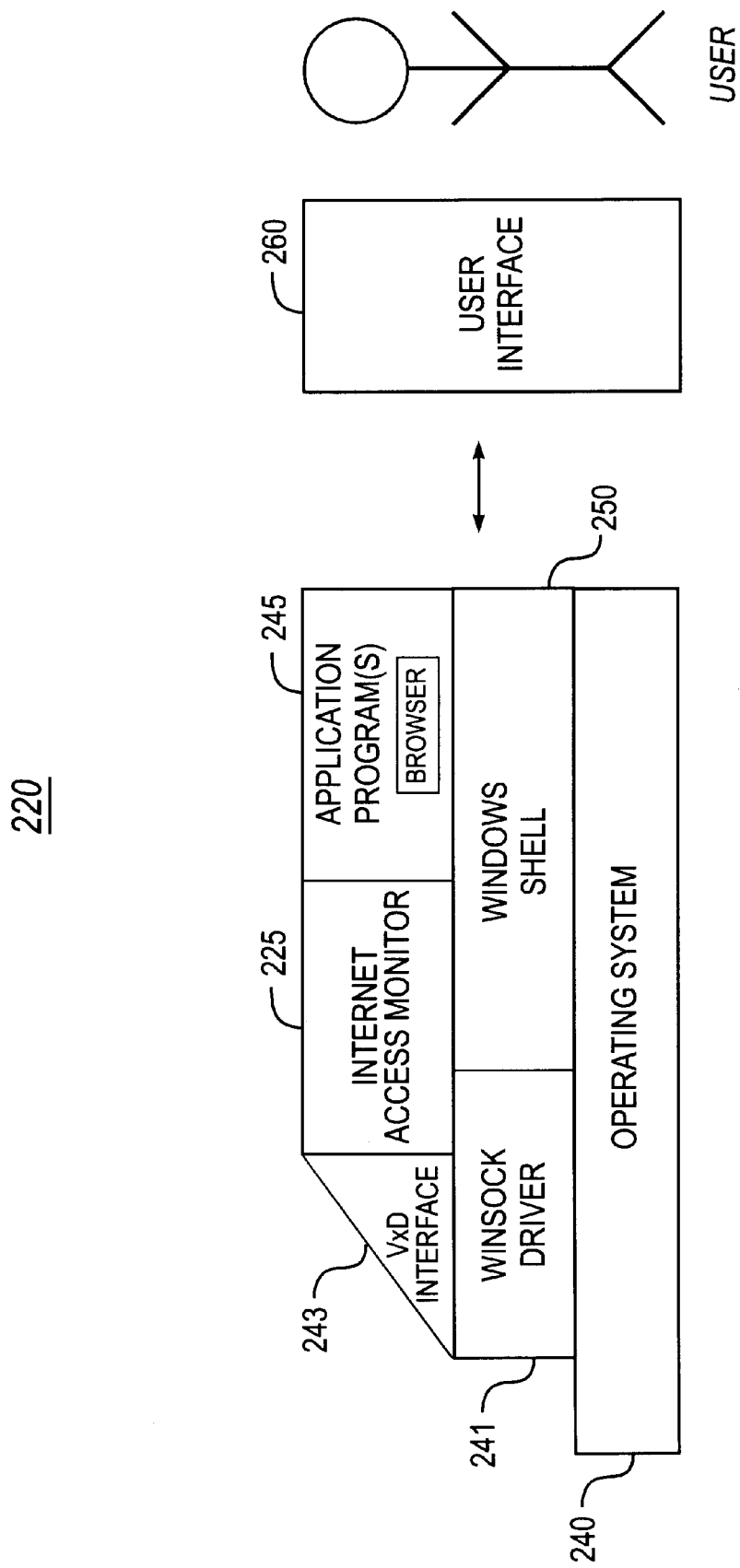
FIG. 2 is a block diagram of a computer software system for controlling the operation of the computer system of FIG. 1.

Illustrated in FIG. 2, a computer software system 220 is provided for directing the operation of the computer system 100. Software system 220, which is stored in system memory 102 and on storage (e.g., disk memory) 107, includes a kernel or operating system (OS) 240 and a windows shell 250. One or more application programs, such as client application software or "programs" 245 may be "loaded" (i.e., transferred from storage 107 into memory 102) for execution by the system 100. In a preferred embodiment, client application software includes a Web browser (e.g., Netscape Navigator™ or Microsoft Internet Explorer™ browser software) which communicates through a communication layer or driver 241 (e.g., Winsock) with the Internet.

System 220 includes a user interface (UI) 260, preferably a Graphical User Interface (GUI), for receiving user commands and data. These inputs, in turn, may be acted upon by the system 100 in accordance with instructions from operating module 240, windows 250, and/or client application module(s) 245. The UI 260 also serves to display the results of operation from the OS 240, windows 250, and application (s) 245, whereupon the user may supply additional inputs or terminate the session. OS 240 and windows 245 can be provided by Microsoft® Windows 95, by Microsoft® Windows NT, or by Microsoft® Windows 3.x (operating in conjunction with MS-DOS); these are available from Microsoft Corporation of Redmond, Wash. Alternatively, OS 240 and windows 245 can be provided by IBM OS/2® (available from IBM of Armonk, N.Y.) or Macintosh® OS (available from Apple Computers of Cupertino, Calif.). Although shown conceptually as a separate module, the UI is typically provided by interaction of the application modules with the windows shell, both operating under OS 240.

Of particular interest, the system 220 includes a client-side Internet access monitoring module 225 of the present invention. Internet access monitoring module 225 interfaces directly with Winsock driver 241 via a Windows VxD driver interface surfaced by the driver 241, as shown at 243. Construction and operation of the client-side Internet access monitoring module 225, including its interaction with server-based components employed in a preferred embodiment, will now be described in further detail.

Preferred Monitoring and Management of Internet Access

A. Introduction

1. General design

An Internet access monitoring system, constructed in accordance with the present invention, preferably includes the following.

(1) The system should preferably be capable of restricting access to the Internet (or other Wide Area Network) to certain approved applications or/and application versions.

(2) The system should preferably support centrally-maintained access rules (e.g., defining basic access rights), but at the same time allow individual workgroup managers or even individual users to set rules for their area of responsibility, if so desired by the organization.

(3) The system should preferably prevent users from circumventing Internet access rules, either accidentally or intentionally. It should be difficult, for instance, for a user to circumvent access rules by connecting to the Internet through a dial-up connection (e.g., connecting to an ISP with a modem). Similarly, it should be difficult for a user to circumvent access rules by uninstalling or tampering with components of the system, from his/her own PC.

(4) The system should preferably regulate the amount of time users can access the Internet, with specific considerations for detecting interactive or "active" use by the user versus background or "passive" use by certain applications. This differentiation prevents the system from mistakenly blocking access of a user based on excessive use, when in fact a background application is instead responsible for the activity.

(5) The system should preferably be capable of restricting individual users, workgroups, or an entire organization to undertaking certain permissible on-line activities, such as allowing use of Web browsing programs but disallowing use of Web radio programs (e.g., RealAudio™).

(6) The system should preferably be capable of restricting individual users, workgroups, or an entire organization to accessing certain external computer sites or to prohibit access to a specific list of sites.

(7) The system should preferably be capable of filtering incoming data, including binary files, for detecting viruses and Trojan Horse programs.

(8) The system should preferably maintain a detailed log of access related activities, for facilitating administration needs.

2. Managing Internet access along organizational structures

In order to effectively manage Internet access, a system should support existing organizational structures. A department supervisor, for example, should be able to determine the needs of his/her subordinates within a safe overall framework. This is important for the overall success of Internet access within the organization as it allows supervisors to address any problems which arise early on (before they become serious personnel issues). Accordingly, the Internet access monitoring system of the present invention supports a hierarchical structure where individual supervisors can monitor and set the access rules for their individual workgroups without affecting others in the organization. At the same time, a central authority (e.g., corporate IS department) still can establish general rules that cannot be overwritten on the workgroup level.

Two examples demonstrate the effectiveness of this strategy. Consider, for instance, employee Bill who begins routinely accessing pornographic sites on the Internet using company resources, despite the fact that such activity is prohibited by company policy. Using current technology, the company's IS department would likely not detect the activity for weeks, or even months, as the department's main focus is to keep the company's networks running smoothly, not to track individual activities. At the point when the activity is uncovered, Bill might have already violated company policy to the point where his manager has no choice but to dismiss Bill. If Bill's Internet access activity is monitored locally by Bill's supervisor, however, the supervisor can notice the prohibited activity almost immediately. After sternly reminding Bill of company policy, the supervisor can continue to monitor Bill's online activities and head off the need to terminate Bill.

As another example, consider Jane, an employee who normally has no Internet access but needs to write a competitive analysis for a new product. To complete this task effectively, Jane requires Internet access for performing required research. Conventionally, Jane's supervisor would call the company's IS department to arrange Internet access, a process requiring days or even weeks. However using the Internet access monitoring system of the present invention, Jane's supervisor can grant her access for a limited time within seconds.

3. Monitoring and regulating time spent on the Internet

Perhaps the aspect of Internet access most important to productivity of an organization is the ability to monitor and regulate the amount of time employees spend on the Internet. Although the Internet is an increasingly important business tool, it also poses a temptation to employees for use to pursue their own private interests while seemingly working.

The Internet access monitoring system of the present invention addresses this problem by allowing an organization to monitor and control the time its employees spend on the Internet. The actual monitoring can be done in a variety of ways, including monitoring the time spend by an employee to actively interact with the Internet, monitoring the total time applications access the Internet, and/or monitoring the total time particular users/workstations access the Internet. The option of employing different approaches is an important one, as no one approach will likely answer all monitoring needs of an organization.

Consider, for example, the monitoring of time spent by an employee for "actively" interacting with the Internet. Active use occurs when a user directly interacts with an Internet application (e.g., Web browser) while that application accesses the Internet. This is distinguished from background use which occurs when an application or process executing in the background (i.e., does not have "focus") accesses the Internet, such as a mail client which intermittently polls an Internet-based mail server. Here, certain Internet applications, such as news collecting programs (e.g., PCN), access the Internet in the background while the user attends to other unrelated tasks in the foreground. The Internet access time of a user for a given day, therefore, is not necessarily equivalent to the time the user actively spends browsing Web sites. Conventional technologies cannot distinguish between this "active" versus "passive" access and therefore cannot present an accurate picture of the actual time the user has spent on on-line activities. Accordingly, it is desirable to monitor the time an employee spends "actively" interacting with the Internet, so that management goals of controling counterproductive Web browsing can be realized. In the currently-preferred embodiment, the system may be configured such that access to the Internet which occurs in the background is not counted against the per-day time limit imposed on users. A given application itself can be examined for determining whether it is "active" by determining whether the application receives "focus" and/or receives user input (e.g., mouse clicks or key strokes).

4. Monitoring application usage

Taken a step further, monitoring the total time particular applications access the Internet provides enhanced control. Unlike traditional monitoring technology, the Internet access monitoring system of the present invention can track Internet access on a per application basis—that is, access broken down by the application or applications used for the access. This affords much better tracking and regulating of Internet activities. By monitoring total time users/workstations access the Internet, an organization can better determine the overall Internet access requirements and loads.

The ability to monitor and regulate Internet access on a per application basis is particularly advantageous. Advantages include, for instance, the ability to specify which applications can (and cannot) access the Internet. IS departments have a strong interest in limiting the number of applications used on their LANs, including limiting available applications to a uniform set of "approved" applications. For one, user support is simplified if fewer different applications are in use. More importantly, the overall integrity of one's corporate networks is improved if known applications (or unknown versions of applications) are used. This is increasingly important as more and more applications are downloaded from the Internet, including applications which an IS department has little control over. Some of these applications might include ones which are unstable (e.g., "beta" software), have security flaws, or are even intentionally destructive (e.g., computer viruses and "Trojan Horse" programs). By monitoring abilities of individual applications to access the Internet and limiting such access to approved applications only, the Internet access monitoring system of the present invention can greatly reduce or eliminate the risk of such attacks.

In a corresponding manner, monitoring access to the Internet by individual applications allows the system of the present invention to not only track Internet traffic but also can determine in many cases data exchanged on a per application basis, including the ability to determine the name of individual files dowloaded as well as target directories to where such files are copied. The approach creates an audit trail of downloaded files, thus allowing one to trace the source of files found to contain offensive contents or pose security risks. This information can also be used to ease a user's housekeeping chores of deleting files that a Web site has copied onto the user's hard disk.

Further, per application monitoring simplifies the task of tracking bandwidth utilization for a network, including providing detailed review on how the Internet access is being used. This greatly eases planning of hardware and connection requirements. Inadvertent disruptions of the network by individual users, such as bandwidth hording by a user using RealAudio for listening to a Web audio "broadcast," can be averted.

B. Internet protocols

In order to facilitate understanding of the present invention, it is helpful to review basic architecture of the Internet and techniques for providing Internet access. For clarity, the following description of the Internet architecture focuses on those aspects which are relevant to the present invention.

The Internet is essentially an open network of computers and LANs. Computers within this open network communicate using multiple protocol layers. Each of the layers addresses a distinct concern of the communication process. As a core protocol of the Internet, Internet Protocol (IP) provides a layer for exchanging data packets between computers connected to the Internet, including providing data encapsulation and header formatting, data routing across the Internet, and fragmentation and reassembly. According to the protocol, data is transmitted by attaching a header with a destination address (IP address) and then transmitting the data packet from one computer to another until the data packet arrives at the desired destination. Along this journey, each computer uses an implementation of the IP Protocol to route the data packet to the next destination until the data packet reaches its final destination. Except for checking the integrity of the IP header, no error detection or recovery capabilities are performed. When the data packet arrives at its ultimate destination, any necessary integrity checks are carried out.

Another protocol—the transport protocol—serves as a layer responsible for guaranteeing the integrity of application data. It is, therefore, used only at the original source and final destination of the data. The Internet currently uses two different transport protocols. One protocol, User Datagram Protocol (UDP), does not offer reliable connectionless services; in practice, therefore, it is up to the target application to check data integrity. In contrast, Transmission Control Protocol (TCP), another transport portocol, provides reliable connection-oriented service, which establishes a connection with a remote computer and guarantees data integrity and delivery (or notifies the application in case of an error).

Both TCP and UDP data transmissions each provide specific headers, in addition to the IP header. In order to simplify forwarding the data packets to a target application, these headers include a port number. The port number functions to identify an application-level protocol. Port number 80, for instance, is normally used for the World Wide Web protocol (Hypertext Transport Protocol or HTTP).

TCP/IP refers to IP Protocol combined with TCP and UDP. Normally, application programs communicate with an available TCP/IP implementation (e.g., Windows "WinSock") through an Application Programming Interface (API). For Windows computers, the WinSock API simply encapsulates the TCP/IP architecture. WinSock is patterned after the popular Berkeley Sockets programming model, which is generally considered the de facto standard for TCP/IP networking.

Internet applications generally implement more specialized protocols on top of TCP/IP. For example, a Web browser implements the client portions of the HyperText Transfer Protocol (HTTP) in order to communicate with Web servers. A Web browser also might implement other protocols, such as the older File Transfer Protocol (FTP) for downloading data. Electronic mail applications (i.e., E-mail clients) implement the client portion of the Simple Mail Transfer Protocol (SMTP) and the Post Office Protocol (POP). Still other protocols exist for use in the Internet, many of which are documented in the technical, trade, and patent literature; see e.g., the Internet Engineering Task Force (IETF) RFCs ("Requests For Comments") publications available from the Internet Network Information Center (NIC), via FTP access to the NIC archive nic.ddn.mil. Due to the accelerated development of the Internet, many more protocols are unpublished or are in developmental stages. As long as a client application and a corresponding server application understand how to interpret the data packets they exchange, this generally does not pose a major problem. For applications that monitor the Internet traffic in order to detect security or other problems, however, this does pose an additional challenge. Accordingly, the preferred embodiment of the present invention is constructed to facilitate accommodation of new protocols.

Detailed Construction of the Preferred Embodiment

A. Overview

The present invention provides system and methods for client-based monitoring and filtering of access, which operates in conjunction with a centralized enforcement supervisor. In accordance with the present invention, a central filter is not employed. Instead, the present invention provides a client-side filter that is controlled by the centralized authority as long as the centralized authority has a way of enforcing non-compliance (for example by blocking access to the WAN).

At a general level, the present invention provides a system comprising one or more access management applications that set access rules for the entire LAN for one or more workgroups or individual users, a client-based filter application (installed at each client), and a central supervisor application that maintains the access rules for the client based filter and verifies the existence and proper operation of the client-based filter application. Typically, the system includes (optionally) a firewall or similar application, which works together with the supervisor application in order to block all clients that have not been verified by the supervisor application.

The access management application is employed by the LAN administrator, workgroup administrator, and/or LAN user to maintain a database of the access rules for the workstations being administrated. These access rules can include criteria such as total time a user can be connected to the Internet (e.g., per day, week, month, or the like), time a user can interactively use the Internet (e.g., per day, week, month, or the like), a list of applications or application versions that a user can or cannot use in order to access the Internet, a list of URLs (or WAN addresses) that a user application can (or cannot) access, a list of protocols or protocol components (such as Java Script™) that a user application can or cannot use, and rules to determine what events should be logged (including how long are logs to be kept). These access rules can be qualified by optionally specifying: to whom should a rule apply (list of users, list of workgroups, or all); start date and expiration date of a rule; time of day when the rule should be applied (for example from 9 am to 5 pm); whether the rule is "disclosed" to the user or workgroup manager or remains hidden; whether a rule can be overwritten or modified by the workgroup manager or user; and what should happen if a rule is violated (e.g., denying Internet access, issuing a warning, redirecting the access, creating a log entry, or the like).

The client-based filter application, which in a preferred embodiment performs all of the monitoring, logging, and filtering work, is responsible for intercepting process loading and unloading. Other responsibilities include keeping a list of currently active processes; intercepting certain keyboard, mouse and other interactive user activities in order to determine which process is actively used; intercepting and interpreting all TCP/IP communication and build a comprehensive representation of these TCP/IP activities; and intercepting certain file activity and assign them to the originating process.

By intercepting process loading and unloading and keeping a list of currently active processes, each client process can be checked for various characteristics, including checking executable names, version numbers, executable file checksums, version header details, configuration settings, and the like. With this data, the filter application can determine if the process in question should have access to the Internet and what kind of access (i.e., protocols, Internet addresses, time limitations, and the like) is permissible for the given specific user.

By intercepting and interpreting all TCP/IP communication and building a comprehensive representation of these TCP/IP activities, the system can monitor TCP/IP activities on a per process or per application basis. If a particular process has access rights to the Internet (and is permitted to use the detected protocol and no other rules are violated), the communication of the process is logged and allowed to go forward. Otherwise, the prescribed remedial action for any violated rule is performed, including logging an exception log entry and, depending on the rules the TCP/IP activity, the communication is either terminated, redirected, modified, or continued. In a similar fashion, any possible time limitation rules are evaluated and enforced at this point.

By intercepting certain file activity and assigning them to the originating process, the system can track files being created and changed by any process in order to match TCP/IP activities with corresponding file activities. If a process uses FTP to download a file, for example, the system will match that activity to a file being saved by the same process by checking file name and size. If a match is found, a log entry is generated. This allows the immediate application of internal or external virus checkers.

The centralized supervisor application is installed on a computer on the LAN that can be reached from all workstations that need access to the Internet; this is typically (although not necessarily) a server computer. The supervisor monitors whether a client has the filter application loaded and provides the filter application with the rules for the specific user or workstation. The filter application maintains a local copy of these rules so that rule enforcement continues even when the user accesses the Internet but bypasses the LAN (e.g., a mobile computer on the road). The communication between the client-based filter and the centralized supervisor application, as well as between the supervisor application and the firewall, employs encryption to ensure secure communication protocol, thus avoiding any possible attack on that level.

The system of the present invention works together with existing firewalls which allow a program (e.g., the supervisor application) to dynamically set the addresses of the workstations that should have access to the Internet. The supervisor application signals the firewall which client applications have been "certified" so that the firewall only grants Internet access to those clients. At the same time, a firewall can continue to perform its usual duties, such as protecting the LAN from outside intruders or protecting the LAN and server operating system(s).

B. System architecture

1. Terminology

For purposes of describing the architecture of the system of the present invention, it is helpful to define the following terms.

| | |
|---|---|
| Client Monitor | The monitor component or program that runs on every workstation that can access the Internet |
| Client VxD | Kernel mode component of Client Monitor |
| Supervisor | The central program that runs on a server or a secure Client Monitor and coordinates the system |
| Application | Third party application that can access the Internet or WAN via the WinSock API or a similar API |
| Firewall | Third party filter program that sits between the LAN and the Internet |
| Host | Third party server program that can be contacted through the Internet |
| ISP Server | Internet Service Provider Server application that authenticates user and serves as gateway to Internet |
| ISP Supervisor | Version Qf Supervisor that coordinates Internet access with ISP Server |
| RAS | Remote Access Service component of Windows 95/NT that dials the remote computer and initializes the contact |
| ISP Authentication Server | Internet Service Provider Server application that authenticates user and serves as gateway to Internet |
| ISP "Sandbox" Server | HTTP Server used when client has only restricted Internet access |
| ISP POP | Internet Service Provider Point-Of-Presence comprising modems, server, and router |
| ISP POP Server | Server component of ISP POP |

2. LAN-based embodiment

Figure 3A:
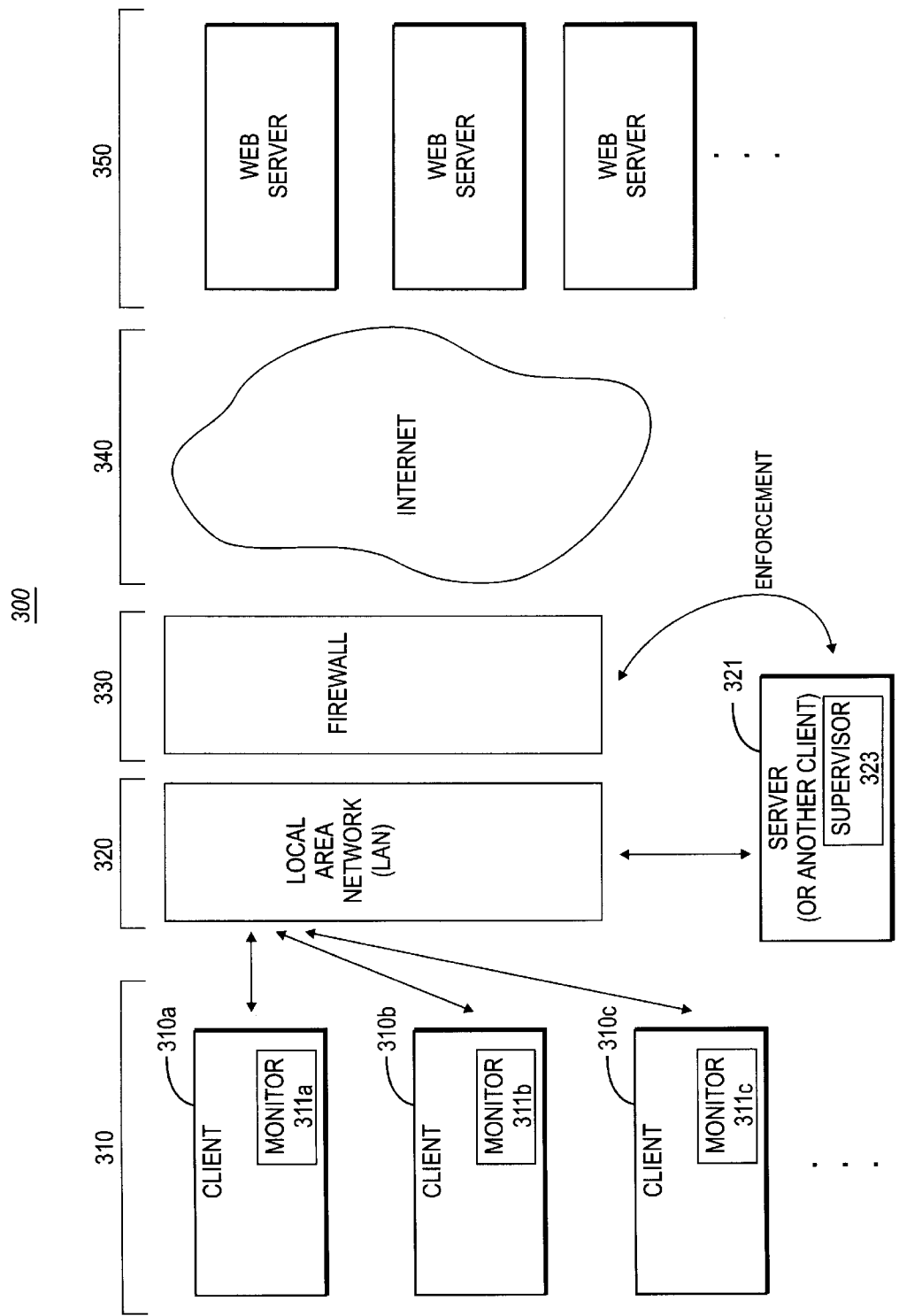
FIGS. 3A–B are block diagrams providing an overview of Internet-based (client/server) systems in which the present invention may be embodied.

FIG. 3A provides an overview of an Internet-based (client/server) system 300 in which the present invention may be embodied. As shown, the system includes multiple clients 310 (e.g., clients 310a, 310b, 310c, each of which comprises a personal computer or workstation, such as system 100) connected to a network 320, such as a Windows NT Local Area Network (Microsoft Corporation of Redmond, Wash.). Each client includes a client-side monitoring component for monitoring Internet access in accordance with the present invention, as specifically shown at 311a, 311b, and 311c. The network 320 is connected to a server 321 (or another client) having a supervisor or verifier component 323. The supervisor component 323 provides independent verification of the clients, for allowing or disallowing requests of each particular client. In effect, the supervisor 323 directs runtime monitoring operations.

The network 320 itself can be a server-based network (e.g., Windows NT Server providing services to network clients) or, alternatively, a peer-to-peer network. Communications to the outside (e.g., Internet) are typically achieved using TCP/IP protocol. The local network 320 communicates with the Internet, shown at 340, preferably through a "firewall" 330. The firewall 330 itself may be implemented in a conventional manner, such as employing a router-based or server-based firewall process for monitoring communications with various Web servers 350 connected to the Internet 340.

Figure 4:
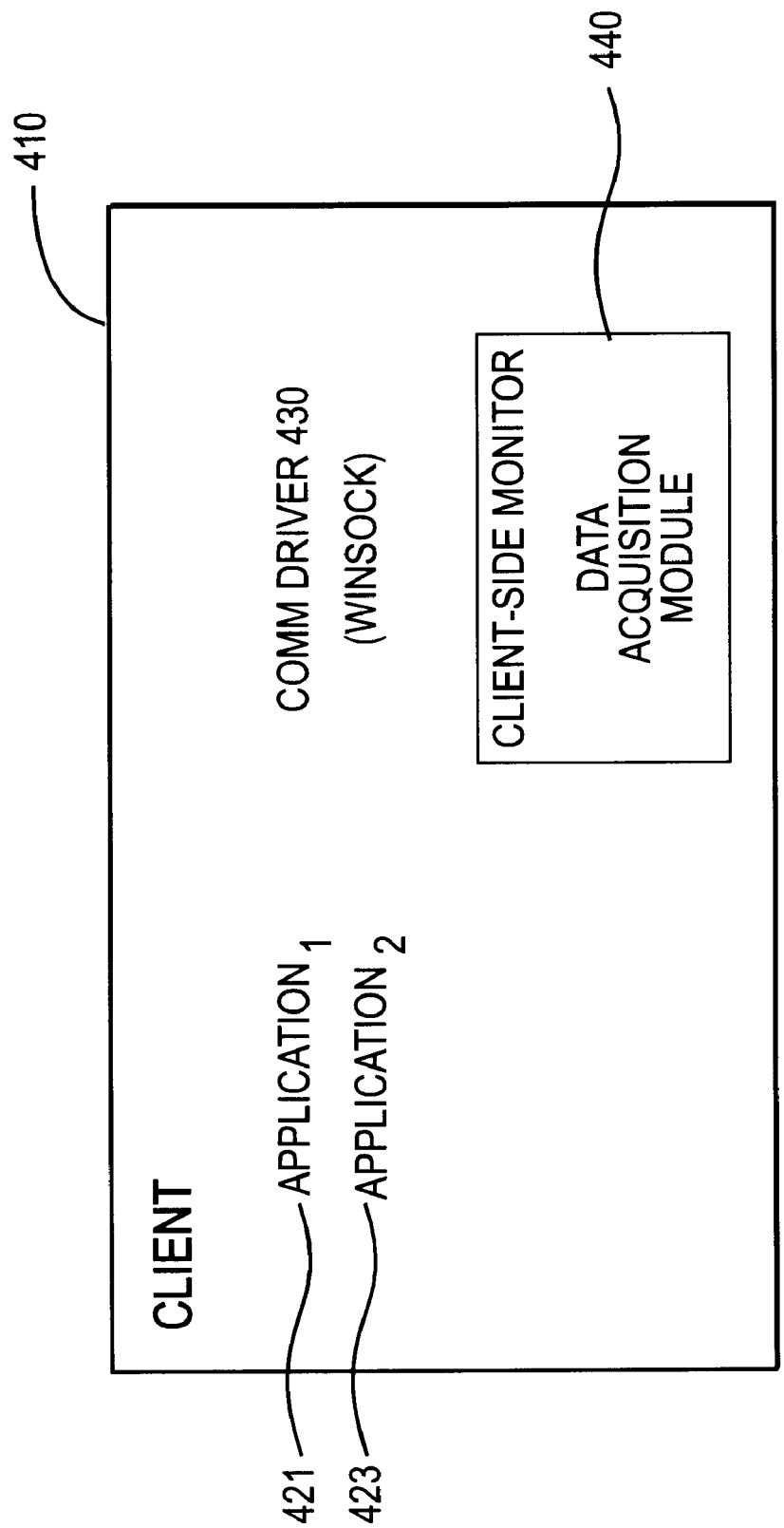
FIG. 4 is a block diagram illustrating client-side operation of the system.

With reference to FIG. 4, client-side operation of the system is shown in further detail. As shown in FIG. 4 for client 410, a given client generally includes one or more applications (e.g., applications 421, 423) which require Internet access. A Web browser (e.g., Netscape Navigator™ or Microsoft Internet Explorer™ browser software) is but one of a multitude of such applications. Each application, in turn, communicates directly with a client-side communication driver, such as Winsock driver 430—a Windows implementation and encapsulation of TCP/IP.

The client 410 includes a client-side monitor—data acquistion module 440—which "hooks into" the communication driver 430. In the instance of Windows Winsock communication driver, for example, a process can hook into the driver using Winsock VxD extensions. As the various applications submit requests to the communication driver 430, the data acquisition module 440 can intercept the communications for determining whether the request is permitted under the rules. For instance, when a request for access is received from an application, the monitor first verifies that, according to the rules in place, such an application is permitted to access the Internet. Rules currently in force might specify that only particular applications (or particular versions of those applications) can access the Internet; all other applications are denied access. For a Winsock-based implementation, the data acquisition module 440 can, in effect, trap the request at the VxD driver level, thereby effectively blocking the request at the level of the Winsock communication driver.

In addition to checking whether the application itself should have access, the data acquisition module 440 monitors the individual messages which are exchanged between the applications and the communication driver. For instance, the data acquisition module 440 can trap an HTTP "SEND" command generated by an application. By analyzing the message and any accompanying context information, the data acquisition module 440 can determine whether the command is permitted under the rules in place. By examining port address context information provided with the command, for example, the data acquisition module 440 can readily determine the underlying protocol. For Web server access, the data acquisition module 440 would identify HTTP—the underlying protocol used to communicate with the Web. Having determined the protocol, the data acquisition module 440 would verify that the protocol is permitted for the application (or for the client). As an example of a typical rule which might be in place, a supervisor might establish a rule blocking FTP (file transfer protocol) by Web browsers, for preventing users from tying up the network with large FTP file transfers.

The actual flow of messages or message "traffic" monitored by the system is perhaps best illustrated by example. An exemplary use of the system for accessing a Web site generates the following trace of messages.

```
#0000   Msg:    10020024   Process:  ffff38ff    Handle: c307bd1c   open
        Len:    00000016   Address:  82859080
        C:\WINDOWS\SYSTEM.DAT
#0001   Msg:    0002000b   Process:  ffff38ff    Handle: c307bd1c   close
        Size: 00000000:000a752c
#0002   Msg:    00010010   Process:  fffae7b7    Handle: 00000000   socket
#0003   Msg:    00010110   Process:  fffae7b7    Handle: c34075cc   socket-x
#0004   Msg:    80010003   Process:  fffae7b7    Handle: c34075cc   connect
        Family: 0002 Port: 0053 IP: 204.94.129.65
#0005   Msg:    00010103   Process:  fffae7b7    Handle: c34075cc   connect-x
        Family: 0002 Port: 0053 IP: 204.94.129.65
#0006   Msg:    00010004   Process:  fffae7b7    Handle: c34075cc   getpeername
#0007   Msg:    00010104   Process:  fffae7b7    Handle: c34075cc   getpeername-x
#0008   Msg:    0001000d   Process:  fffae7b7    Handle: c34075cc   send
        Family: 0002 Port: 0053 IP: 204.94.129.65
        Len:    00000023   Address:  82859890
        00:
#0009   Msg:    0001010d   Process:  fffae7b7    Handle: c34075cc   send-x
#000a   Msg:    0001000a   Process:  fffae7b7    Handle: 00000000   select_setup
#000b   Msg:    0001010a   Process:  fffae7b7    Handle: 00000000   select_setup-x
#000c   Msg:    0001000b   Process:  fffae7b7    Handle: 00000000   select_cleanup
#000d   Msg:    0001010b   Process:  fffae7b7    Handle: 00000000   select_cleanup-x
#000e   Msg:    80010003   Process:  fffae7b7    Handle: c34075cc   connect
#000f   Msg:    00010103   Process:  fffae7b7    Handle: c34075cc   connect-x
#0010   Msg:    00010004   Process:  fffae7b7    Handle: c34075cc   getpeername
#0011   Msg:    00010104   Process:  fffae7b7    Handle: c34075cc   getpeername-x
        Result: 00002749 WSAENOTCONN
#0012   Msg:    0001000d   Process:  fffae7b7    Handle: c34075cc   send
        Family: 0002 Port: 0053 JP: 204.94.129.66
        Len:    00000023   Address:  8285a290
        00:
#0013   Msg:    0001010d   Process:  fffae7b7    Handle: c3407Scc   send-x
        Family: 0002 Port: 0053 IP: 204.94.129.66
#0014   Msg:    0001000a   Process:  fffae7b7    Handle: 00000000   select_setup
#0015   Msg:    0001010a   Process:  fffae7b7    Handle: 00000000   select_setup-x
#0016   Msg:    0001000b   Process:  fffae7b7    Handle: 00000000   select_cleanup
#0017   Msg:    0001010b   Process:  fffae7b7    Handle: 00000000   select_cleanup-x
#0018   Msg:    00010009   Process:  fffae7b7    Handle: c34075cc   recv
```

-continued

```
#0019  Msg:    00010109  Process:  fffae7b7         Handle:  c34075cc  recv-x
       Len:    000000ad  Address:  8285a990
         00: 00 06 85 80 00 01 00 03 00 02 00 02 03 77 77 77   .............www
         10: 09 77 65 62 6d 6f 6e 6b 65 79 03 63 6f 6d 00 00   .webmonkey.com..
         20: 01 00 01 c0 0c 00 01 00 01 00 00 a8 c0 00 04 cc   ................
         30: 3e 81 13 c0 0c 00 01 00 01 00 00 a8 c0 00 04 cc   >...............
         40: 3e 81 93 c0 0c 00 01 00 01 00 00 a8 c0 00 04 cc   >...............
         50: 3e 83 93 09 77 65 62 6d 6f 6e 6b 65 79 03 63 6f   >...webmonkey.co
         60: 6d 00 00 02 00 01 00 00 a8 c0 00 0f 03 6e 73 31   m............ns1
         70: 08 68 6f 74 77 69 72 65 64 c0 5d c0 53 00 02 00   .hotwired.].S...
         80: 01 00 00 a8 c0 00 06 03 6e 73 32 c0 70 c0 6c 00   ........ns2.p.l.
         90: 01 00 01 00 00 a8 c0 00 04 cc 3e 84 20 c0 87 00   ..........>. ...
         a0: 01 00 01 00 00 a8 c0 00 04 cc 3e 82 7c            ..........>.|
#001a  Msg:    00010002  Process:  fffae7b7         Handle:  c34075cc  closesocket
#001b  Msg:    00010102  Process:  fffae7b7         Handle:  c34075cc  closesocket-x
#001c  Msg:    00010010  Process:  fffae7b7         Handle:  000000CO  socket
#001d  Msg:    00010110  Process:  fffae7b7         Handle:  c34075cc  socket-x
#001e  Msg:    00010007  Process:  fffae7b7         Handle:  c34075cc  ioctisocket
#001f  Msg:    00010107  Process:  fffae7b7         Handle:  c34075cc  ioctlsocket-x
#0020  Msg:    00010001  Process:  fffae7b7         Handle:  c34075cc  bind
#0021  Msg:    0O010101  Process:  fffae7b7         Handle:  c34075cc  bind-x
#0022  Msg:    80010003  Process:  fffae7b7         Handle:  c34075cc  connect
       Family: 0002 Port: 0080 IP: 204.62.129.147
#0023  Msg:    00010103  Process:  fffae7b7         Handle:  c34075cc  connect-x
       Result: 00002733 WSAEWOULDBLOCK
       Family: 0002 Port: 0080 IP: 204.62.129.147
#0024  Msg:    0001000a  Process:  fffae7b7         Handle:  00000000  select_setup
#0025  Msg:    0001010a  Process:  fffae7b7         Handle:  00000000  select_setup-x
#0026  Msg:    0001000b  Process:  fffae7b7         Handle:  0000000a  select_cleanup
#0027  Msg:    0001010b  Process:  fffae7b7         Handle:  00000000  select_cleanup-x
#0028  Msg:    00010009  Process:  fffae7b7         Handle:  c0f005f4  recv
#0029  Msg:    00010109  Process:  fffae7b7         Handle:  c0f00Sf4  recv-x
       Family: 0002 Port: 1028 IP: 127.0.0.1
       Len:    00000001  Address:  8285b990
         00: @
#002a  Msg:    0001000a  Process:  fffae7b7         Handle:  00000000  select_setup
#002b  Msg:    0001010a  Process:  fffae7b7         Handle:  00000000  select_setup-x
#002c  Msg:    0001000b  Process:  fffae7b7         Handle:  00000000  seiect_cleanup
#002d  Msg:    0001010b  Process:  fffae7b7         Handle:  000C0000  select_cleanup-x
#002e  Msg:    0001000e  Process:  fffae7b7         Handle:  c34075cc  setsockopt
#002f  Msg:    0001010e  Process:  fffae7b7         Handle:  c34075cc  setsockopt-x
#0030  Msg:    0001000e  Process:  fffae7b7         Handle:  c34075cc  setsockopt
#0031  Msg:    0001010e  Process:  fffae7b7         Handle:  c3407Scc  setsockopt-x
#0032  Msg:    0001000e  Process:  fffae7b7         Handle:  c34075cc  setsockopt
#0033  Msg:    0001010e  Process:  fffae7b7         Handle:  c34075cc  setsockopt-x
#0034  Msg:    00010004  Process:  fffae7b7         Handle:  c34075cc  getpeername
#0035  Msg:    00010104  Process:  fffae7b7         Handle:  c34075cc  getpeername-x
#0036  Msg:    8801000d  Process:  fffae7b7         Handle:  c34075cc  send
       Family: 0002 Port: 0080 IP: 204.62.129.147
       Len:    0000011d  Address:  c279a3a0
         00: GET / HTTP/1.0
         10: Accept: image/gif, image/x-xbitmap, image/jpeg, image/pjpeg, */*
         52: Accept-Language: en
         67: UA-pixels: 640 x 480
         7b: UA-color: color8
         8d: UA-OS: Windows 95
         a0: UA-CPU: x86
         ad: User-Agent: Mozilla/2.0 (compatible; MSIE 3.01; Windows 95)
         ea: Host: www.webmonkey.com
         03: Connection: Keep-Alive
         1b:
#0037  Msg:    0001010d  Process:  fffae7b7         Handle:  c34075cc  send-x
#0038  Msg:    00010009  Process:  fffae7b7         Handle:  c34075cc  recv
#0039  Msg:    00010109  Process:  fffae7b7         Handle:  c34075cc  recv-x
       Result: 00002733 WSAEWOULDBLOCK
       Family: 0002 Port: 0080 IP: 204.62.129.147
#003a  Msg:    0001000a  Process:  fffae7b7         Handle:  00000000  select_setup
#003b  Msg:    0001010a  Process:  fffae7b7         Handle:  00000000  select_setup-x
#003c  Msg:    0001000b  Prccess:  fffae7b7         Handle:  00000000  select_cleanup
#003d  Msg:    0001010b  Process:  fffae7b7         Handle:  00000000  select_cleanup-x
#003e  Msg:    00010009  Process:  fffae7b7         Handle:  c34075cc  recv
#003f  Msg:    88010109  Process:  fffae7b7         Handle:  c34075cc  recv-x
       Family: 0002 Port: 0080 IP: 204.62.129.147
       Len:    00000149  Address:  c279a544
         00: HTTP/1.0 302 Found
         14: Date: Fri, 03 Jan 1997 23:02:57 GMT
         39: Server: Apache/1.1.1 HotWired/1.0
         5c: Location: http://www.webmonkey.com/webmonkey/
         8b: Content-type: text/html
```

-continued

```
        a4:
        a6: <HEAD><TITLE>Document moved</TITLE></HEAD>
        d1: <BODY><H1>Document moved</H1>
        ef: The document has moved <A
HREF="http://www.webmonkey.com/webmonkey/">here
        38: </A>.<P>
        41: </BODY>
#0040   Msg:    00010009  Process:   fffae7b7   Handle: c34075cc   recv
#0041   Msg:    00010109  Process:   fffae7b7   Handle: c34075cc   recv-x
        Family: 0002 Port: 0080 IP: 204.62.129.147
#0042   Msg:    00010002  Process:   fffae7b7   Handle: c34075cc   closesocket
#0043   Msg:    00010102  Process:   fffae7b7   Handle: c34075cc   closesocket-x
#0044   Msg:    00010010  Process:   fffae7b7   Handle: 00000000   socket
#0045   Msg:    00010110  Process:   fffae7b7   Handle: c34075cc   socket-x
#0046   Msg:    00010007  Process:   fffae7b7   Handle: c34075cc   ioctlsocket
#0047   Msg:    00010107  Process:   fffae7b7   Handle: c3407Scc   ioctlsocket-x
#0048   Msg:    00010001  Process:   fffae7b7   Handle: c34075cc   bind
#0049   Msg:    00010101  Process:   fffae7b7   Handle: c34075cc   bind-x
#004a   Msg:    80010003  Process:   fffae7b7   Handle: c34075cc   connect
        Family: 0002 Port: 0080 IP: 204.62.131.147
#004b   Msg:    00010103  Process:   fffae7b7   Handle: c34075cc   connect-x
        Result: 00002733 WSAEWOULDBLOCK
        Family: 0002 Port: 0080 IP: 204.62.131.147
#004c   Msg:    0001000a  Process:   fffae7b7   Handle: 00000000   select_setup
#004d   Msg:    0001010a  Process:   fffae7b7   Handle: 00000000   select_setup-x
#004e   Msg:    0001000b  Process:   fffae7b7   Handle: 00000000   select_cleanup
#004f   Msg:    0001010b  Process:   fffae7b7   Handle: 00000000   select_cleanup-x
#0050   Msg:    0001000e  Process:   fffae7b7   Handle: c34075cc   setsockopt
#0051   Msg:    0001010e  Process:   fffae7b7   Handle: c34075cc   setsockopt-x
#0052   Msg:    0001000e  Process:   fffae7b7   Handle: c34075cc   setsockopt
#0053   Msg:    0001010e  Process:   fffae7b7   Handle: c34075cc   setsockopt-x
#0054   Msg:    0001000e  Process:   fffae7b7   Handle: c34075cc   setsockopt
#0055   Msg:    0001010e  Process:   fffae7b7   Handle: c34075cc   setsockopt-x
#0056   Msg:    00010004  Process:   fffae7b7   Handle: c34075cc   getpeername
#0057   Msg:    00010104  Process:   fffae7b7   Handle: c34075cc   getpeername-x
#0058   Msg:    8801000d  Process:   fffae7b7   Handle: c34075cc   send
        Family: 0002 Port: 0080 IP: 204.62.131.147
        Len:    00000127  Address:   c279a3a0
     00: GET /webmonkey/ HTTP/1.0
     1a: Accept: image/gif, image/x-xbitmap, image/jpeg, image/pjpeg, */*
     5c: Accept-Language: en
     71: UA-pixels: 640 x 480
     85: UA-color: color8
     97: UA-OS: Windows 95
     aa: UA-CPU: x86
     b7: User-Agent: Mozilla/2.0 (compatible; MSIE 3.01; Windows 95)
     f4: Host: www.webmonkey.com
     0d: Connection: Keep-Alive
     25:
```

As shown, the trace shows commands for "file open" and "file close." This is followed by a command for creating a socket and a command for connecting to a particular site. At this point, for instance, one can discern that the system is using port 53—the DNS port—for looking up an address (IP address) on the Web. In response to this request, the system receives a series of IP addresses, which have been encoded in a particular format. Once the IP address has been received by the system, the particular Internet application making the request can now issue various commands (e.g., HTTP "GET" command) for retrieving information from a particular Web site. In response to these requests, the corresponding server at the Web site sends appropriate responses, including transmitting requested content. Since the system of the present invention monitors the message traffic at the level of individual messages, the system is able to selectively block access, as dictated by the configurable rules.

For determining whether the requested access of the client's application is accessing a permitted site, the data acquisition module 440 examines the IP address for the site which the application seeks to communicate with and compares that address against a list of allowed addresses (or conversely against a list of disallowed addresses). Certain sites can have multiple IP addresses. Accordingly, the system of the present invention stores the IP addresses with the respective Web sites, so that a particular site can be resolved at the level of its individual IP addresses. In this manner, the system of the present invention permits access based either on a Web site name (e.g., www.cnn.com) or based on a particular IP address.

Figure 5:
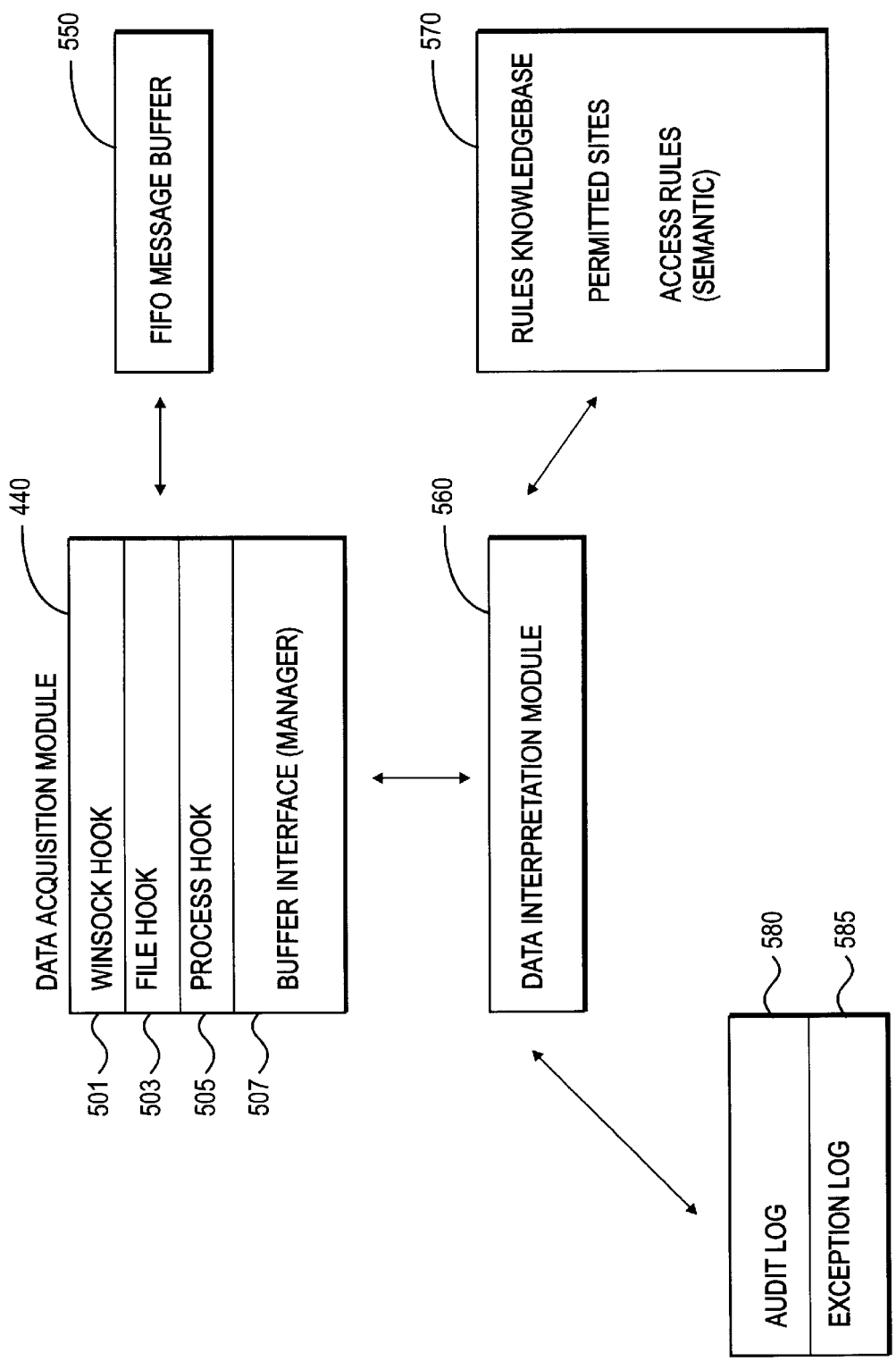
FIG. 5 is a block diagram illustrating a client-side monitor or data acquisition module.

As shown in FIG. 5, the monitor or data acquisition module 440, which is preferably implemented as a Windows VxD driver, includes the following subcomponents. Winsock Hook 501 includes functionality for connecting or "hooking" into the Winsock communication driver. File Hook 503, in a similar manner, includes functionality allowing the driver 440 to hook into the file subsystem provided by the underlying operating system. Process Hook 505, another subcomponent which hooks into the underlying operating system, tracks all currently-executing applications or processes. All of these hooks, as implemented in a Windows VxD, are capable of executing at ring 0—that is, execution at the highest privileged level of the operating system.

Also shown, the module 440 includes a buffer interface (manager) 507 which interfaces directly with a client system-maintained FIFO (first-in, first-out) message buffer 550. The message buffer 550 comprises an array of messages maintained in a fixed-size (i.e., pre-allocated) block of client memory. The buffer 550 itself is shared between the data acquisition module 440 and the various other executing applications. In a preferred embodiment, the data acquisition module 440 utilizes the shared message buffer 550, so that the module itself need not undertake various allocation/deallocation operations (which might degrade performance).

Actual access to individual messages within the buffer is achieved by mapping globally-accessible selectors, thus permitting the data acquisition module 440 with the ability to access individual messages (and content thereof) within the message buffer 550. With direct access to the underlying messages themselves, the data acquisition module can patch (i.e., modify) dynamically at runtime the content of various messages. For instance, a request to access a particular Web site can be patched to instead redirect that request to another site. More generally, since the module 440 can trap individual messages, individual messages can be modified in an arbitrary manner according to the rules in place, including disallowing (i.e., blocking) specific messages.

Actual interpretation of individual messages is performed by data interpretation module 560 which co-exists with the data acquisition module 440. The data interpretation module 560, which communicates directly with the data acquisition module 440, keeps track of all currently-executing processes. To intelligently determine the action which it should undertake for a given message, the module 560 refers to a rules database or knowledgebase 570. Here, the various rules which define permitted activity in the Internet-based system are stored in a format which is readily accessible by the data interpretation module 560. Contained within the rules database 570 are individual databases fully characterizing the administrator-specified rules for the system. When the data interpretation module 560 is first loaded at a given client machine, it attempts to download from the supervisor module into its local knowledgebase 570 a copy of those system rules pertinent to the client. In the event that such a copy is not available (or has not changed since last download), the data interpretation module 560 employs the last downloaded local copy.

Finally, the data interpretation module 560 maintains log information, including an audit (transaction) log 580 and an exception log 585. The former provides a time-sequence log of messages processed by the system; the latter provides a time-sequence log of exceptions (e.g., access violations attempted by users) which have occurred in the system.

3. ISP-based embodiment

Although the previously-described embodiment focuses on monitoring LAN-based access to the Internet and other WANs, the present invention can alternately be implemented for establishing a monitoring and filtering system for Internet Service Providers (ISPs) or similar organizations. This allows ISPs to offer their users a tamper-proof, safe, and managed access to the Internet and protects the users from many security threats. It enables users to control how, when, and who accesses the Internet with their account.

Figure 3B:
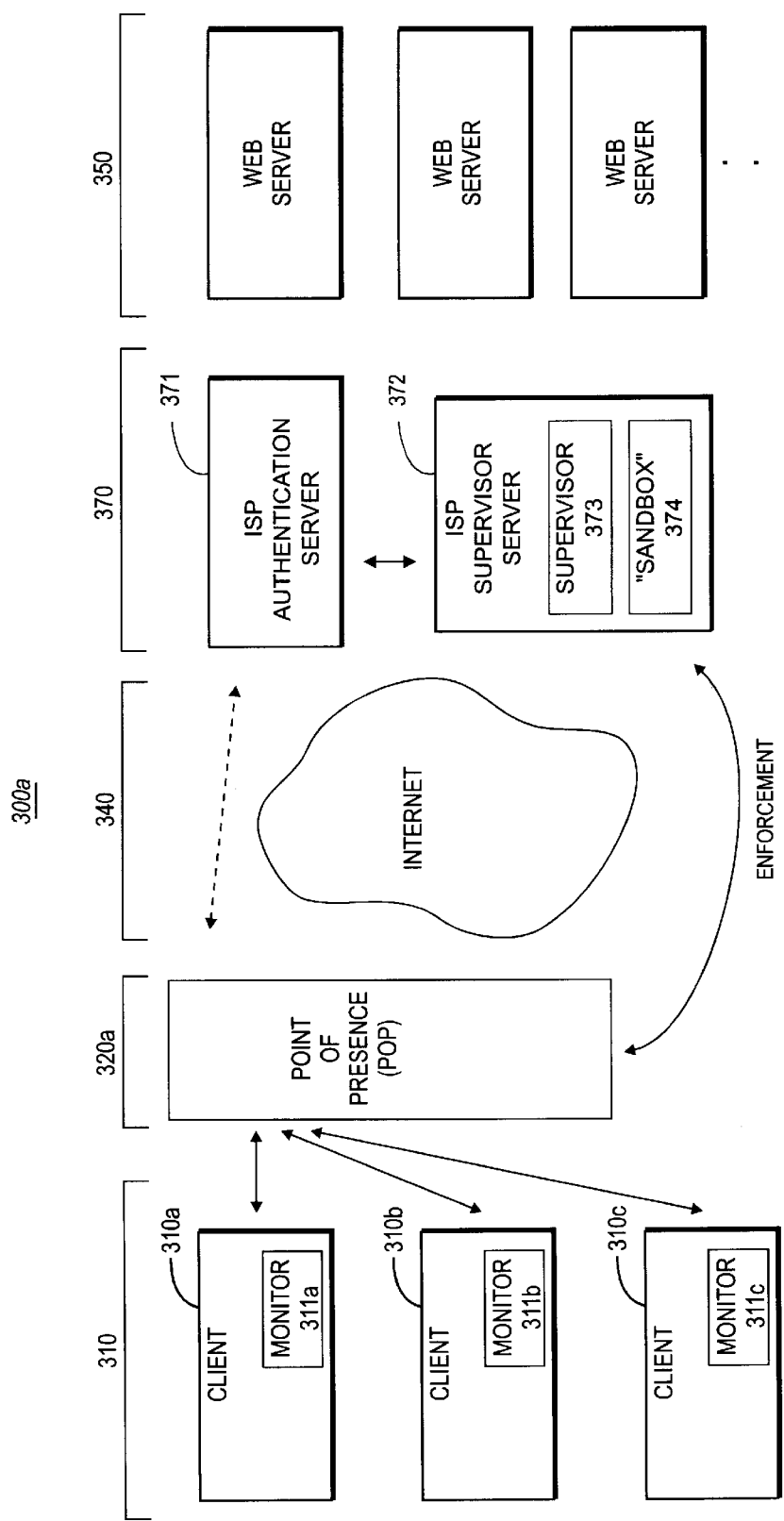

FIG. 3B illustrates certain modifications to the system 300 (of FIG. 3A) for creating the alternative embodiment, shown as system 300a. Most ISPs use decentralized installations called Points-Of-Presence (POPs), such as POP 320a. These installations comprises a series of modems to connect to client PCs or client LANs, a server or LAN, and one or more router to connect the installation to the Internet (normally via high-speed dedicated lines). ISPs normally have one or more POPs in the areas that they serve. When a user dials into a POP (e.g., using a protocol such as SLIP), the POP server in return contacts the central ISP authentication server either via the Internet or a dedicated line. The central authentication server checks the user's ID and password and signals the POP server whether the user is allowed or denied access to the Internet. If the user is allowed to access the Internet, the POP enables the access autonomously without further involvement of central ISP servers.

In this alternate embodiment, the ISP installs an additional central server component 370 to host the central supervisor application; this new component comprises an ISP authentication server 371 and an ISP supervisor server 372 (which includes a central supervisor application 373). After the central ISP authentication server 371 has established the authenticity of the user, it contacts the central supervisor application 373 in order to find out if the user has established additional access monitoring services. In such a case, the ISP authentication server 371 signals the POP server 320a to only allow limited access to the Internet and redirect all requests to a "Sandbox" server application, shown at 374, on the central supervisor server 372. This "Sandbox" server 374 restricts the client's Internet access to a very limited account maintenance site.

The Client Monitor on the client PC (e.g., monitor 311a) monitors the log-on process. Once the limited access to the Internet is established, the monitor contacts the central supervisor application 373 on the ISP supervisor server 372 in order to receive access rules and other required components. Once the central supervisor application 373 is satisfied that the Client Monitor has received the appropriate access rules and is working satisfactorily, it contacts the POP server 320a to signal that the user now has full Internet access. The central supervisor application 373 will continue to check the Client Monitor and, in case of any problems, signals the POP server 320a to fall back to limited access to the Internet.

If the user does not have a Client Monitor installed, or the Client Monitor is not functioning or has been tampered with, the user will only have access to the "Sandbox" server 374. The user will not gain access to the rest of the Internet until the user downloads the Client Monitor component from the "Sandbox" server 374 or otherwise reinstall the Client Monitor application.

C. Preferred user interface

1. General

Figure 6A:
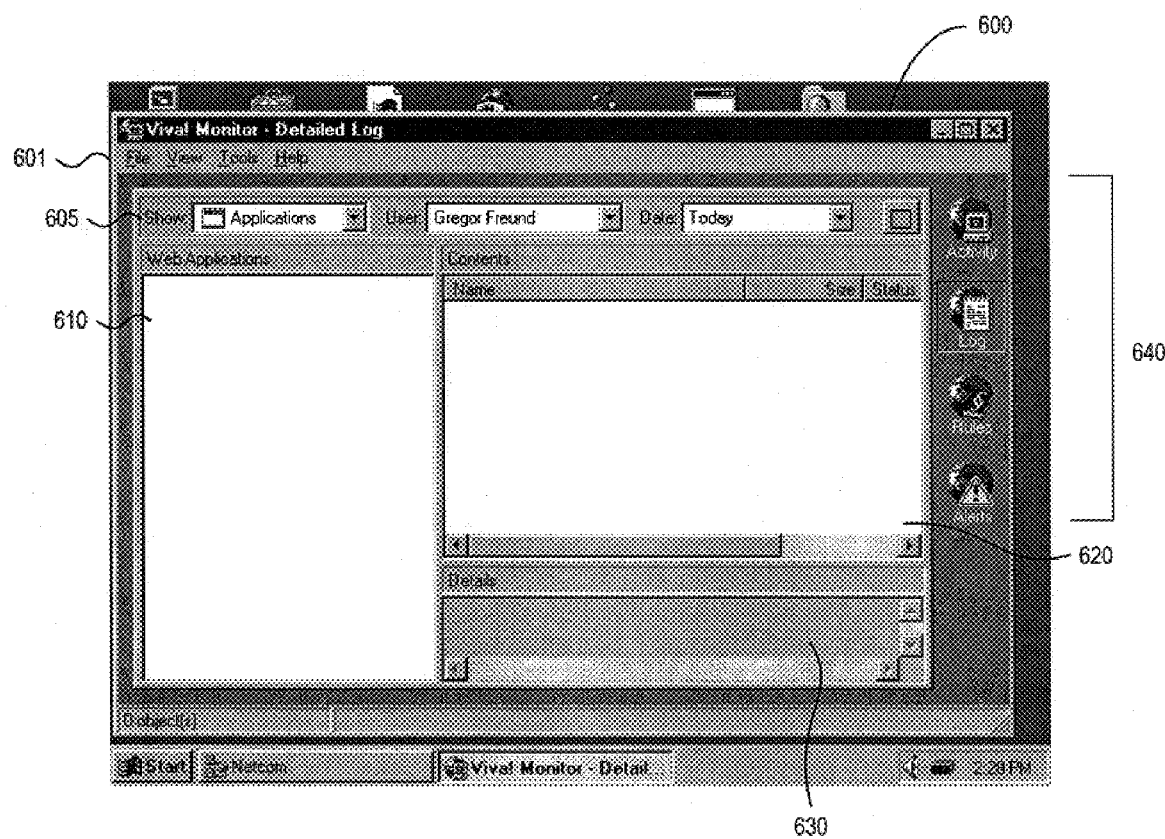
FIGS. 6A–E are bitmap screenshots illustrating a preferred user interface provided by the client-side monitoring component of the present invention.

The client-side monitoring component provides a preferred user interface 600, as shown in FIG. 6A. The interface 600 serves to display the user's current Internet activity and/or past log. As illustrated, the interface 600 includes a main menu 601, a selection or tool bar 605, a Web applications panel 610, a contents panel 620, and a details panel 630. The tool bar 605 provides a display filtering mechanism, affecting the actual information displayed by the various panels. For instance, the user can employ the tool bar 605 for selecting what type of information to show (e.g., applications), which user the system should display information for (e.g., the current user or another named user), and what time frame is of interest to the user (e.g., "today"). Selection icons 640, positioned along one side of the interface 600, provide one-click access to user commands (which correspond to those available from the menu 601).

Figure 6B:
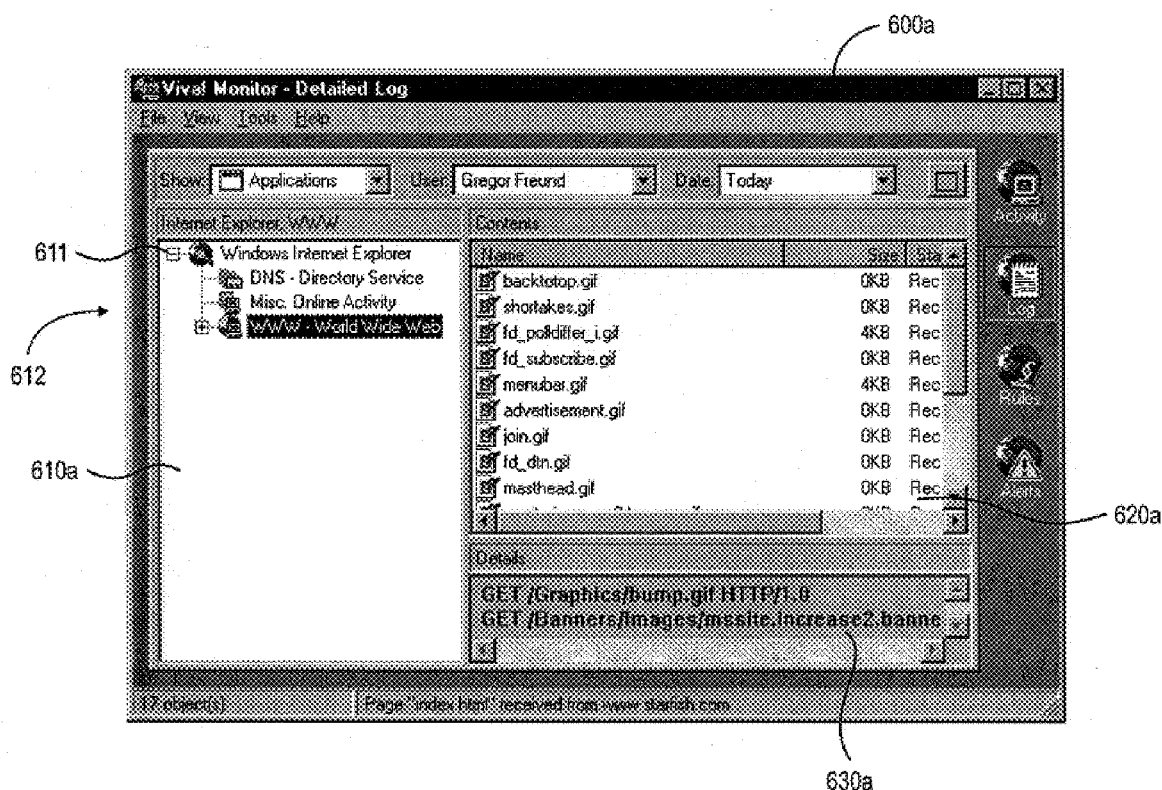

FIG. 6B illustrates appearance of the interface 600 (now 600a) during operation of a Web browser (e.g., Netscape Navigator™ or Microsoft Internet Explorer™ browser software). The applications panel 610 (now 610a) shows the currently-executing applications or processes. As shown at 611, current Web processes for this example include Internet Explorer. In the currently-preferred embodiment, processes are illustrated in an outline (hierarchical) view, with individual processes represented by nodes of the outline. Upon the user selecting to expand an application node (e.g., by clicking on node 611), the system, in response, displays dependent or child nodes representing protocols employed by that application. For the application node 611, for instance, the system displays child nodes 612.

Figure 6C:
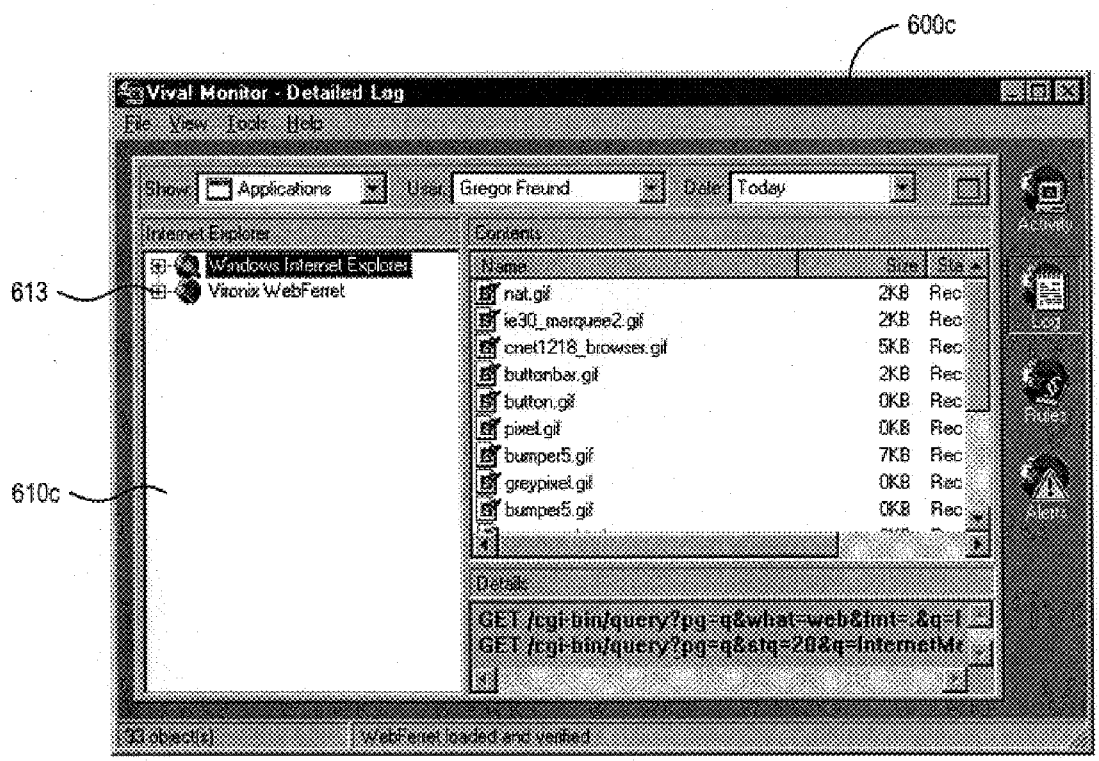

In a corresponding manner, the contents panel 620 and the details panel 630 provide further information for the currently-selected application or process. Specifically, the contents panel 620 (now shown as 620a) displays the details (contents) which comprise the Web object (e.g., Web page) selected by the user (e.g., from a Web browser). In conjunction with this contents view, the details panel 630 (now shown at 630a) displays a details or transaction list—a list of transactions (e.g., HTTP commands) which have occurred for the currently-selected Web object. In the example shown in FIG. 6B, for instance, the display transactions include HTTP "GET" commands, for getting (fetching) various bitmaps which comprise the Web page currently viewed in the browser. FIG. 6C illustrates appearance of the interface 600 (now 600c) as additional Web processes are launched. For instance, the applications panel 610 (now 610c) displays a new node 613, for indicating the new executing process, here WebFerret (a search utility application).

Figure 6D:
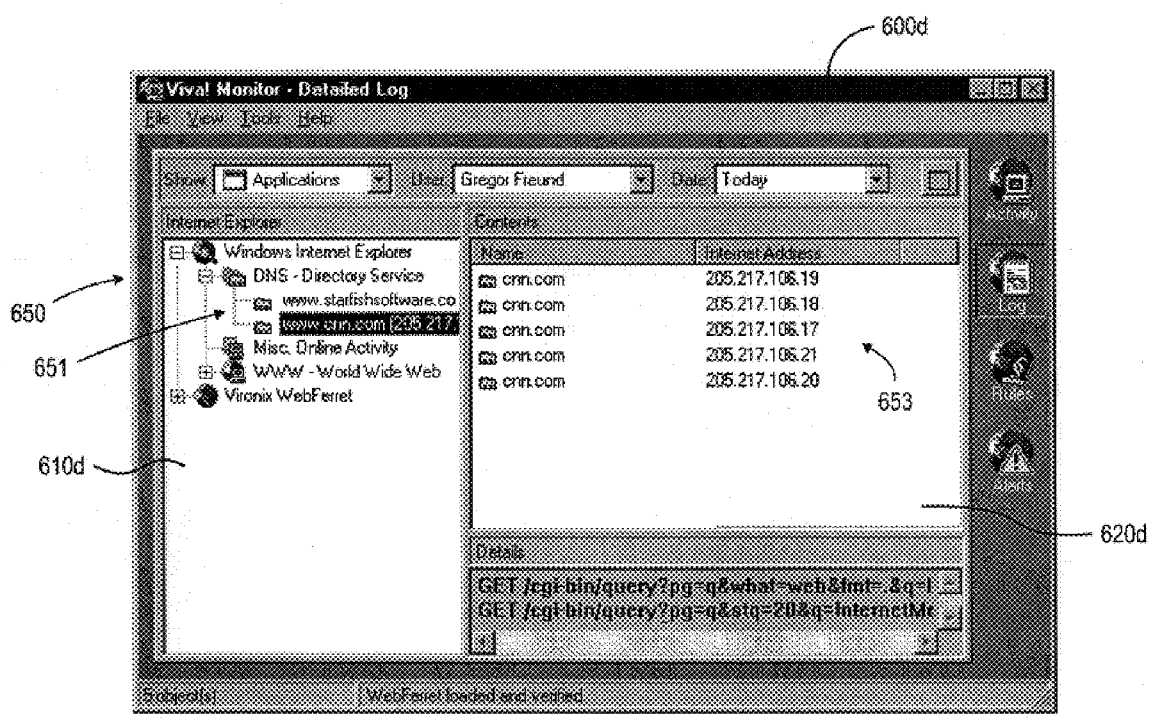

Using the current example of a system executing Internet Explorer and WebFerret, operation of the interface 600 for monitoring protocols will now be illustrated. FIG. 6D illustrates the interface 600 (now 600d) with full expansion of the "DNS" protocol node 650, as shown in the applications panel 610 (now 610d). The DNS or Directory Name Service protocol is the main protocol employed to look up the address of a name (i.e., "www.cnn.com") on the Internet. For the current example, the user has "visited" two Web sites: Starfish Software (www.starfishsoftware.com) and CNN (www.cnn.com). These are illustrated as children nodes 651, which depend from (i.e., hang off of) the DNS node 650. Upon the user selecting a particular one of the dependent nodes 651, the interface 600d displays corresponding information in the contents panel 620d. For the particular example of a DNS-based Web name of www.cnn.com, the contents panel 620d displays corresponding Internet addresses, as shown at 653. In this specific example, the CNN Web site has five Internet or IP (Internet protocol) addresses.

During system operation, therefore, the Internet monitor performs monitoring of different types of Internet access protocols. Support for any given type of access protocol is provided via a dynamically-loaded driver. For instance, the system includes driver supporting HTTP, FTP, SMTP, and POP3 protocols. Other drivers are provided for different content types, for instance, supporting parsing of HTTP files, executable files, ZIP files, ActiveX controls, or Java classes. Each driver is responsible for monitoring and filtering access for its particular type, including ensuring that any user activity which employs that access type conforms to any rules or conditions specified for the Internet monitor.

Figure 6E:
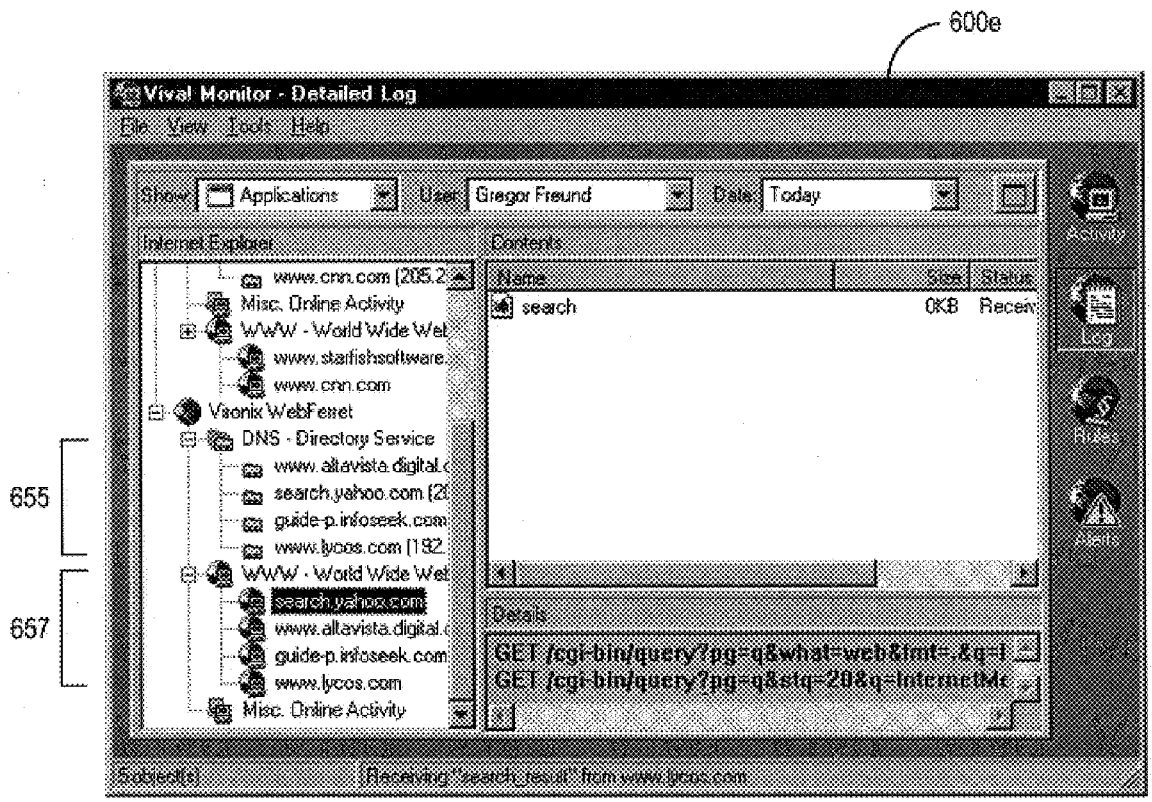

FIG. 6E illustrates operation of the interface 600 (now 600e) for the WebFerret application. As shown at 655, the application employs the DNS protocol for looking up the addresses of several Web search engines, including Alta Vista™, Yahoo™, Infoseek™, and Lycos™ search engines. In a corresponding manner, as indicated at 657, the WebFerret application employs World Wide Web protocol (HTTP) for communicating with each of the foregoing Web search engines.

2. Rule wizard interface

The system allows user (e.g., administrator) configuration of rules which govern use of the protocols monitored by the system. For instance, an administrator can establish a rule based on a particular application, such as a rule presenting Internet access by a real audio player application (ra32.exe). Rules can also be established on the basis of including and/or excluding access to particular Internet sites. For instance, an administrator can establish a rule allowing users to only access a limited number of approved sites. On the other hand, the administrator can set a rule blocking user access to particular sites (e.g., pornographic sites). Rules can also be set which are time-based in nature. For instance, an administrator can establish a rule setting a time limit (e.g., 30 minutes) for how long a user can access the Internet each day. More important in the business environment, the system allows such a time limit to be set according to a user's "active" use of the Internet.

Figure 7A:
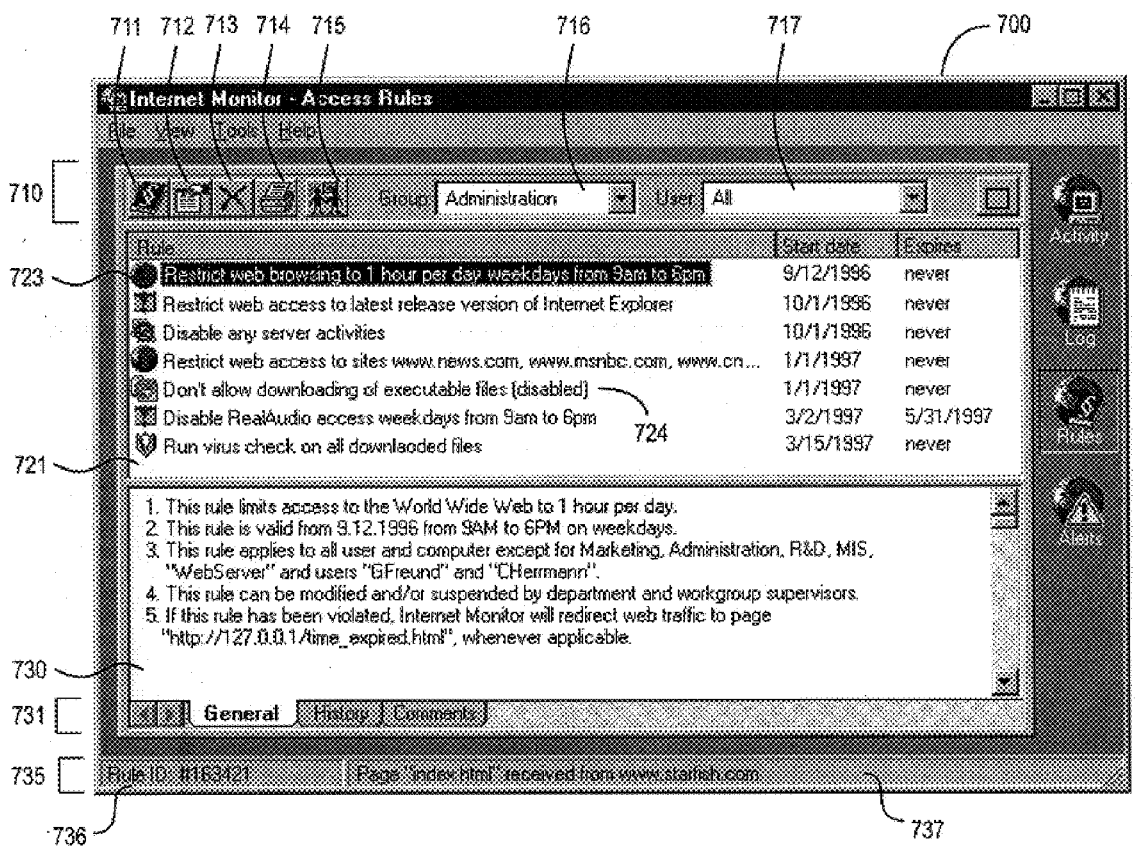

FIGS. 7A–K illustrate a preferred user interface or "wizard" dialogs for configuring rules. As shown in FIG. 7A, a preferred interface 700 provides a "view" of rules governing operation of the Internet access monitor, displaying all of the rules which are available for a current configuration. As shown, the interface 700 includes a toolbar 710 having the following buttons. Button 711 allows the user to create a new rule. Button 712 allows the user to edit an existing rule. Button 713 allows the user to delete a rule. Button 714 allows the user to print out a hard copy of a rule. Finally, button 715 allows the user to group rules together (i.e., into user-defined groups). The toolbar 710 also includes a group list field 716 and a user list field 717. Together, these fields allow the user to manage groups of computers and/or groups of users.

Below the toolbar 710 is a rule panel 721 which lists the current rules in place for the system (for the currently-selected group). For each rule, the rule panel 721 displays a description, a start date, and an expiration date (if any). In this fashion, individual rules can be presented in a self-explanatory manner. For instance, rule 723 specifies that Web browsing is restricted to one hour per day for weekdays, from 9 a.m. to 6 p.m. The rule, which has a start day of Sep. 12, 1996, is currently configured to never expire. The rule panel 721 displays all rules, whether they are created by the system administrator or a group manager, or pre-existing (default) rules provided by the system. Enforcement of any given rule can be suspended by "disabling" the rule, such as shown at 724.

Below the rule panel 721, the interface 700 includes a rule details panel 730. As illustrated by tabs 731, the panel 730 itself includes the following pages: general, history, and comment. The details panel 730 provides detail information for the particular rule which is currently selected in the panel 721. For the rule 723 as the currently selected rule, for instance, the panel 730 displays on its "general" page detail information which describes general features of the rule. On the "history" page (not shown), the panel 730 displays history/revision information for the selected rule. In a similar manner, on the "comments" page (not shown), the panel 730 provides any comments which the user has entered for the rule. The interface 700 also includes a status bar 735 which displays, at 736, a rule ID (internally-maintained identifier) for the currently-selected rule. The ID is employed internally for tracking and cross referencing rules. The status bar 735 also displays current on-line activity at 737, such as a status message indicating which objects are currently being received from a Web site.

Figure 7B:
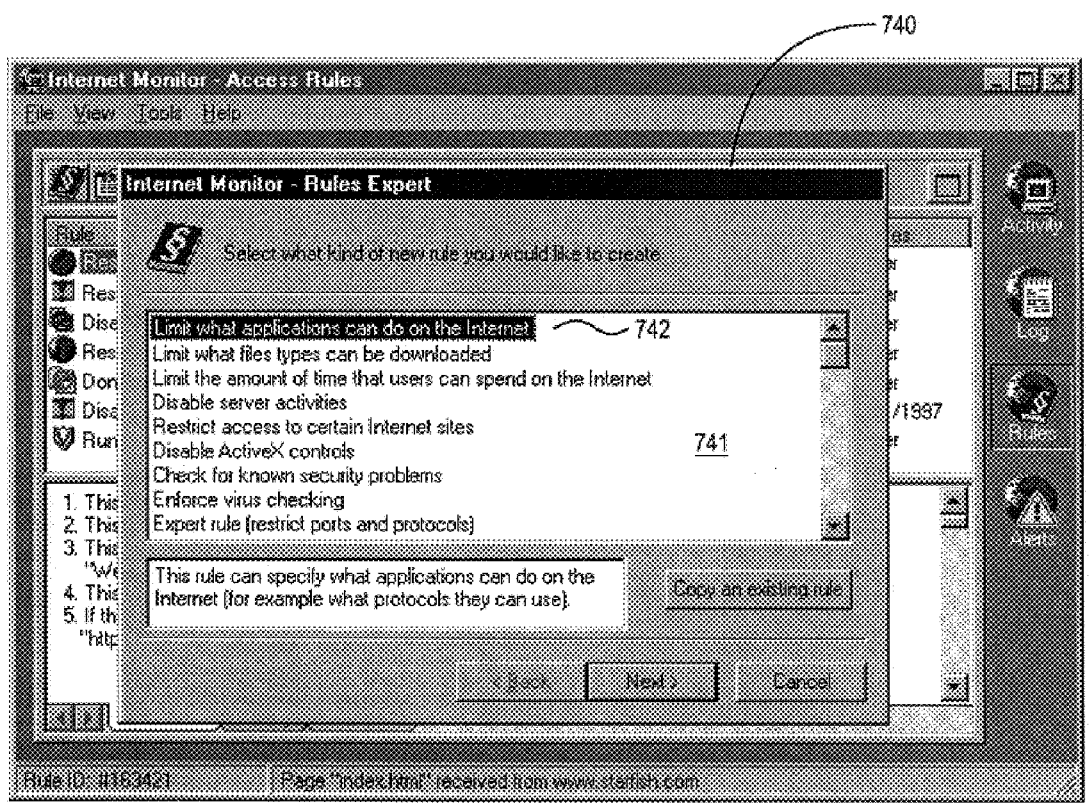

Operation of the interface 700 will now be described by demonstrating the user task of creating a new rule. The user begins the process by selecting "new rule" button 711. In response, the system displays rules expert or wizard dialog 740, as shown in FIG. 7B. At the outset, the wizard dialog 740 asks the user what kind or type of new rule should be created. Generally, any given rule is a combination of access rights granted on the basis of available applications, permitted time limits, permitted user activities, permitted protocols, and the like. At the outset, the system provides pre-defined or "canned" rules which pre-package access rights (based on common combinations of the foregoing attributes). The wizard dialog 740 provides a list 741 of rule types currently defined for the system. As shown, for instance, the user can select type 742 for limiting what applications (including individual applications) can do on the Internet.

Figure 7C:
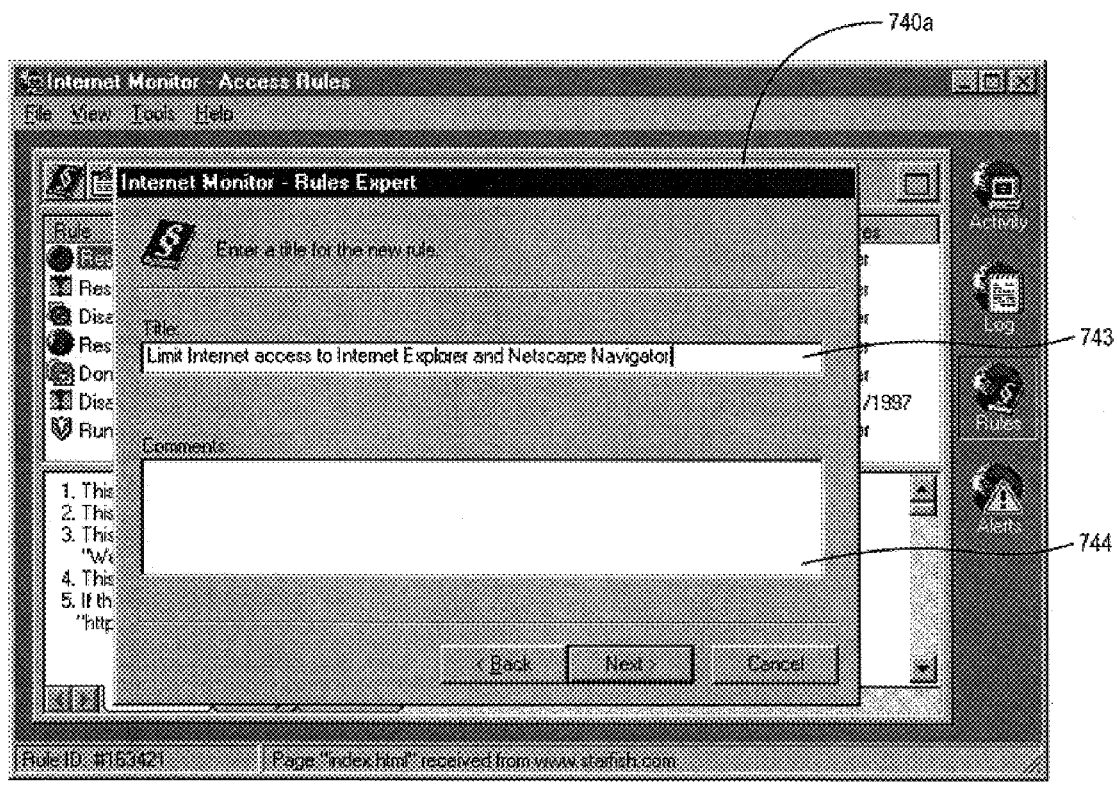
Figure 7D:
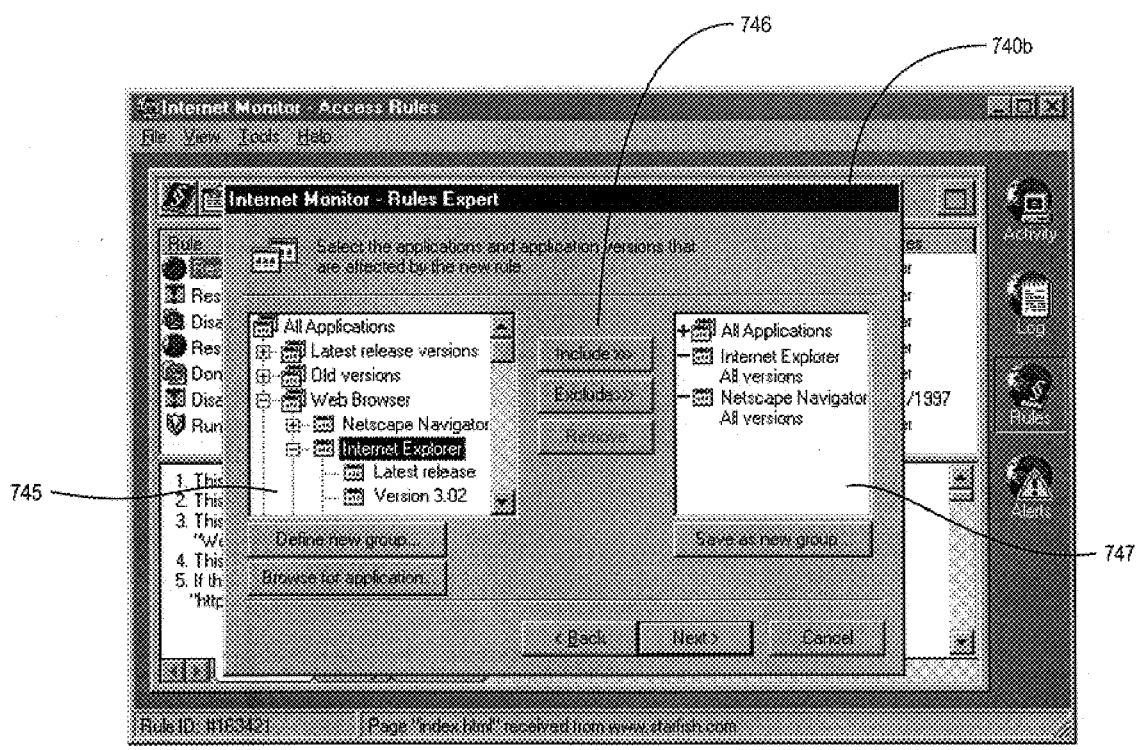

After selecting a rule type, the user proceeds to the next pane or page of the wizard dialog (by clicking the "next" button). As shown in FIG. 7C, the wizard dialog 740 (now 740a) displays a "title" edit field 743 and a "comments" edit field 744. Here, the user can enter information for the title and comments, respectively.

Proceeding to the next page, the wizard dialog 740 (now 740b) displays an outline list 745 of all applications known to the system. Using include/exclude buttons 746, the user can instruct the system to selectively include or exclude applications (and versions thereof) which are to be affected by the new rule. The user's current selection is displayed at application list 747. The applications affected by a given list are the cumulative sum of the applications on the list. For instance, list 747 indicates that all applications are added to the list except for Internet Explorer and Netscape Navigator (as these have been excluded from the list). If desired, the user can save a particular list as a user-defined group. For the list shown at 747, for example, the user could save the list as "All applications except Web browsers."

Note also that the applications outline 745 provides a version-based list of applications. Under "Internet Explorer," for instance, the outline displays "latest release," "version 3.02," and subsequent prior versions (not shown). By tracking applications on a per version basis, the system can selectively enforce rules against individual versions of an application. Versions 3.01 and 3.00 of Microsoft's Internet Explorer™ browser software, for instance, have known security flaws. Using a per-version rule in accordance with the present invention, the user can create a rule blocking Internet access for Internet Explorer versions 3.01 and 3.00, yet allow access for other versions (e.g., version 3.02).

Internally, the system defines "latest release" and "all versions" for each application. "Latest release" represents the most recent version of a given application. As each new version of an application is released, "latest release" is automatically updated to that most recent release. "All versions" is defined internally, in contrast, to simply include all versions of a given application.

Figure 7E:
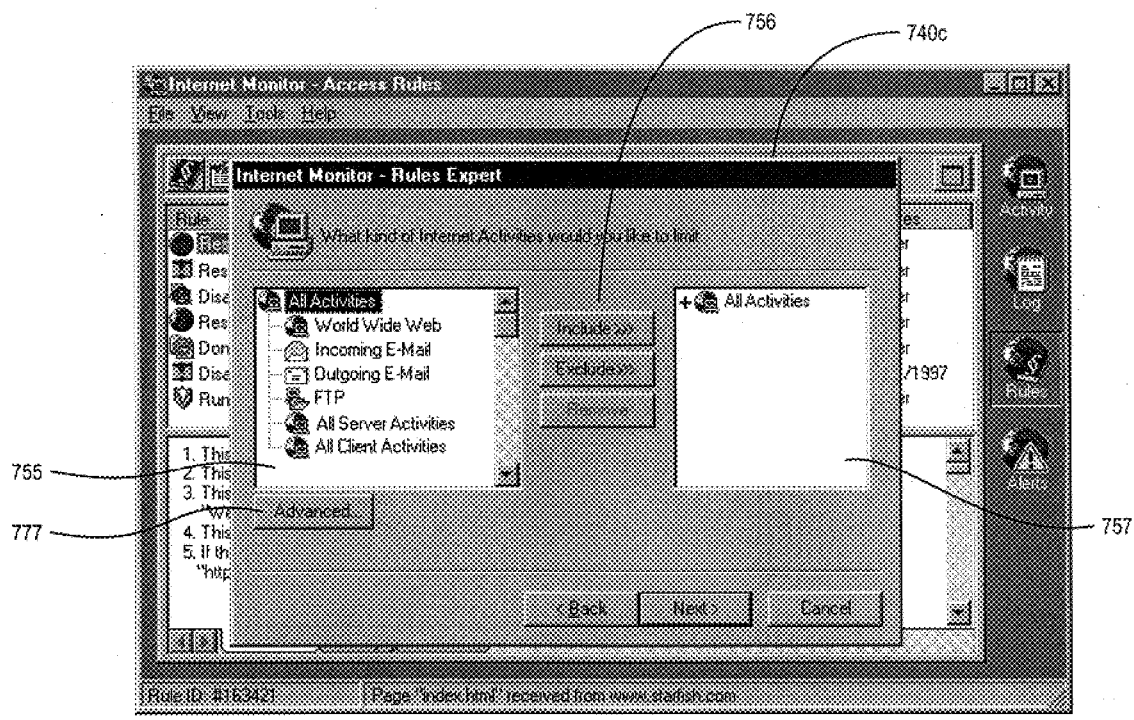

After specifying which application or applications (and versions thereof) should be affected by the new rule, the user proceeds to specify which activities are to be limited. As illustrated in FIG. 7E, the wizard dialog 740 (now 740c) includes an activity pane which allows the user to select one or more activities limited by the new rule. In a manner similar to that described for selecting applications, activities are selected from an outline list 755 for inclusion or exclusion, by using include/exclude buttons 756. Again, the user creates a set representing the sum of included or excluded activities; these are displayed by outline list 757. In an exemplary embodiment, the system provides default activities which can be limited, including, for instance, Worldwide Web (Internet) activity, receiving incoming e-mail, and sending outgoing e-mail. The limitation on outgoing e-mail can be employed, for example, to prevent unknown "spy" applications from using e-mail services (e.g., Microsoft MAPI) to steal confidential information from the user's system. Note that a firewall, in contrast, cannot provide an effective defense against such spy applications, because firewalls do not have the capability to understand the underlying applications. For the new rule being created for the example at hand, all activities have been restricted for all applications except Internet Explorer™ browser software (all versions) and Netscape Navigator™ browser software (all versions).

Also shown, the wizard dialog 740c includes an "advance" button 777 which allows the user to define his or her own activities. The user-defined activities are defined based on Internet port, address families, and the like. In this manner, the user can create his or her own Internet access activities for use in rules.

Figure 7F:
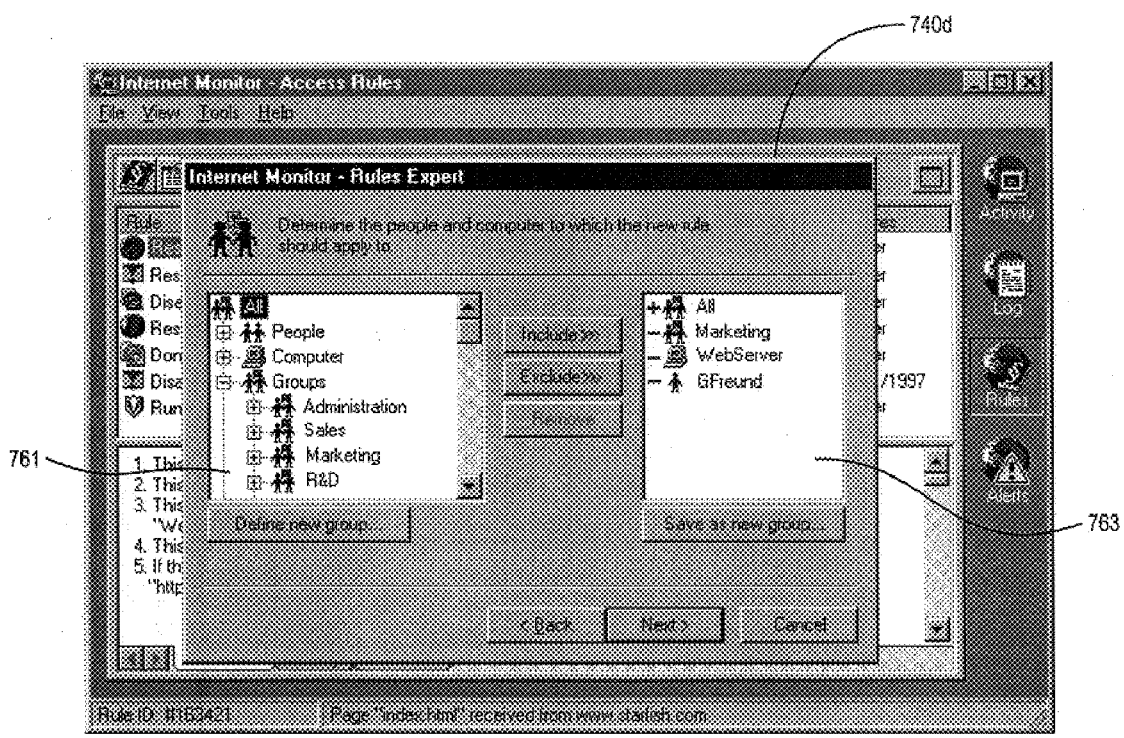

The user is now ready to specify to which people and/or to which computers the new rule is to apply. As shown in FIG. 7F, the wizard dialog 740 (now 740d) includes a pane which allows the user to define a set which includes or excludes people, computers, and/or groups thereof. In a manner to that previously described for defining activities and for specifying applications, the pane includes an outline list 761 from which the user can select to include or exclude items. People, computers, and groups which have been included or excluded are displayed on the right hand side of the dialog, by list 763. As before, the list is a set representing the cumulative sum of items which have been included or excluded.

"People" represent individual users who can log on to the system (from one or more computers). A "computer", on the other hand, represents an individual workstation or other device connected to the system; typically, such a device has a unique IP address assigned to it. A "group" represents a set which includes or excludes certain people and/or computers. This approach permits the system to allow a Web server (a device), for instance, to have unlimited Internet access regardless of which user is logged onto that computer. At the same time, the system can prevent a given user from undertaking certain activity, regardless of which computer that user has logged onto. By using groups, the user can conveniently encapsulate certain people or computers (or subgroups thereof) into a user-specified group, such as a "marketing" group. For the new rule of the example at hand, the rule disallows Internet access for all applications except Internet Explorer™ and Netscape Navigator™ browser software for all users and computers except for the marketing group, the Web server computer, and one individual (the user having username of gfreund).

Figure 7G:
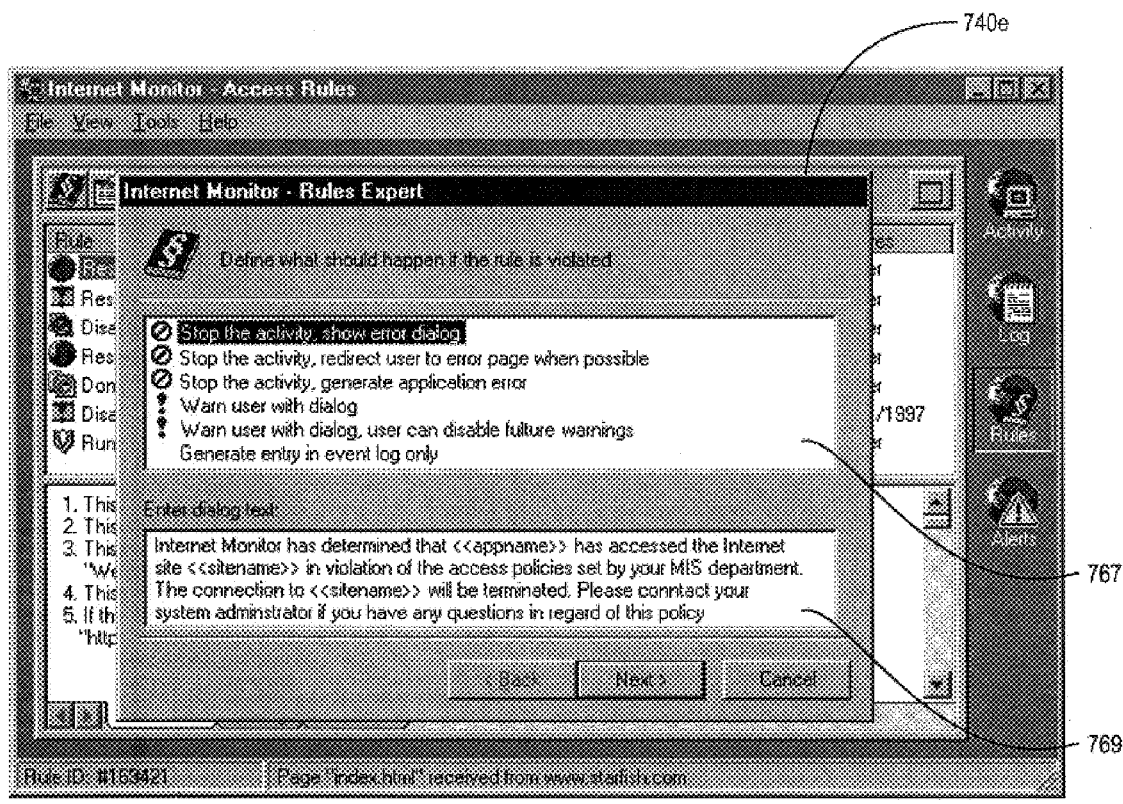

FIG. 7G illustrates the next pane of the wizard dialog 740 (now 740e). Here, the wizard dialog 740 displays a selection of actions 767 which the system should undertake in the event of an attempted rule violation. Choices include, for instance, stopping the activity and showing an error dialog, stopping the activity and redirecting the user to an error page (when possible), stopping the activity and generating an application error, and the like. Additionally, the user can specify at this point that the system should generate an entry in a system alert or error log. This last option is helpful, for instance, when the access monitor is first deployed; this allows the system administrator to establish a log of potential rule violations before he or she decides to activate rule enforcement. For those response actions associated with a dialog, the wizard dialog provides a dialog text field 769 for entering messages. Messages can include tags or macros for allowing certain text to be specified at runtime, such as replacing <application name> or <Web site name> with the current application name or Web site name, respectively, for the instant rule being violated.

Figure 7H:
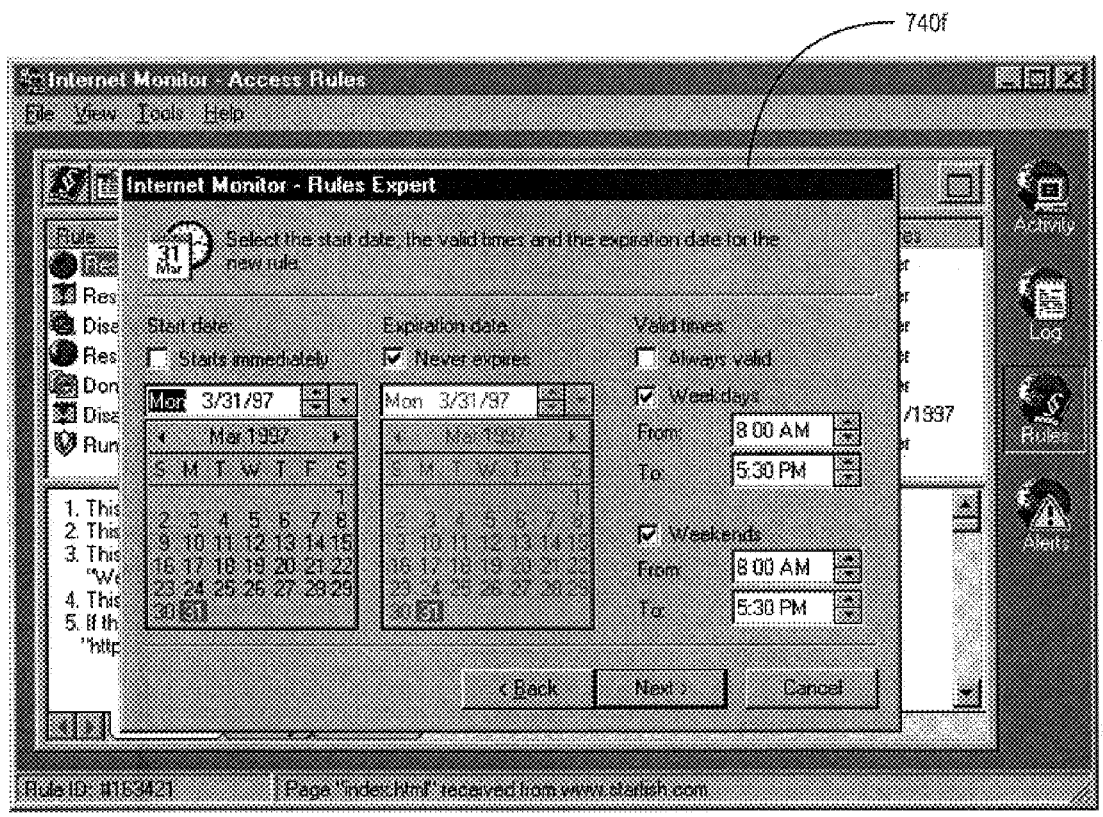
Figure 71:
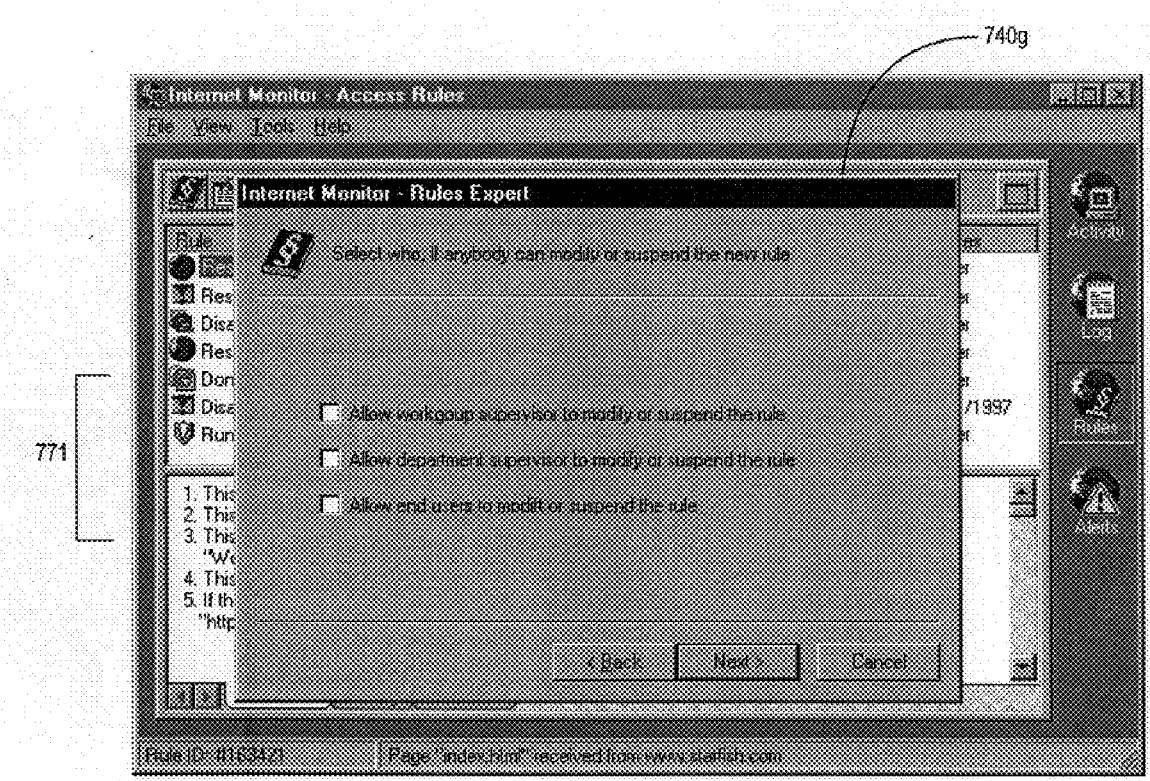

As illustrated in FIG. 7H, the wizard dialog 740 (now 740f) includes a start date/expiration date pane. Here, the user can specify the start date and expiration date (if any) for the new rule being created. Further, the user can also specify particular time intervals (e.g., during weekdays and/or during weekends) when the rule is enforced. This allows an administrator, for instance, to specify that a rule blocking a RealAudio application remains in force during working hours on weekdays—that is, at times when network traffic is already congested. At other times, however, the rule is not enforced. For the example shown in FIG. 7H, the rule has a start date of Mar. 31, 1997 and never expires; the rule is enforced weekdays and weekends from 8 a.m. to 5:30 p.m.

As shown in FIG. 7I, the wizard dialog 740 (now 740g) includes a pane allowing the user to specify "who," if anybody, can modify or suspend the new rule. Recall that, in general, rules will be modified by a system administrator or by workgroup or department supervisors. Additionally, however, an end user might be in a position to modify or suspend rules, particularly for those rules which the end user has created to control Internet access by applications on his or her system. In this manner, the system of the present invention allows rules to be modified in a distributed manner. Thus, an organization can control network use (through Internet access) along organizational or personnel structures, without requiring involvement of IS personnel. Accordingly, the dialog 740g provides check boxes 771 permitting the new rule to be modified or suspended by: (1) a workgroup supervisor, (2) a department supervisor, and/or (3) end users. For the present example, since none of the check boxes have been "checked," the new rule cannot be modified by anyone other than the user who has authority to create new system-wide rules (e.g., system administrator).

Figure 7J:
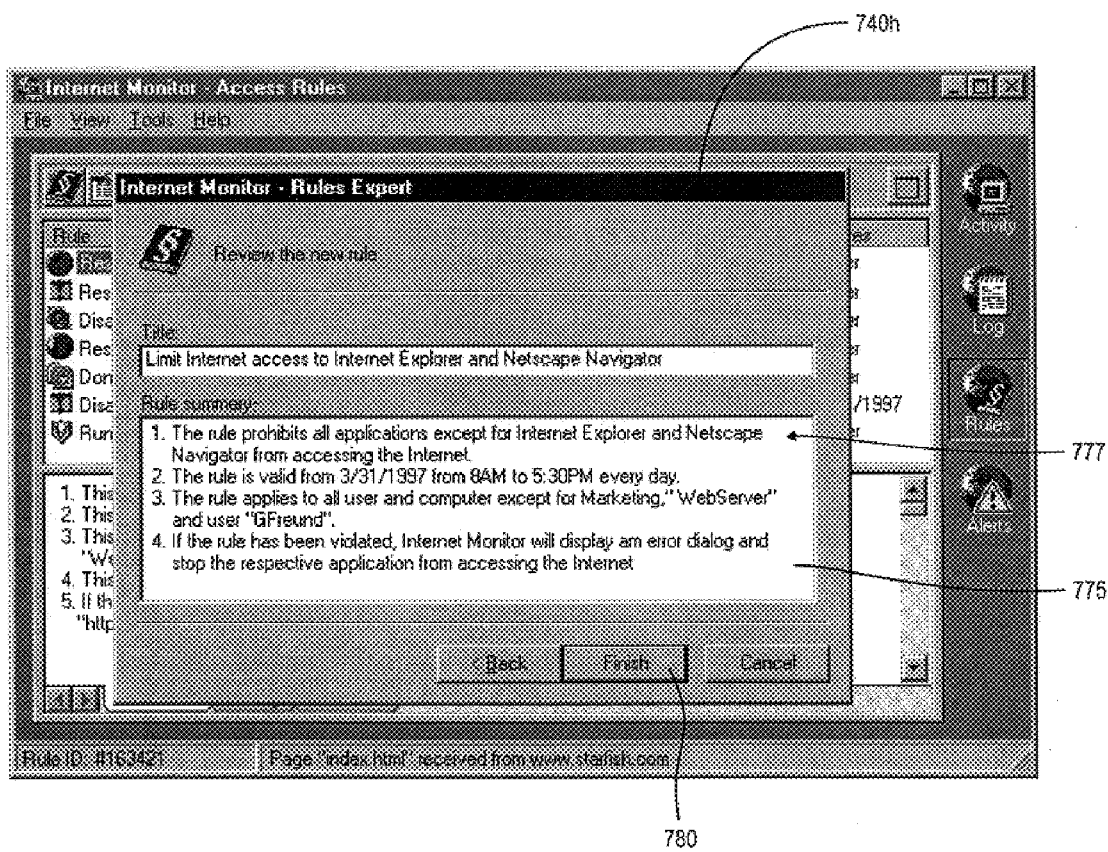
Figure 7K:
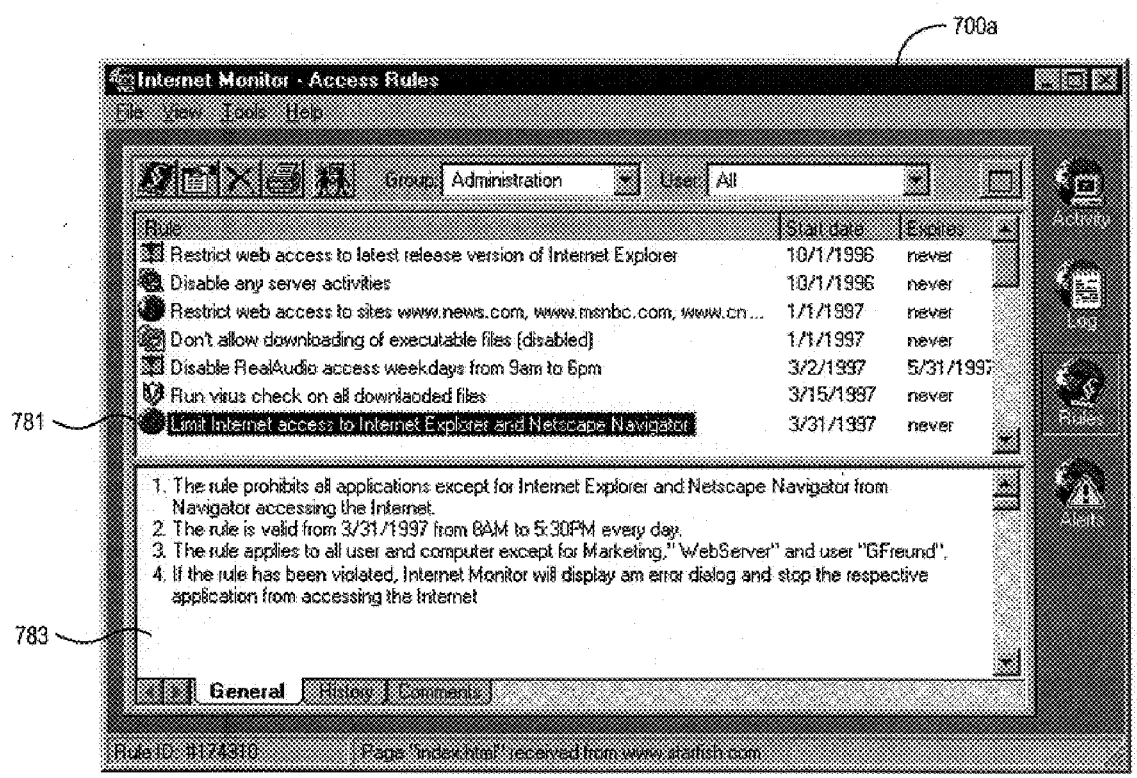

As illustrated in FIG. 7J, the wizard dialog 740 (now 740h) next displays a summary pane allowing the user to review the new rule. In particular, the dialog 740h displays a rule summary 775 comprising a prose description summarizing user input for the wizard dialog. For instance, user inputs for dialog 740b and 740c are summarized by rule summary #1 (shown at 777). The user can backtrack through the wizard panes, if needed, for modifying the new rule. Once the user is satisfied with the definition for the new rule, the user selects Finish button 780 for adding the new rule to the system. As shown in FIG. 7K, the interface 700 (now 700a) adds the new rule to the rule panel, at 781. General information for the rule is provided in the rule details panel, as shown at 783.

D. Internal methodologies

1. General

Detailed internal operation of the system of the present invention is perhaps best described by dividing the internal operation into the following general methods.

I. Loading the Client Monitor

II. Client Monitor did not find Supervisor (operation outside of LAN)

III. Unloading the Client Monitor (normally at workstation shutdown)

IV. Loading the Client Monitor in an ISP environment

V. Interpretation of a typical HTTP "GET" request

VI. Bandwidth and interactive use monitoring

VII. Managing network congestion

VIII. Intercepting WinSock messages

IX. Transmitting messages to Ring 3

Each will now be described in turn.

2. Loading the Client Monitor

Figure 8A:
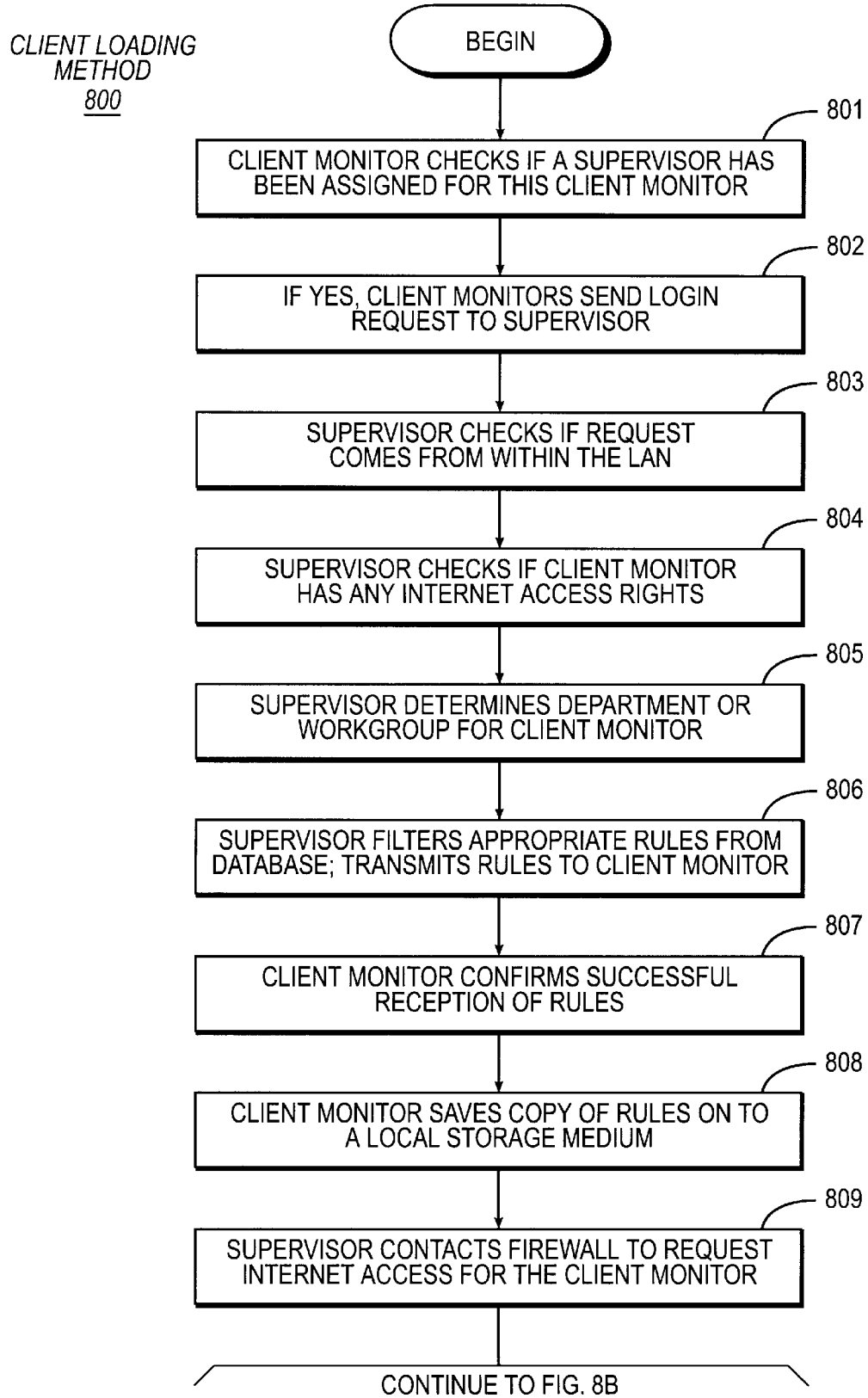
FIGS. 8A–B comprise a flowchart illustrating a method of the present invention for loading the Client Monitor component.
Figure 8B:
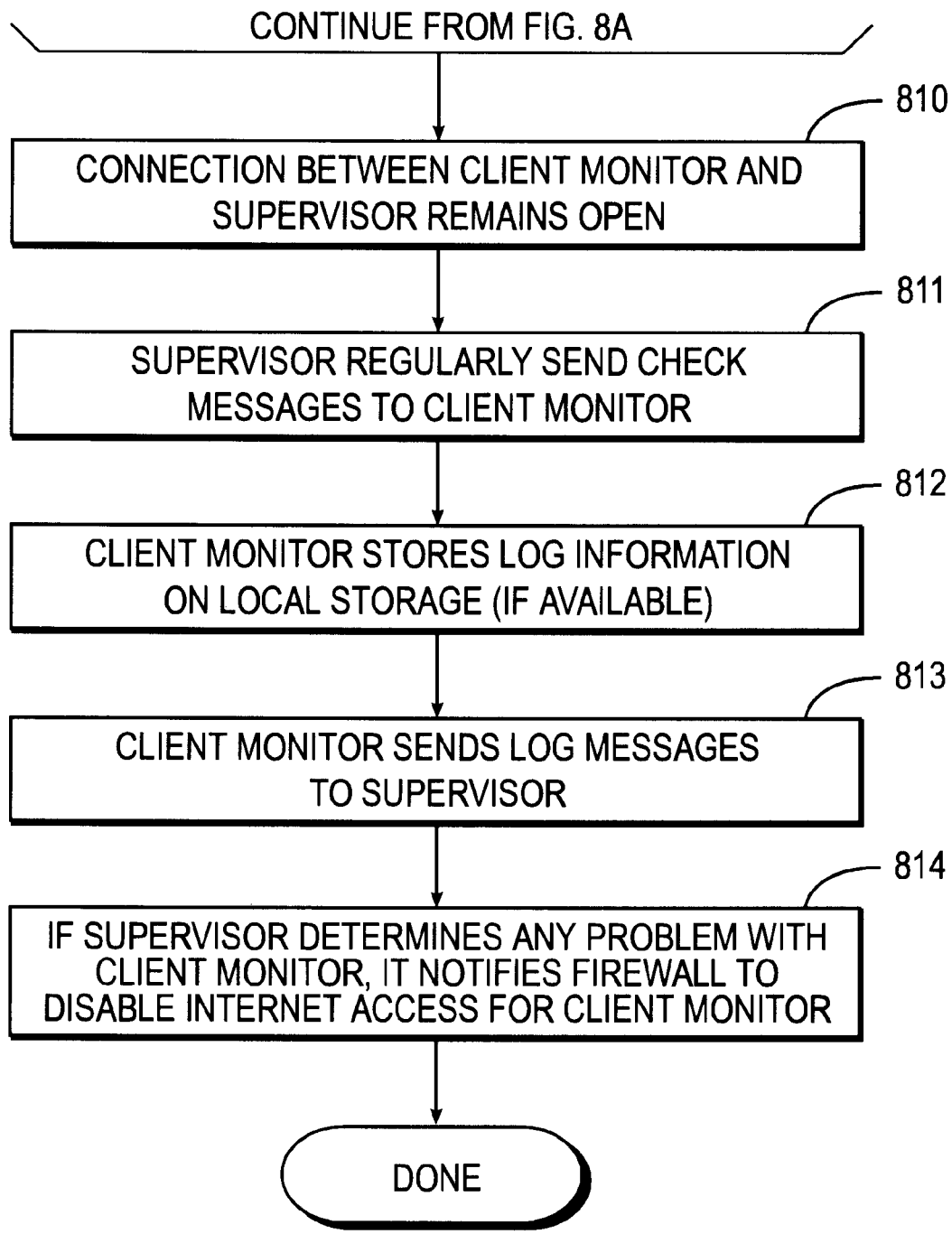

As illustrated in FIG. 8, a method 800 for loading the Client Monitor component comprises the following steps. At step 801, the Client Monitor checks if a Supervisor has been assigned for this Client Monitor. If a Supervisor has been assigned (i.e., yes), the Client Monitor sends a login request to the Supervisor, at step 802. At step 803, the Supervisor checks if the request comes from within the LAN. Then, at step 804, the Supervisor checks if the Client Monitor (computer/user) has any Internet access rights; also, the Supervisor determines the department or workgroup for the Client Monitor, as indicated at step 805.

Based on these determinations, the Supervisor filters rules appropriate for the client (i.e., application, Host, and other rules), and transmits them to the Client Monitor, at step 806. Thereafter, at step 807, the Client Monitor confirms successful reception of rules. The Client Monitor saves a copy of the rules onto a local hard disk (i.e., to a local storage medium), if available, as shown at step 808. The Supervisor contacts the Firewall, at step 809, to request Internet access for the Client Monitor. Connection between the Client Monitor and the Supervisor remains open; this is indicated at step 810. Now, the Supervisor regularly sends check messages to the Client Monitor, as shown at step 811. The Client Monitor can now store log information on local storage (if available), at step 812. In a complementary fashion, the Client Monitor sends log messages to the Supervisor, at step 813. If the Supervisor detects any problem with the Client Monitor, it notifies the Firewall to disable Internet access for the Client Monitor, as indicated by step 814.

3. Client Monitor unable to locate Supervisor

Figure 9:
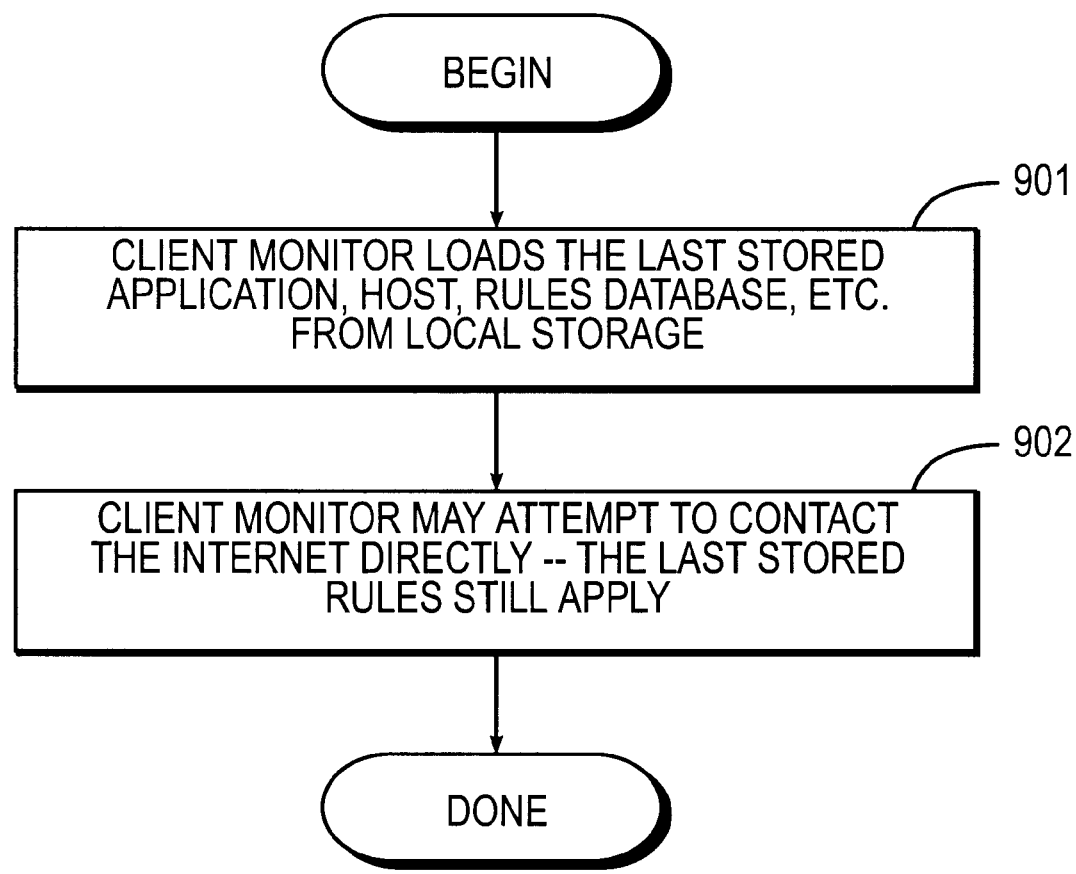
FIG. 9 is a flowchart illustrating a method of the present invention for handling the scenario of when the Client Monitor is unable to locate a Supervisor.

As illustrated in FIG. 9, a method 900 for handling the scenario of when the Client Monitor is unable to locate a Supervisor (operation outside of the LAN) comprises the following steps. At step 901, the Client Monitor loads the last stored application, Host, rules database, and the like from local storage. At step 902, the Client Monitor attempts to contact the Internet directly (for example via a dialup connection), but the last-stored rules continue to apply.

4. Unloading the Client Monitor

Figure 10:
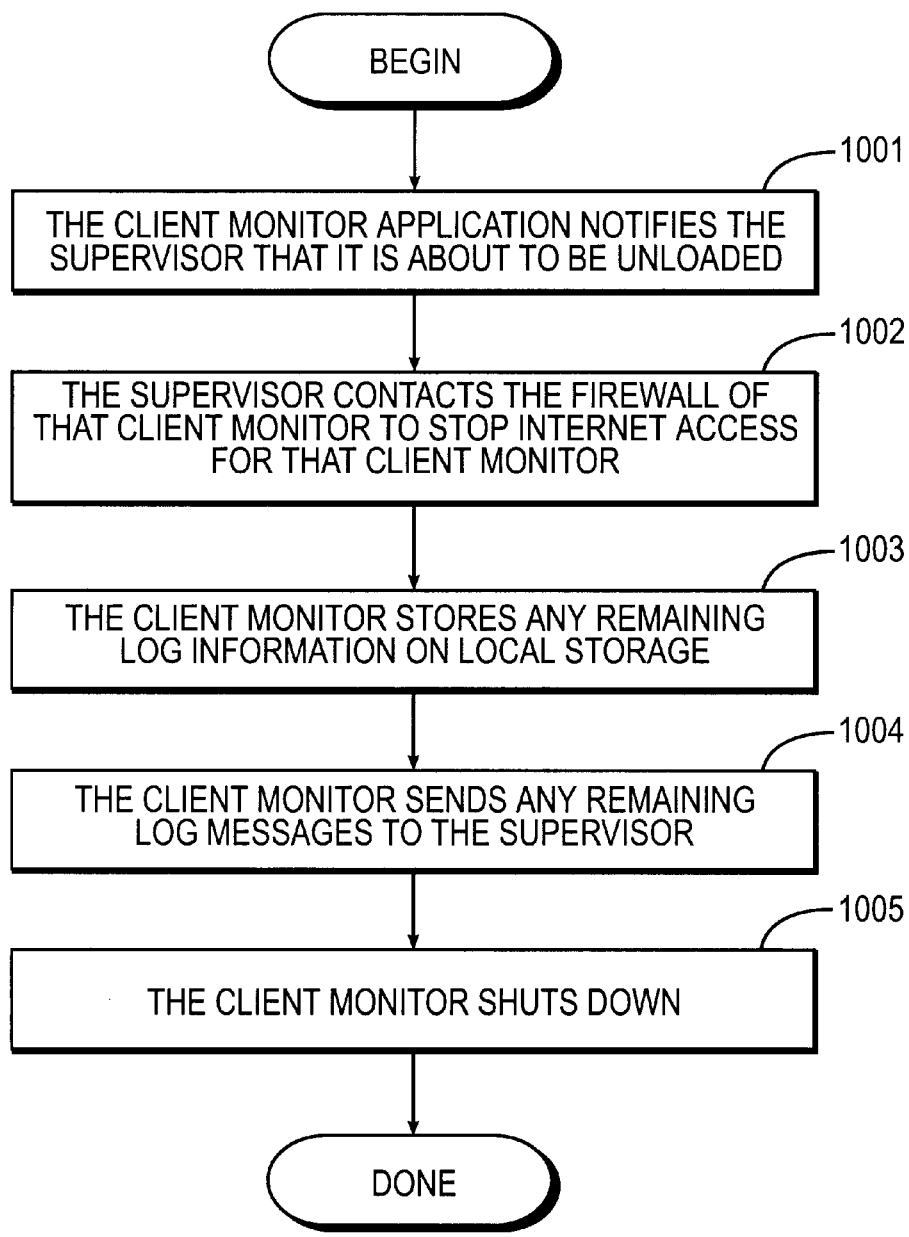
FIG. 10 is a flowchart illustrating a method of the present invention for unloading the Client Monitor component.

As illustrated in FIG. 10, a method 1000 for unloading the Client Monitor (normally at workstation shutdown) comprises the following steps. At step 1001, the Client Monitor component or application notifies the Supervisor that it is about to be unloaded. At step 1002, the Supervisor contacts the Firewall of that Client Monitor to stop Internet access for that Client Monitor. At step 1003, the Client Monitor stores any remaining log information on local storage (if available). At step 1004, the Client Monitor sends any remaining log messages to the Supervisor. At step 1005, the Client Monitor shuts down.

5. Unloading the Client Monitor

Figure 11A:
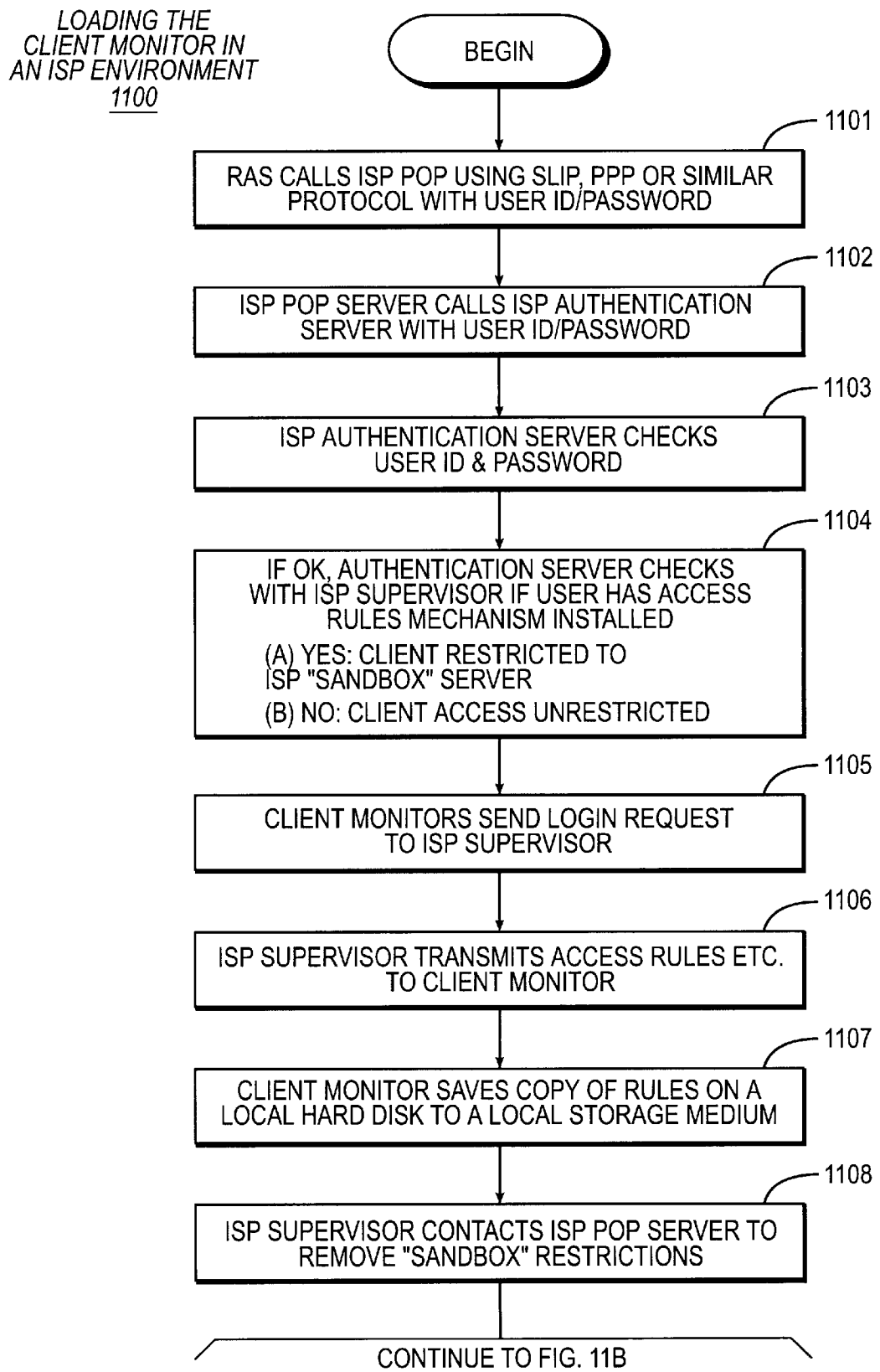
FIGS. 11A–B comprise a flowchart illustrating a method of the present invention for loading the Client Monitor in an Internet Service Provider (ISP) environment.
Figure 11B:
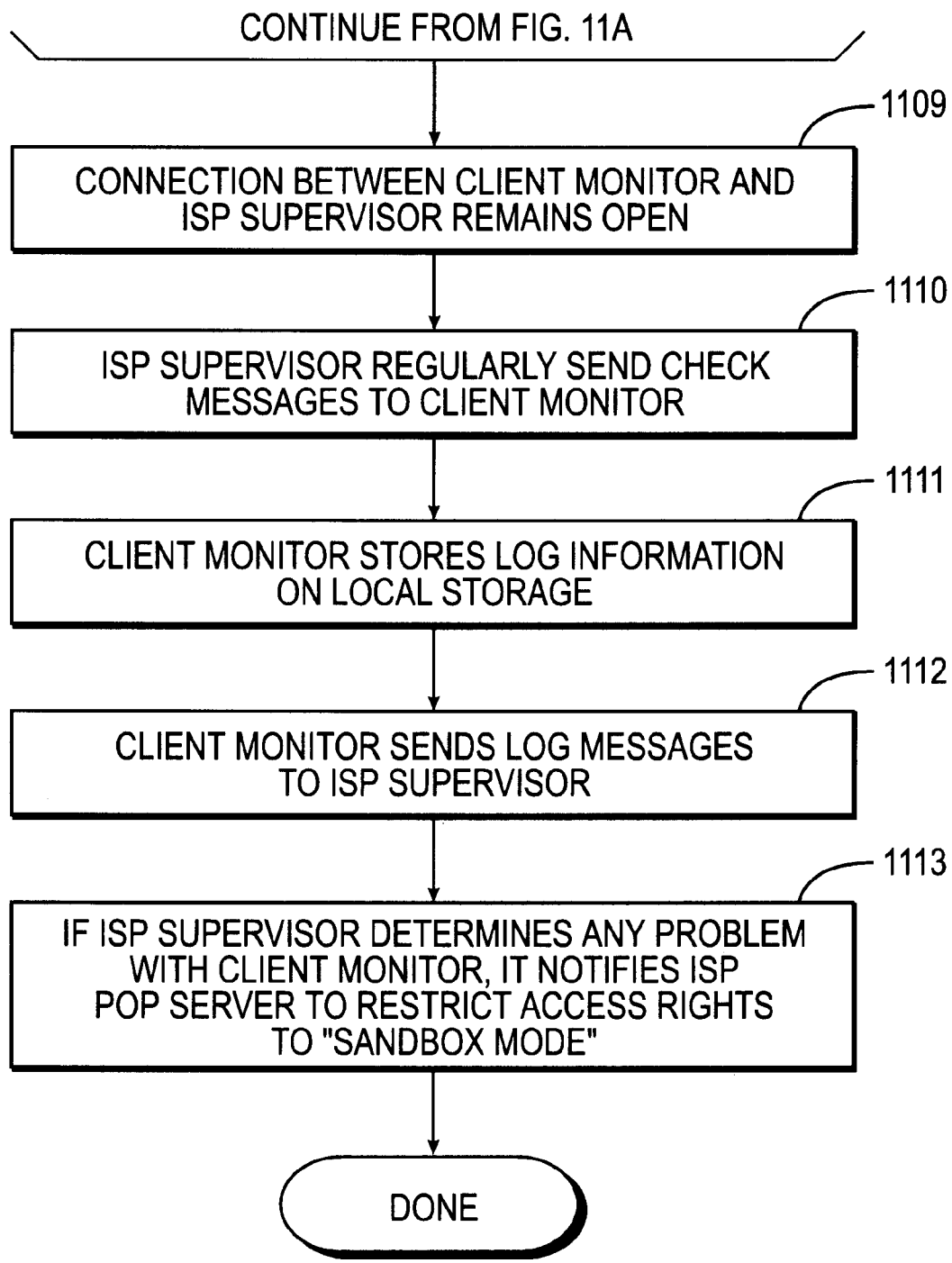

As illustrated in FIGS. 11A-B, a method 1100 for loading the Client Monitor in an Internet Service Provider (ISP) environment comprises the following steps. At step 1101, the RAS calls the ISP POP server using SLIP, PPP or similar protocol with user ID/password. At step 1102, the ISP POP Server calls the ISP Authentication Server with user ID/password. At step 1103, the ISP Authentication Server checks user ID and password. If these are valid, the Authentication Server checks with the ISP Supervisor if the user has access rules (mechanism) installed, at step 1104. If rules are install, the ISP Authentication Server notifies ISP POP that client has Internet access restricted to the ISP "Sandbox" Server. Otherwise, the ISP Authentication Server notifies the ISP POP that the client has unrestricted Internet access. At step 1105, the Client Monitors send login requests to the ISP Supervisor. The Supervisor then transmits access rules and the like to the Client Monitor at step 1106. At step 1107, the Client Monitor saves a copy of the rules on a local hard disk to a local storage medium, if available. At step 1108, the ISP Supervisor contacts the ISP POP Server to remove "sandbox" restrictions. At step 1109, the connection between the Client Monitor and the Supervisor remains open. At step 1110, the ISP Supervisor regularly sends check messages to the Client Monitor. At step 1111, the Client Monitor stores log information on local storage (if available). At step 1112, the Client Monitor sends log messages to the ISP Supervisor. If the ISP Supervisor determines any problems with the Client Monitor, it notifies the ISP POP Server to restrict access rights to "sandbox mode" at step 1113.

6. Interpreting protocol commands (e.g., HTTP requests)

Figure 12A:
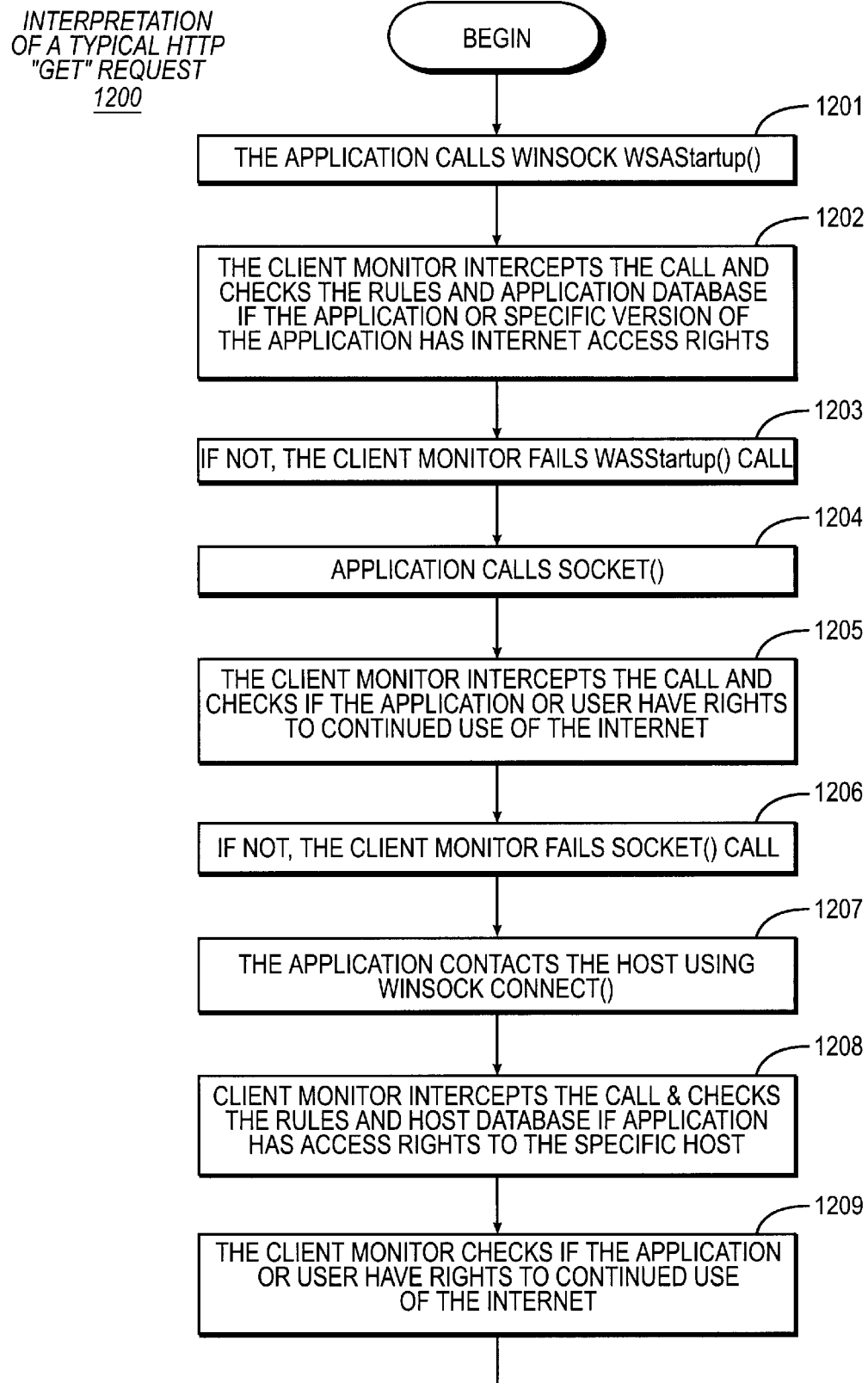
FIGS. 12A–C comprise a flowchart illustrating a method of the present invention for interpreting protocol commands, such as a typical HTTP "GET" request.
Figure 12B:
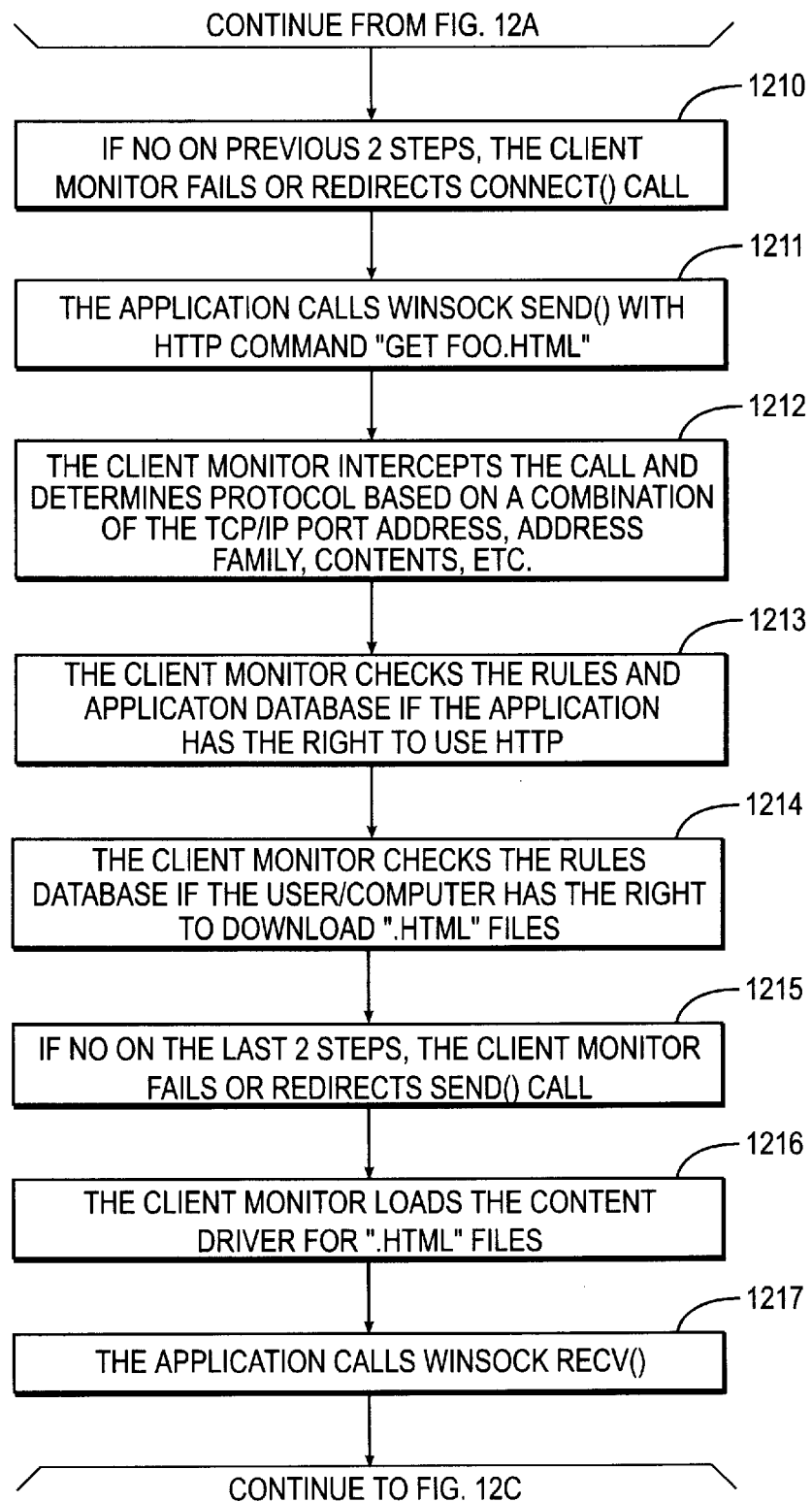
Figure 12C:
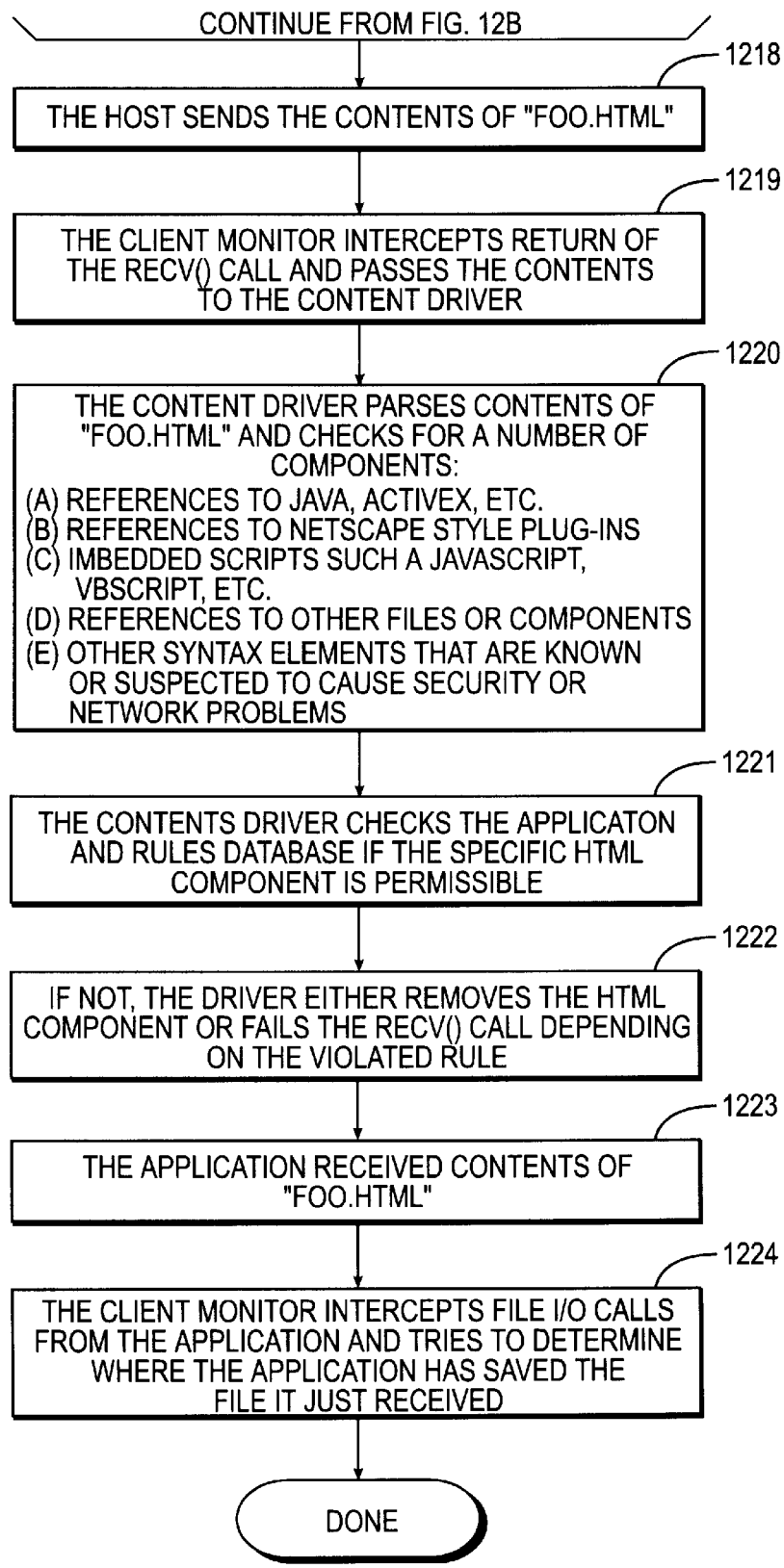

FIGS. 12A–C illustrates a method 1200 for interpreting protocol commands, such as a typical HTTP "GET" request. At any time during the method, the Client Monitor can fail or redirect a call; it also can show the user a warning dialog but permit the command or request call to continue unchanged. The method 1200 comprises the following steps. At step 1201, the application calls WinSock WSAStartup() API command. At step 1202, the Client Monitor intercepts the call and checks the rules and application database to see if the application or a specific version of the application has Internet access rights. If not, the Client Monitor fails the WSAStartup() call at step 1203. At step 1204, the Application invokes socket(). At step 1205, the Client Monitor intercepts the call and checks if the application or user has the right to continued use of the Internet (see also Bandwidth and interactive use monitoring). If not, the Client Monitor fails the socket() call at step 1206. At step 1207, the Application contacts the Host using WinSock connect(). At step 1208, the Client Monitor intercepts the call and checks the rules and Host database to see if the application has access rights to the specific Host. At step 1209, the Client Monitor checks if the application or user has the right to continued use of the Internet (see also Bandwidth and interactive use monitoring). If the answer is no at steps 1208 and 1209, the Client Monitor fails or redirects the connect().call at step 1210. At step 1211, the Application calls WinSock send() with the HTTP get command (e.g., "GET foo.html"). At step 1212, the Client Monitor intercepts the call and determines the protocol based on a combination of the TCP/IP port address, the address family, contents, and the like. At step 1213, the Client Monitor checks the rules and application database to see if the Application has the right to use HTTP. At step 1214, the Client Monitor checks the rules database to see if the user/computer has the right to download ".html" files. If the answer is no at steps 1213 or 1214, the Client Monitor fails or redirects the send() call at step 1215.

At step 1216, the Client Monitor loads the content driver for ".html" files. At step 1217, the application invokes WinSock recv(). At step 1218, the Host sends the contents of "foo.html". At step 1219, the Client Monitor intercepts the return of the recv() call and passes the contents to the content driver. At step 1220, the content driver parses the contents of "foo.html" and checks for the following components: (a) References to Java™, ActiveX, and the like (<APPLET> or <OBJECT> tags); (b) References to Netscape style plug-ins (<EMBED> tag); (c) Imbedded scripts such as Java Script™, VBScript, and the like (<SCRIPT> tag); (d) References to other files or components (<A HREF=\f "Symbol">, or <IMG SRC=\f "Symbol"> tags); and (e) Other syntax elements that are known or suspected to cause security or network problems. At step 1221, the Contents driver checks the application and rules database to see if the specific HTML component is permissible. If it is not permissible, the driver either removes the HTML component or fails the recv() call depending on the violated rule at step 1222. At step 1223, the Application received (sometimes modified) contents of "foo.html". At step 1224, the Client Monitor intercepts the file I/O calls from the application and tries to determine where (if at all) the Application has saved the file it just received.

7. Bandwidth and interactive use monitoring

Figure 13A:
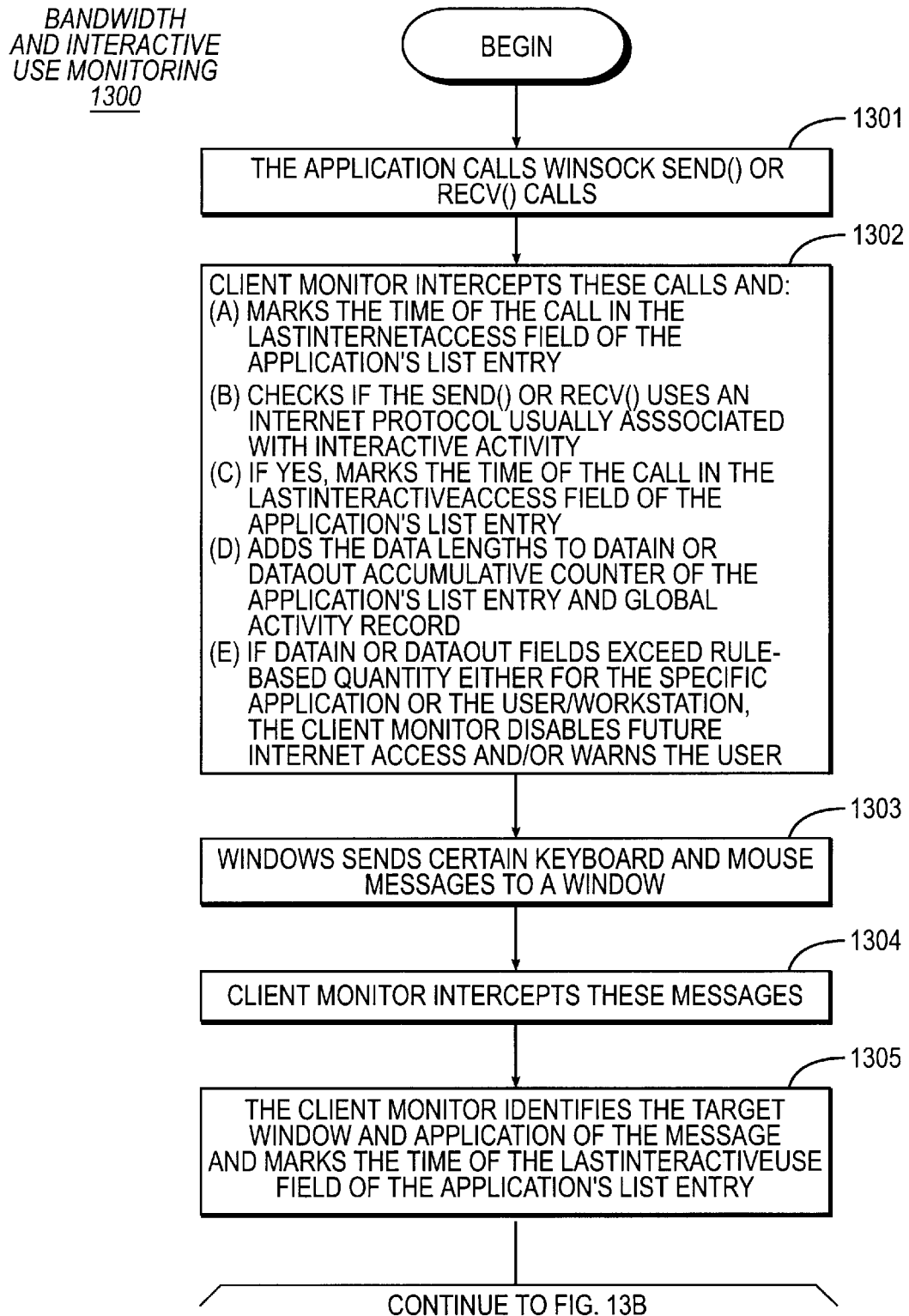
FIGS. 13A–B comprise a flowchart illustrating a method of the present invention for bandwidth and interactive use monitoring.
Figure 13B:
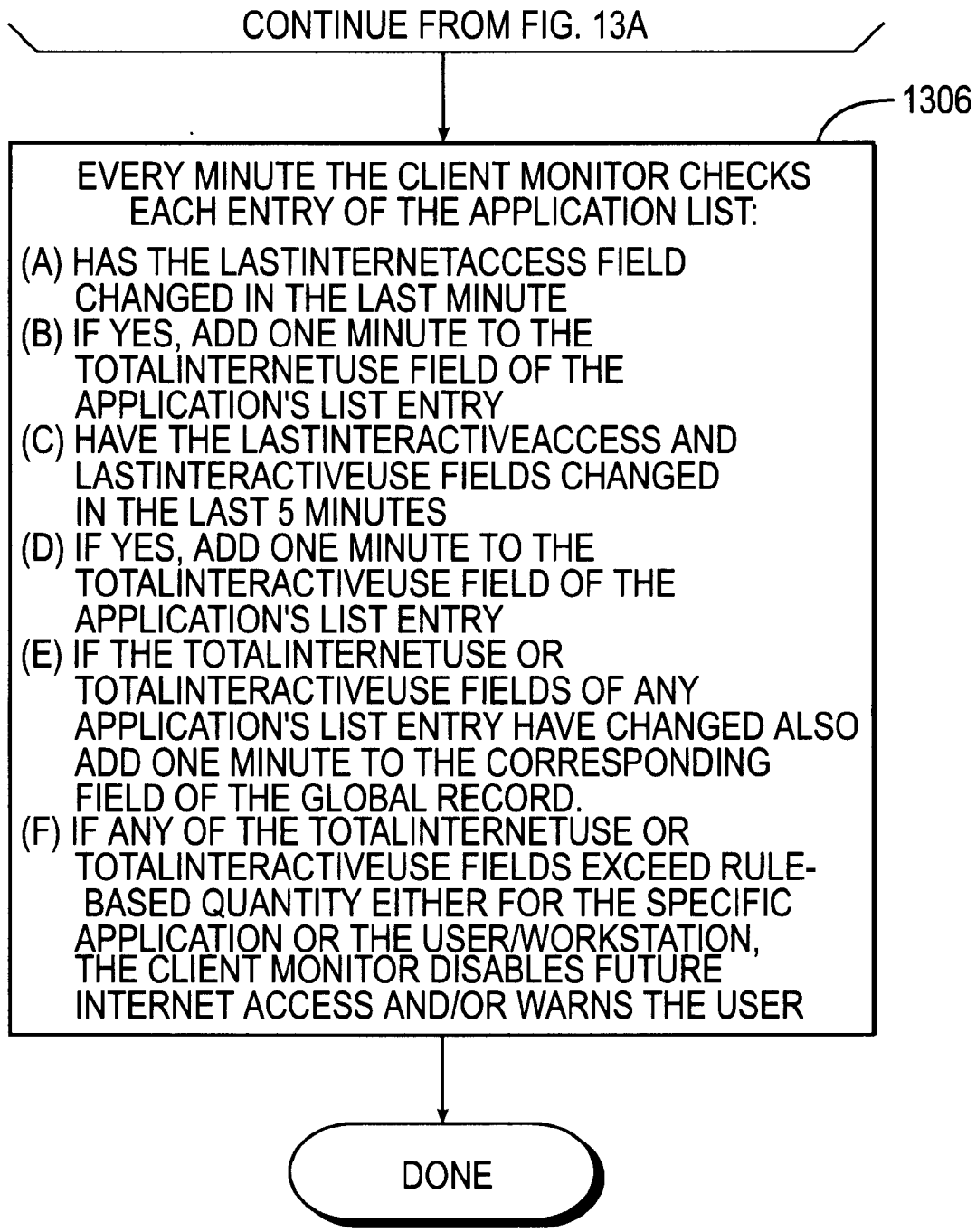

FIGS. 13A–B illustrate a method 1300 for bandwidth and interactive use monitoring. During the method, the Client Monitor maintains a list of active Applications (processes) with various fields to track activities and a global activity record. The method 1300 comprises the following steps. At step 1301, the Application calls WinSock send() or recv() calls. At step 1302, the Client Monitor intercepts these calls and: (a) Marks the time of the call in a LastInternetAccess field of the Application's list entry; (b) Checks if the send() or recv() uses an Internet protocol usually associated with interactive activity (HTTP—Web browsing, online games, and the like); (c) If such a protocol is used, marks the time of the call in a LastInteractiveAccess field of the Application's list entry; (d) Adds the data lengths to a DataIn or DataOut accumulator or counter of the Application's list entry and global activity record; (e) If the DataIn or DataOut fields exceed rule-based quantity either for the specific Application or the user/workstation, the Client Monitor disables future Internet access and/or warns the user.

At step 1303, the operating system, Windows, sends certain keyboard (WM_KEY), and mouse (WM_?BUTTONDOWN) messages to a window. At step 1304, the Client Monitor intercepts these messages. At step 1305, the Client Monitor identifies the target window and Application of the message and marks the time of the LastInteractiveUse field of the Application's list entry. At step 1306, every minute the Client Monitor checks each entry of the Application list as follows: (a) Has the LastInternetAccess field changed in the last minute; (b) If yes, add one minute to a TotalInternetUse field of the Application's list entry; (c) Have the LastInteractiveAccess and LastInteractiveUse fields changed in the last five minutes; (d) If yes, add one minute to a TotalInteractiveUse field of the Application's list entry; (e) If the TotalInternetUse or TotalInteractiveUse fields of any Application's list entry have changed, also add one minute to the corresponding field of the global record; and (f) If any of the TotalInternetUse or TotalInteractiveUse fields exceed rule-based quantity either for the specific Application or the user/workstation, the Client Monitor disables future Internet access and/or warns the user.

8. Managing network congestion

Figure 14:
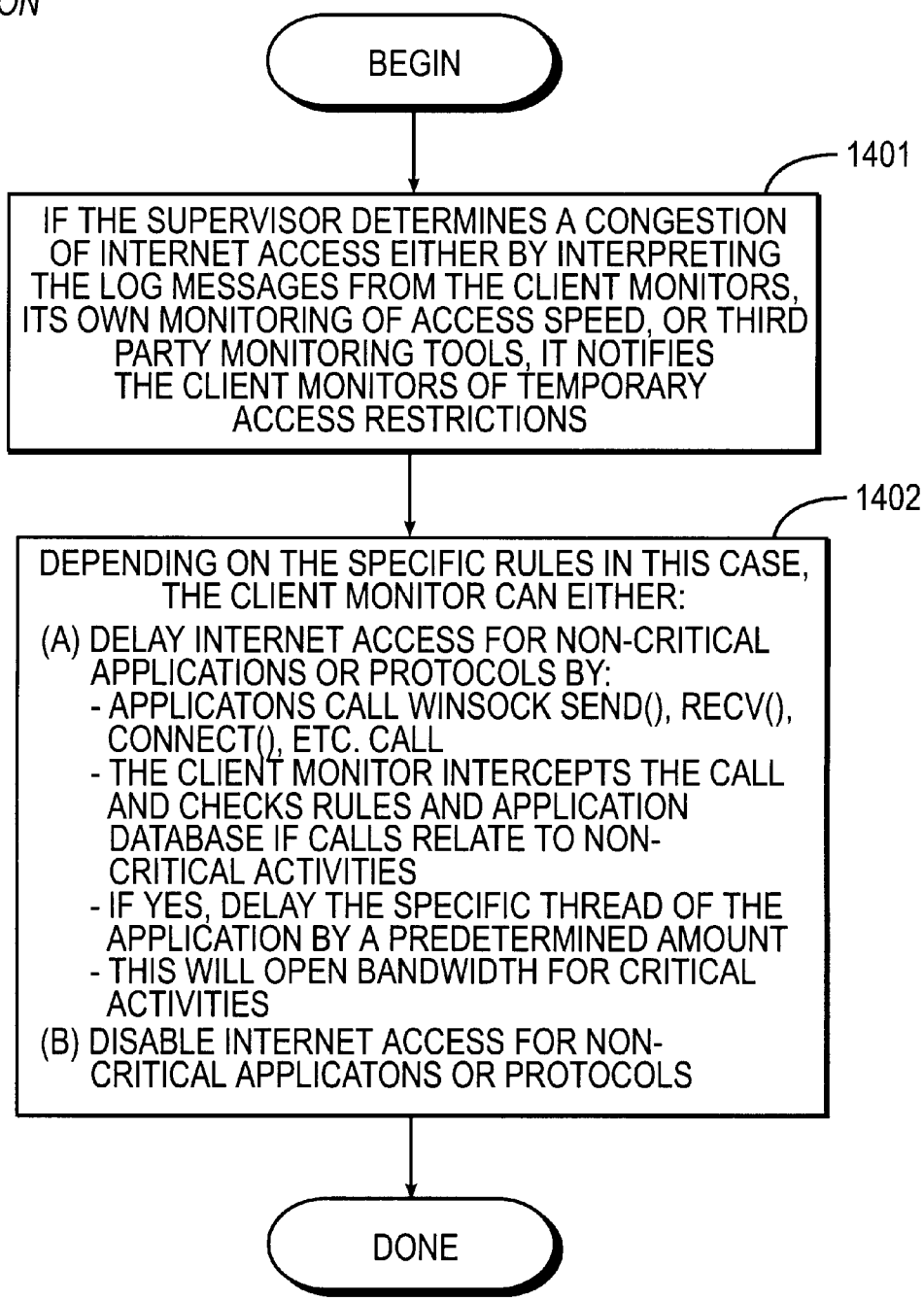
FIG. 14 is a flowchart illustrating a method of the present invention for managing network congestion.

As illustrated in FIG. 14, a method 1400 for managing network congestion comprises the following steps. At step 1401, if the Supervisor determines that congestion exists for Internet access (either by interpreting the log messages from the Client Monitors, its own monitoring of access speed, or third party monitoring tools), it notifies the Client Monitors of temporary access restrictions. At step 1402, depending on the specific rules in force, the individual Client Monitors can either: (a) Delay Internet access for non-critical Applications or Protocols by: (i) Applications call WinSock send(), recv(), connect() calls, and the like, (ii) the Client Monitor intercepts the call and checks the rules and Application database if calls relate to non-critical activities, (iii) If yes—delay the specific thread of the Application by a predetermined amount (e.g., 10 seconds), or (iv) open bandwidth for critical activities; or (b) Disable Internet Access for non-critical Applications or protocols.

9. Intercepting communication messages (e.g., WinSock messages)

Figure 15A:
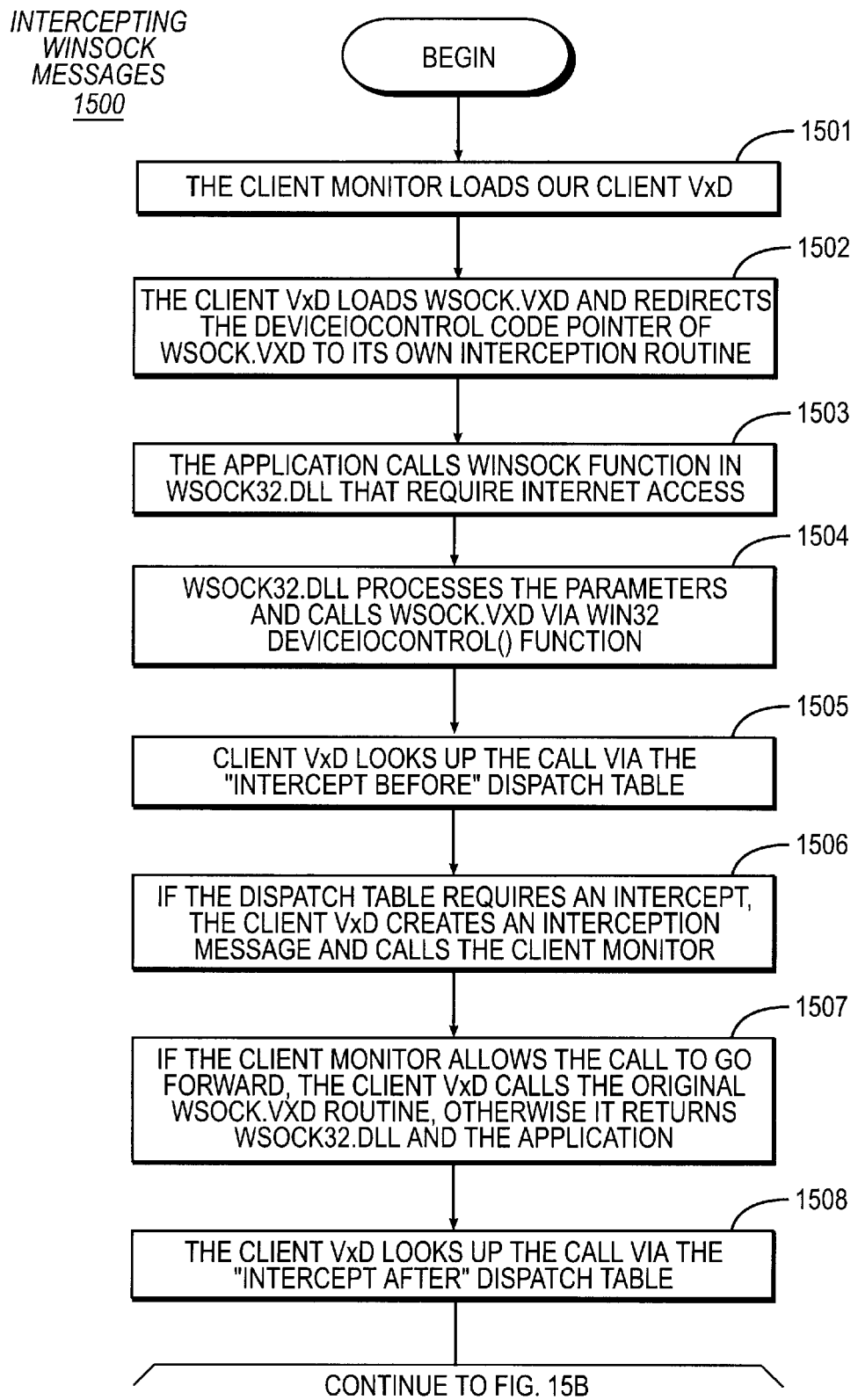
FIGS. 15A–B comprise a flowchart illustrating a method of the present invention for intercepting communication driver (e.g., WinSock) messages.
Figure 15B:
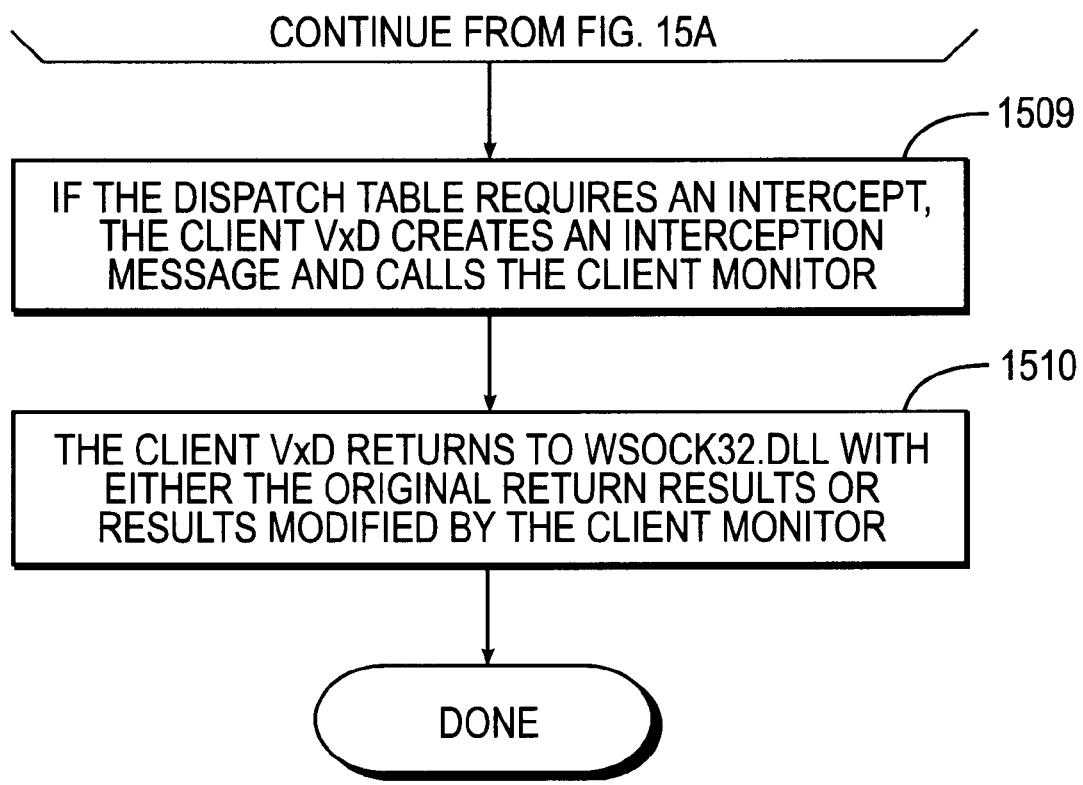

FIGS. 15A–B illustrate a method 1500 for intercepting communication driver (e.g., WinSock) messages. The following method description focuses on a Windows 95 implementation with the following standard Microsoft WinSock component: Wsock32.dll and Wsock.vxd. The implementation is similar under Windows NT and other operating systems.

The method operates as follows. At step 1501, the Client Monitor loads the Client VxD (Windows virtual driver file). At step 1502, the Client VxD loads the WinSock virtual driver file, Wsock.vxd, and redirects the WinSock DeviceIOControl code pointer of Wsock.vxd to its own interception routine. At step 1503, the application calls the WinSock function in the WinSock dynamic link library, Wsock32.dll, that requires Internet access. At step 1504, Wsock32.dll processes the parameters and calls Wsock.vxd via the the Windows Win32 DeviceIoControl0 function call. At step 1505, the Client VxD looks up the call via an "intercept before" dispatch table. At step 1506, if the dispatch table requires an intercept, the Client VxD creates an interception message and calls the Client Monitor. At step 1507, if the Client Monitor allows the call to go forward, the Client VxD calls the original Wsock.vxd routine, otherwise it returns Wsock32.dll and the Application. At step 1508, the Client VxD looks up the call via the "intercept after" dispatch table. If the dispatch table requires an intercept, the Client VxD creates an interception message and calls the Client Monitor at step 1509. At step 1510, the Client VxD returns to Wsock32.dll with either the original return results or results modified by the Client Monitor.

10. Transmitting messages from Ring 0 to Ring 3

Figure 16A:
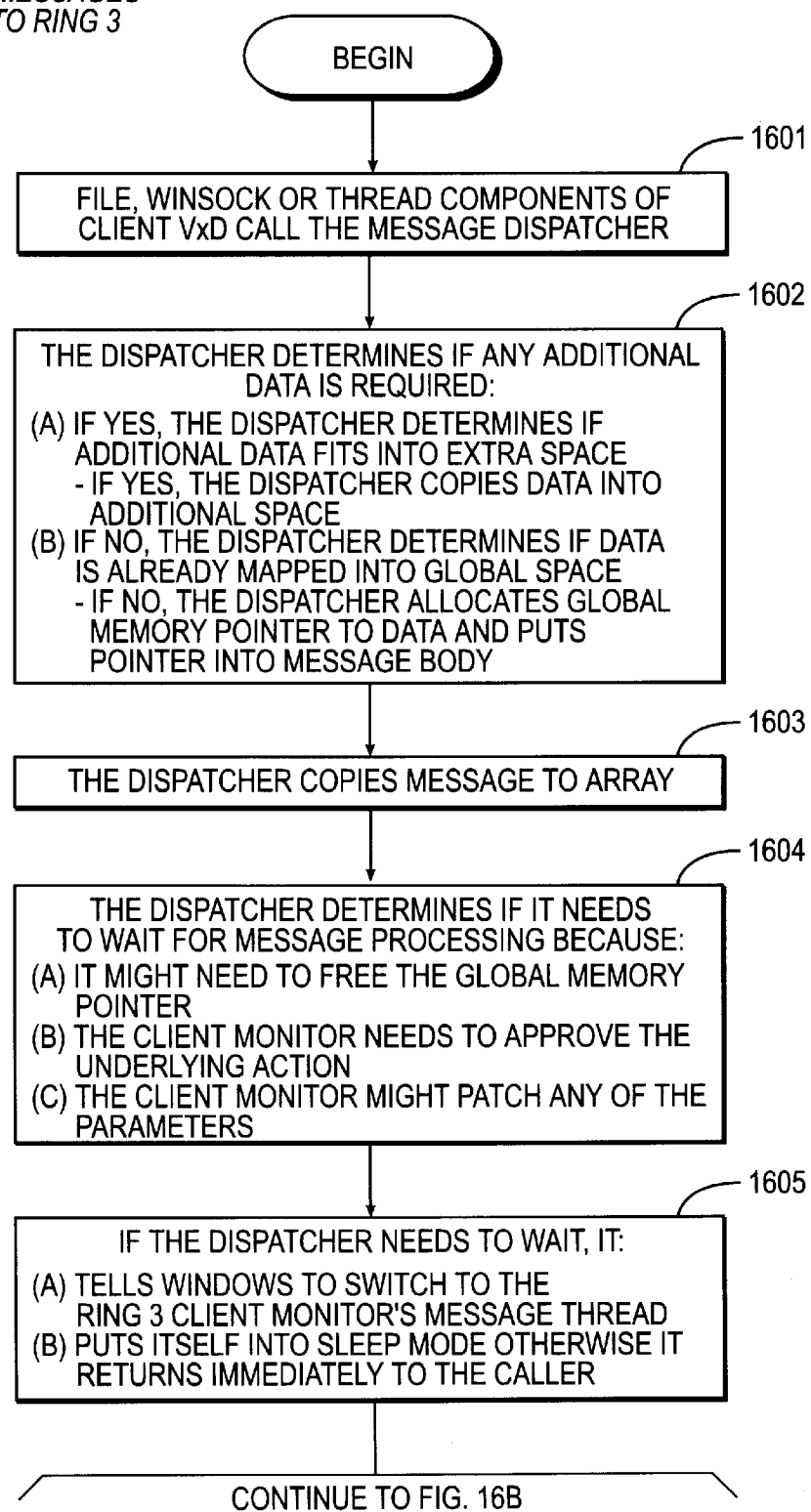
FIGS. 16A–B comprise a flowchart illustrating a method of the present invention for transmitting messages from one memory protection ring to another (e.g., from highly-privileged Ring 0 to lesser-privileged Ring 3).
Figure 16B:
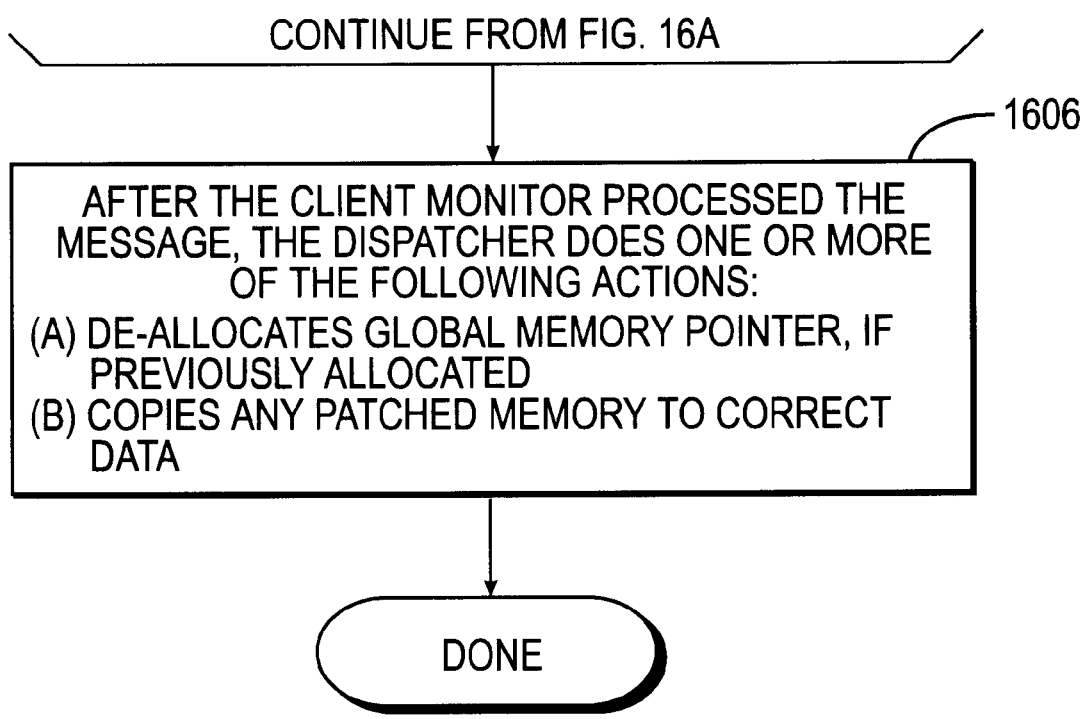

FIGS. 16A–B illustrate a method 1600 for transmitting messages from one memory protection ring to another (e.g., from highly-privileged Ring 0 to lesser-privileged Ring 3). Ring 3 and Ring 0 refer to execution protection rings available on Intel-based computers (e.g., having Intel 80386 and later CPUs) and specify the application execution mode (Ring 3) or the kernel execution mode (Ring 0). Ring 3 programs and their components have a separate memory address space for each application. Ring 0 components (VxDs), on the other hand, share a common memory space. One can create a pointer that is accessible both from Ring 0 and all Ring 3 processes.

A difficult task is forwarding intercepted data from Ring 0 to Ring 3, and later applying any modifications that the Ring 0 component has made to the call parameters and return results. Difficulties include: (1) the intercept occurs in the memory context of the Application's process, thus one needs to wait until the process received its time share from Windows; and (2) the call parameters (memory pointers) are valid only in the context of the Application's process. The Client VxD and the Client Monitor share a common array of messages and two pointers into that array. The Client VxD adds a message to that array and the Client Monitor picks it up using a standard first-in/first-out (FIFO) approach. Each fixed size message record has some space for additional data, if that size is not sufficient the additional data (e.g., recv0 or send0 data) is mapped into global memory space so it is accessible for the Client Monitor's process. Because the events occur asynchronously, particular care is needed to avoid situations where Windows switches the executing thread at critical sections, leading to possible deadlocks.

Messages are generated from the following sources (intercepted WinSock calls).

1. Threads created and destroyed (to keep track of Applications); and

2. File activities (using the ring 0 IFSMgr_InstallFileSystemApiHook mechanism)

Some messages require that the Client Monitor processes the message (and possibly stop or modify the underlying activities) before the Application's process can be allowed to continue, while other messages are just for information purposes.

The method 1600 comprises the following steps. At step 1601, File, WinSock, or Thread components of Client VxD call a message dispatcher, "Dispatcher." At step 1602, the Dispatcher determines if any additional data is required. If additional data is required, the Dispatcher determines if additional data fits into extra space, and then copies data into the additional space. If additional data is not required, the Dispatcher determines if data is already mapped into global memory space—if it is not, the Dispatcher allocates a global memory pointer to data and puts the pointer into the message body. At step 1603, the Dispatcher copies the message to an array. At step 1604, the Dispatcher determines if it needs to wait for message processing because: (a) It might need to free the global memory pointer; (b) the Client Monitor needs to approve the underlying action; or (c) the Client Monitor might patch any of the parameters.

At step 1605, if the Dispatcher needs to wait, it: (a) tells the operating system (e.g., Windows) to switch to the Ring 3 Client Monitor's message thread; or (b) puts itself (and therefore the application thread) into sleep mode, otherwise it returns immediately to the caller. After the Client Monitor has processed the message, the Dispatcher does one or more of the following actions at Step 1606: (a) De-allocates the global memory pointer, if previously allocated; and/or (b) Copies any patched memory to correct data.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a system comprising a plurality of client computers connected to a network and having Internet access, a method for managing Internet access for a particular client computer, the method comprising:

providing at the particular client computer a client monitoring process;

providing at another computer on the network a supervisor process, said supervisor process specifying rules which govern Internet access by the client computers;

transmitting at least a subset of said rules to the particular client computer;

at the client monitoring process, trapping a request for Internet access from the particular client computer; and processing the request for Internet access by performing substeps of:

(i) determining whether the request for Internet access violates any of the rules transmitted to the particular client computer, and (ii) if the request for Internet access violates any of the rules transmitted to the particular client computer, denying the request for Internet access.

2. The method of claim 1, wherein the particular client computer includes a communication driver for processing requests for Internet access and wherein said step of providing at the particular client computer a client monitoring process comprises:

providing at the particular client computer a process which traps at the communication driver requests for Internet access.

3. The method of claim 1, wherein said step of providing at the particular client computer a client monitoring process includes:

installing at the particular client computer a client monitoring process which executes anytime the communication driver processes requests for Internet access.

4. The method of claim 1, wherein said another computer includes a server computer connected to the network.

5. The method of claim 1, wherein said another computer includes another client computer connected to the network.

6. The method of claim 1, wherein said rules transmitted to the particular client computer specify whether the particular client computer is allowed any Internet access.

7. The method of claim 1, wherein said rules transmitted to the particular client computer specify which applications are allowed Internet access.

8. The method of claim 1, wherein said rules transmitted to the particular client computer specify a particular type of Internet access which is allowed.

9. The method of claim 1, wherein said system includes a "firewall" application for selectively blocking Internet access and wherein said substep of denying the request for Internet access includes:

instructing said firewall application to block Internet access for the particular client computer.

10. The method of claim 9, wherein said firewall application operates independently to block Internet access for any client according to rules specified for the firewall application.

11. The method of claim 1, wherein said rules which govern Internet access by the client computers include rules which are enforced against selected ones of users, computers, and groups thereof.

12. The method of claim 11, wherein said transmitting at least a subset of said rules step includes:

determining, based on identification of users, computers, or groups thereof and for which rules have been defined, a subset of said rules filtered for a given user at the particular client computer.

13. The method of claim 12, wherein said users are identified by user name.

14. The method of claim 12, wherein said computers are identified by Internet Protocol (IP) addresses.

15. The method of claim 1, wherein said transmitting at least a subset of said rules to the particular client computer includes:

transmitting a set of default rules for the particular client, if no particular rules are already defined for the client.

16. In a system comprising a plurality of client computers connected to a network and having Internet access, a method for managing Internet access for a particular client computer on a per application basis, the method comprising:

storing at a supervisor computer a list of applications and versions thereof defining which applications are permitted Internet access;

transmitting said list from the supervisor computer to the client computer;

at the client computer, trapping a request for Internet access from a particular application;

based on said list, determining whether the request for Internet access is from an application or version thereof which is permitted Internet access; and if the request for Internet access is from an application or version thereof which is not permitted Internet access, blocking Internet access for the application.

17. The method of claim 16, wherein said storing step includes:

storing with a supervisor process executing on a server computer connected to the network the list of applications and versions thereof which are permitted Internet access.

18. The method of claim 16, wherein said storing step includes:

storing with a supervisor process executing on another client computer connected to the network the list of applications and versions thereof which are permitted Internet access.

19. The method of claim 16, wherein said list includes executable names and version numbers for applications which are permitted Internet access.

20. The method of claim 16, wherein said list includes executable names and version numbers for applications which are not permitted Internet access.

21. The method of claim 16, wherein said list includes Internet access activities which are permitted or restricted for applications or versions thereof.

22. The method of claim 21, wherein Internet access activities comprise use of particular communication protocols.

23. The method of claim 22, wherein said communication protocols include at least one of Hypertext Transport Protocol (HTTP) and File Transport Protocol (FTP).

24. The method of claim 22, wherein said communication protocols include an e-mail protocol.

25. The method of claim 16, wherein said Internet access activities comprise at least one of browsing activity and e-mail activity.

26. A computer system regulating access by client computers comprising:

a plurality of client computers which can connect to at least one open network;

supervisor means provided at a computer which is in communication with each client computer to be regulated, said supervisor means including a database of enforcement rules governing access of client computers to said at least one open network;

means for transferring rules from the database of enforcement rules to each computer requiring access to said at least one open network and which is to be regulated; and monitoring means provided at each client computer which is to be regulated, for selectively blocking access to said at least one open network based on said transferred rules.

27. The system of claim 26, further comprising:

means for selectively blocking access based on properties of applications executing at said client computers which attempt access to said at least one open network.

28. The system of claim 27, wherein said properties of applications include version and executable name for each application.

29. The system of claim 27, wherein said properties of applications include types of activities which applications are either allowed to perform or restricted from performing.

30. The system of claim 29, wherein said types of activities include at least one of using e-mail and browsing.

* * * * *